United States Patent [19]

Cohen

[11] Patent Number: 5,583,513
[45] Date of Patent: Dec. 10, 1996

[54] SYSTEM AND METHOD FOR GENERATING PRECISE CODE BASED AND CARRIER PHASE POSITION DETERMINATIONS

[75] Inventor: Clark E. Cohen, Palo Alto, Calif.

[73] Assignee: Board of Trustees of the Leland Stanford Junior University, Palo Alto, Calif.

[21] Appl. No.: 135,879

[22] Filed: Oct. 13, 1993

Related U.S. Application Data

[63] Continuation of Ser. No. 126,254, Sep. 22, 1993, abandoned, which is a continuation-in-part of Ser. No. 36,319, Mar. 24, 1993, abandoned.

[51] Int. Cl.$^6$ .............................. G01S 5/02; G01S 1/08; H04B 7/185
[52] U.S. Cl. .................... 342/357; 342/353; 342/386
[58] Field of Search .................... 342/357, 385, 342/386, 458, 453, 464, 394, 353, 51, 33; 455/7, 11.1

[56] References Cited

U.S. PATENT DOCUMENTS

| | | | |
|---|---|---|---|
| 4,636,795 | 1/1987 | Dano | 342/387 |
| 4,651,156 | 3/1987 | Martinez | 342/457 |
| 4,667,203 | 5/1987 | Counselman, III | 342/357 |
| 4,672,382 | 6/1987 | Fukuhara et al. | 342/357 |
| 4,754,465 | 6/1988 | Trimble | 375/1 |
| 4,928,106 | 5/1990 | Ashjaee et al. | 342/352 |
| 4,972,431 | 11/1990 | Keegan | 375/1 |
| 5,134,407 | 7/1992 | Lorenz et al. | 342/352 |
| 5,177,489 | 1/1993 | Hatch | 342/357 |
| 5,233,626 | 8/1993 | Ames | 375/206 |
| 5,252,982 | 10/1993 | Frei | 342/357 |
| 5,311,194 | 5/1994 | Brown | 342/357 |
| 5,345,245 | 9/1994 | Ishikawa et al. | 342/357 |
| 5,438,337 | 8/1995 | Aguado | 342/357 |

OTHER PUBLICATIONS

Expanding the Performance Envelope of GPS–Based Attitude Determination, by Clark E. Cohen, et al., Institute of Washington, Albuquerque, NM, Sep. 9–13, 1991.

Flight Tests of Attitude Determination Using GPS Compared Against an Inertial Navigation Unit, by Clark E. Cohen, et al., Institute of Navigation, San Francisco, CA, Jan. 20–22, 1993.

(List continued on next page.)

*Primary Examiner*—Gregory C. Issing
*Attorney, Agent, or Firm*—Flehr, Hohbach, Test, Albritton & Herbert

[57] ABSTRACT

A GPS system that includes a GPS beacon beacon that receives a plurality of GPS signals. Each of the GPS signals haa a carrier component and a pseudo-random code component. The beacon generates in response to the received GPS signals a plurality of beacon signals. Each of the plurality of beacon signals has a carrier component phase locked to one of the carrier components of the received GPS signals and a pseudo-random code component phase locked to one of the pseudo-random code components of the received GPS signals. The beacon then transmits the plurality of beacon signals. The system also includes a GPS receiver. The GPS receiver can make Code Based Differential GPS position determinations by making range measurements for each of the pseudo-random code components of the GPS and beacon signals and in response computing values representing a position. Additionally, the GPS receiver can make Carrrier Phase Differential GPS position determinations by first making phase measurements for each of the carrier components of the GPS and beacon signals at a plurality of measurement epochs during an initialization period. It then computes initialization values in response to these phase measurements for the GPS and beacon signals. Then, at a subsequent epoch after the initialization period, it computes a position in responsive to the initialization values and in response to the phase values for the GPS and beacon signals measured at the subsequent measurment epoch.

46 Claims, 26 Drawing Sheets

OTHER PUBLICATIONS

Integer Ambiguity Resolution of the GPS Carrier for Spacecraft Attitude Determination, by Clark E. Cohen, et al., 15th Annual AAS Guidance & Conference, Keystone, CO, Feb. 8–12, 1992.

Attitude Determination Using GPA, by Clark E. Cohen, Dissertation for Ph.A. from Stanford University, Dec. 1992.

Ambiguity Resolution on–the–fly–A Comparison of P Code and High Perfomance C/A Code, by Dr. Gerard Lachapelle, et al., Institute of Navigation, GPS–92, Albuquerque, NM, Sep. 1992.

Aircraft Applications of GPS–Based Attitude Determination, by Clark E. Cohen, et al., Institute of Navigation, GPS 92, Albuquerque, NM, Sep. 1992.

Kinematic GPS for Differential Positioning: Resolving Interger Ambiguities on the Fly, by Patrick Y. C. Hwang, GPS Papers published in Navigation, vol. 38, No. 1, Jan. 1991.

Application & Technical Notes, Real–Time Kinematic GPS Surveying Technical Overview, published by Trimble Navigation, Jan. 1992.

Instantaneous Ambiguity Resolution, by Ron Hatch, Paper Presented Sep. 11, 1990 at Banff, Canada at KIS Symposium 1990.

A GPS Precision Approach and Landing System, By Dr. Alison K. Brown, Inst. of Navigation, GPS–92, Albuquerque, NM, Sep. 1992, pp. 373–381.

The Application of Navstar Differential GPS in the Civilian Community, by Jacques Beser, et al., GPS Papers Published in Navigation, vol. 11, 1984, pp. 167–196.

The Use of Pseudo Satellites for Improving GPS Performance, by Dale Klein, et al., GPS Papers Published in Navigation, vol. III, 1986, pp. 135–146.

RTCM SC–104 Recommended Pseudolite Signal Specification, by Thomas A. Stansell, Jr., GPS Papers Published in Navigation, vol. III, 1986, pp. 117–134.

Site Surveyor, –Real–Time GPS Survey System, by Trimble Navigation, Oct. 1992.

Surveying and Mapping Products–System Surveyor, Series 4000, GPS Survey System, by Trimble Navigation, 1992.

Real–Time Cycle Ambiguity Resolution Using A Pseudolite for Precision Landing of Aircraft With GPS, by Clark E. Cohen, et al., Dept. of Aeronautics & Astronautics, Stanford University, Stanford, Ca, Presented at 2nd Intl. Symposium on Differential Satellite Navigation Systems, Mar. 30–Apr. 2, 1993, Amsterdam, The Netherlands.

Real–Time Flight Test Evaluation of the GPS Marker Beacon Concept for Category III Kinematic GPS Precision Landing, by Clark E. Cohen, et al., Stanford University, Presented at ION GPS–93, Sep. 22–24, 1993, Salt Lake City, Utah.

Landau, H., et al., "Precise Real–Time Differential GPS Positioning Using On–THe Fly Ambiguity Resolution", *Institute of Astronomical and Physical Geodesy University FAF Munich.*

Well, L. L., "Real–Time Missile Tracking with GPS", *Navigation,* vol. II:105–111 (1984).

Klein et al, "The Use of Pseudosatellites for Improving GPS Performance", GPS Papers published in *Navigation,* vol. III, 1986.

Stasnell, Jr., "RTCM SC–104 Recommended Pseudosatellite Signal Specification", GPS Papers published in *Navigation,* vol. III 1986.

SYSTEM AND METHOD FOR GENERATING PRECISE CODE BASED AND CARRIER PHASE POSITION DETERMINATIONS

The United States Government may have certain rights in any patent issuing from this application pursuant to Grant DOT93-G-004 between the U.S. Department of Commerce and Stanford University.

This application is a continuation of U.S. patent application Ser. No. 08/126,254 filed on Sep. 22, 1993 now abandoned, which is a continuation-in-part of U.S. patent application Ser. No. 08/036,319 filed Mar. 23, 1993 now abandoned.

FIELD OF THE INVENTION

The present invention relates generally to systems and methods for generating precise position determinations for any land, sea, air, or space vehicle. In particular, it pertains to aircraft landing systems and methods.

BACKGROUND OF THE INVENTION

There has traditionally been a need for systems and methods which allow a user to make extremely precise position determinations. In fact, a number of attempts have been made at developing these kinds of systems and methods. However, they all suffer from serious problems which render them unfeasible or inaccurate.

This is particularly true in the case of aircraft landing systems and methods. The current system, the Instrument Landing System (ILS), was developed decades ago and is very expensive to install and maintain.

A proposed alternative to ILS is the Microwave Landing System (MLS). It however is also expensive to install and maintain.

Other proposed alternatives are based on the Global Positioning System (GPS). GPS involves a constellation of 24 satellites placed in orbit about the Earth by the United States Department of Defense. Each satellite continuously broadcasts a GPS signal. This GPS signal contains an L-band carrier component (L1) transmitted at a frequency of 1.575 GHz. The L1 carrier component is modulated by a coarse acquisition (C/A) pseudo random (PRN) code component and a data component.

The PRN code provides timing information for determining when the GPS signal was broadcast. The data component provides information such as the satellite's orbital position. The carrier component allows a receiver to easily acquire the GPS signal.

Position determination using Conventional Code Based GPS is well known in the art. In Conventional Code Based GPS, a receiver makes range computations between an antenna coupled to the receiver and each of at least four GPS satellites in view. The receiver makes these computations based on phase measurements for the PRN code of each of the received GPS signals and the satellite orbital position information obtained from the data component of each GPS signal. By receiving four different GPS signals, the receiver can make fairly accurate position determinations.

However, Conventional Code Based GPS only allows a user to determine his actual location to within tens of meters. In applications such as aircraft landings, position accuracies of one foot must be achieved. Therefore, Conventional Code Based GPS is not suitable for these applications.

A more accurate version of GPS is Code Based (or Ordinary) Differential GPS. Various versions of Code Based Differential GPS are well known in the art. These versions involve the same kind of ranging computations as are made with Conventional Code Based GPS, except that a ground reference receiver at a precisely known location is utilized. Ideally, satellite ranging errors will affect the position determinations made by the user's receiver in the same way as they will the position determinations made by the nearby ground receiver. Since the location of the ground receiver is already known, the ground receiver can compare the position determination it has calculated with the actual known position. As a result, the ground receiver can accurately detect ranging errors.

From these errors, the ground receiver can compute suitable corrections which are transmitted by a traditional digital data link to the user's receiver. The user's receiver can then apply the corrections to its own ranging measurements so as to provide accurate real time position determinations.

Also, a ground based beacon or pseudolite (i.e. ground based pseudo satellite) can be used to transmit these error corrections along with an unassigned PRN code. The unassigned PRN code enables the user's receiver to make a redundant fifth ranging measurement for even greater precision. And, in some cases, it enables the user's receiver to make a necessary fourth ranging measurement where one of the other GPS signals has been lost.

However, these versions of Code Based Differential GPS suffer from several drawbacks which limit their use. First, as was indicated earlier, a digital data link is required for transmitting the differential corrections to the user's receiver. Since these corrections are transmitted in digital form, bit transmission errors could lead to serious position determination errors. Second, the latency of the data transmission could also lead to serious position determination errors since it often takes seconds to measure, package, transmit, demodulate, and unpackage the transmitted data stream. Furthermore, even if these problems are eliminated, position determinations using Code Based Differential GPS are only accurate to within several meters. Although such accuracy may be suitable for general navigation purposes, it is not suitable for aircraft landing applications, since, as indicated earlier, aircraft landing systems must be accurate to within a foot.

An extremely accurate form of GPS is Carrier Based Differential GPS. This form of GPS utilizes the 1.575 GHz carrier component of the GPS signal on which the PRN code and the data component are superimposed.

Current versions of Carrier Based Differential GPS involve generating position determinations based on the measured phase differences at two different antennas for the carrier component of a GPS signal. However, this technique initially requires determining how many integer wavelengths of the carrier component exist between the two antennas at a particular point in time. This is called integer ambiguity resolution.

A number of approaches currently exist for integer ambiguity resolution. However, all of them suffer from serious problems which render them unfit for precise position determinations in applications such as a aircraft landing.

One approach is Integer Searching using redundant measurements. This involves receiving more than the standard four GPS signals, in order to sort out the correct combination of integer ambiguities. The different combinations of integer candidates are systematically checked against a cost function until an estimated correct set is found. However, for search volumes of just a few meters, the checked combinations can number in the hundreds of millions. As a result, this approach has a propensity to arrive at wrong solutions. Furthermore, the configuration of the constellation of GPS satellites can only guarantee that four satellites will be in view at any given time. Therefore, any application requiring precise position determinations at any given time must not rely on redundant satellites for reliable resolution of the integer ambiguities.

Another approach is Narrow Correlator Spacing. This technique involves using the PRN code of the GPS signal to bound the integer ambiguities. However, a significant amount of the time it can yield position determination errors of as much as several meters. This does not provide the kind of consistency which is required in aircraft landing applications.

Still another approach is Dual Frequency Wide-Laning. This approach also utilizes a second GPS signal broadcast by each satellite. This second GPS signal has an L-band carrier component (L2) transmitted at a frequency of 1.227 GHz. The L2 carrier component and the L1 carrier component are difference so as to form a signal having an effective wavelength that is much longer than either of the two carrier components. From this signal, it is relatively easy to resolve the integer ambiguities. However, the L2 component is not available for civilian use. Although the denial of the second carrier component can be countermeasured with cross correlation technology, the performance of this type of technology is unproven and very expensive to implement.

One successful approach to integer ambiguity resolution is motion-based and has been utilized in static surveying applications. This approach involves taking a number of phase measurements while the user's antenna and the reference antenna are stationary. These phase measurements are made over a period of about an hour. The phase measurements made during the slowly changing geometry of the GPS satellites will reveal the integer ambiguities. But, in many situations in which precise position determinations are required, such as aircraft landing, it would be impractical to require the user's antenna to remain stationary for 15 minutes while the integer ambiguities are resolved.

Another motion-based approach has been used for aircraft attitude determination. It involves placing an antenna on the tail, on the fuselage, and on each wing tip. The antenna on the fuselage serves as the reference antenna. The integer ambiguities can be resolved in seconds by rotating the aircraft and taking several phase measurements. Taking the phase measurements during this rapid change in geometry with respect to the slowly changing GPS satellite geometry will reveal the integer ambiguities. However, since the reference antenna and the other antennas are fixed to the aircraft, this approach is limited to attitude determinations and is not suitable for precise position determinations for the aircraft itself.

OBJECTS OF THE INVENTION

It as an object of the present invention to provide a GPS system and method for making Code Phase Differential GPS position determinations without latency and without relying on code range measurements made by a reference receiver.

It is yet another an object of the invention to provide a reference GPS system that enables a mobile GPS system to make Code Phase Differential GPS position determinations without latency and without relying on code range measurements made by the reference system.

It is yet further an object of the invention to provide a mobile GPS receiver that makes Code Phase Differential GPS position determinations without latency and without relying on code range measurements made by a reference GPS system.

It is still another object of the invention to provide a Carrier Phase Differential GPS system and method for making precise position determinations to within centimeters of the exact location without latency and without relying on carrier phase measurements made by a reference receiver.

It is further an object of the invention to provide a reference GPS system that enables a mobile GPS system to make Carrier Phase Differential GPS position determinations to within centimeters of the exact location without latency and without relying on carrier phase measurements made by the reference system.

It is also an object of the invention to provide a mobile GPS receiver that makes Carrier Phase Differential GPS position determinations to within centimeters of the exact location without latency and without relying on carrier phase measurements made by a reference GPS system.

SUMMARY OF THE INVENTION

The foregoing and other objects of the invention are achieved by a GPS system that includes a GPS beacon that receives a plurality of GPS signals. Each of the GPS signals has carrier component and a pseudo-random code component. The beacon generates in response to the received GPS signals a plurality of beacon signals. Each of the plurality of beacon signals has a carrier component phase locked to one of the carrier components of the received GPS signals and a pseudo-random code component phase locked to one of the pseudo-random code components of the received GPS signals. The beacon then transmits the plurality of beacon signals.

The system also includes a GPS receiver. The GPS receiver can make Code Based Differential GPS position determinations by making range measurments for each of the pseudo-random code components of the GPS and beacon signals and in response computing values representing a position.

Additionally, the GPS receiver can make Carrrier Phase Differential GPS position determinations by first making phase measurments for each of the carrier components of the GPS and beacon signals at a plurality of measurment epochs during an initialization period. It then computes initialization values in response to these phase measurements for the GPS and beacon signals. Then, at a subsequent epoch after the initialization period, it computes a position in responsive to the initialization values and in response to the phase values for the GPS and beacon signals measured at the subsequent measurment epoch.

BRIEF DESCRIPTION OF THE DRAWINGS

The foregoing and other objects of the invention will become more apparent on reading the following detailed description and upon reference to the drawings, in which.

DETAILED DESCRIPTION OF THE INVENTION

FIGS. 1–26 provide illustrations of the invention described herein. In these figures, like components are designated by like numerals.

OVERVIEW

Figure 1:
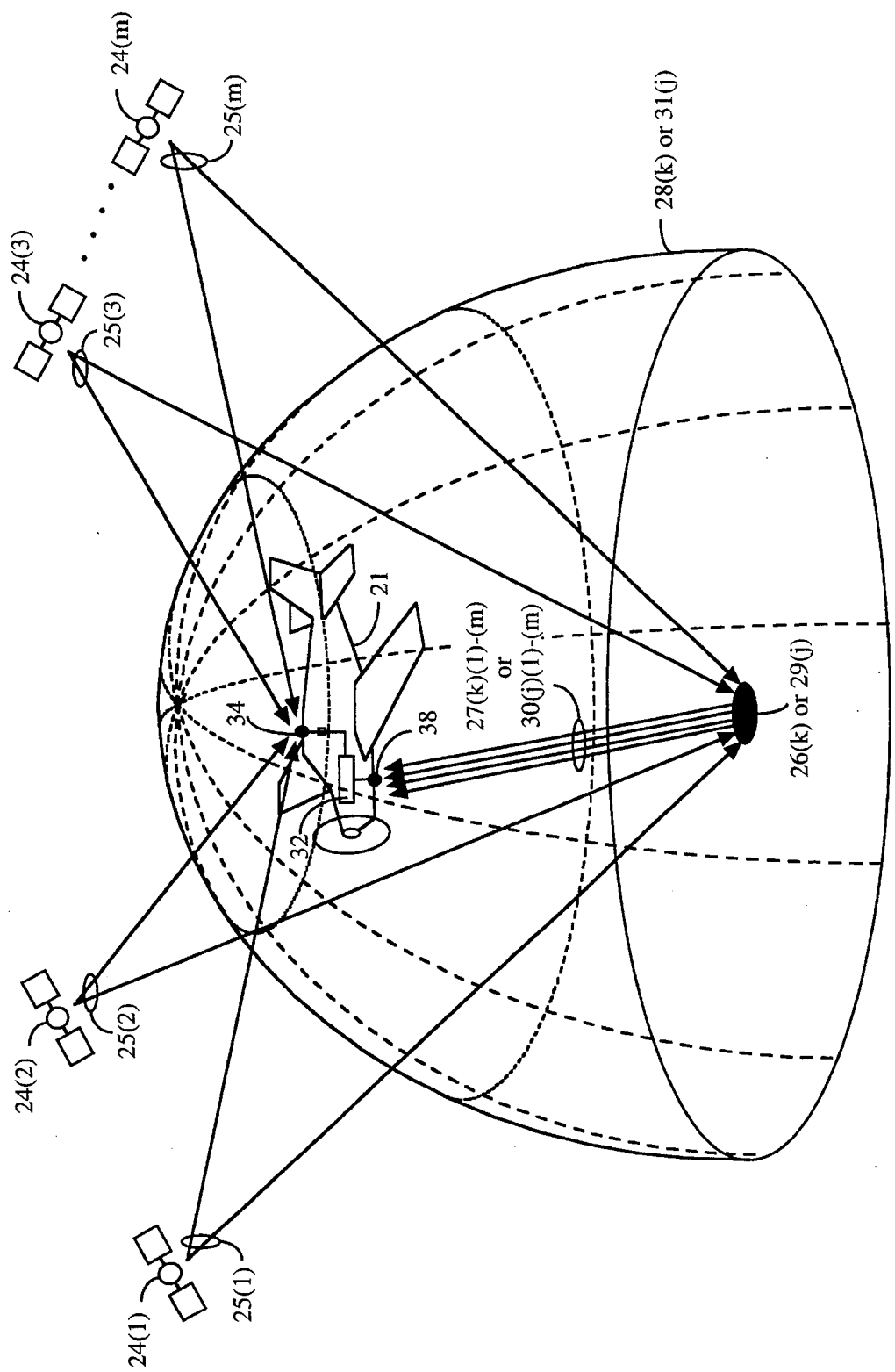
FIG. 1 shows an omni-marker beacon or pseudolite in accordance with the present invention.
Figure 2:
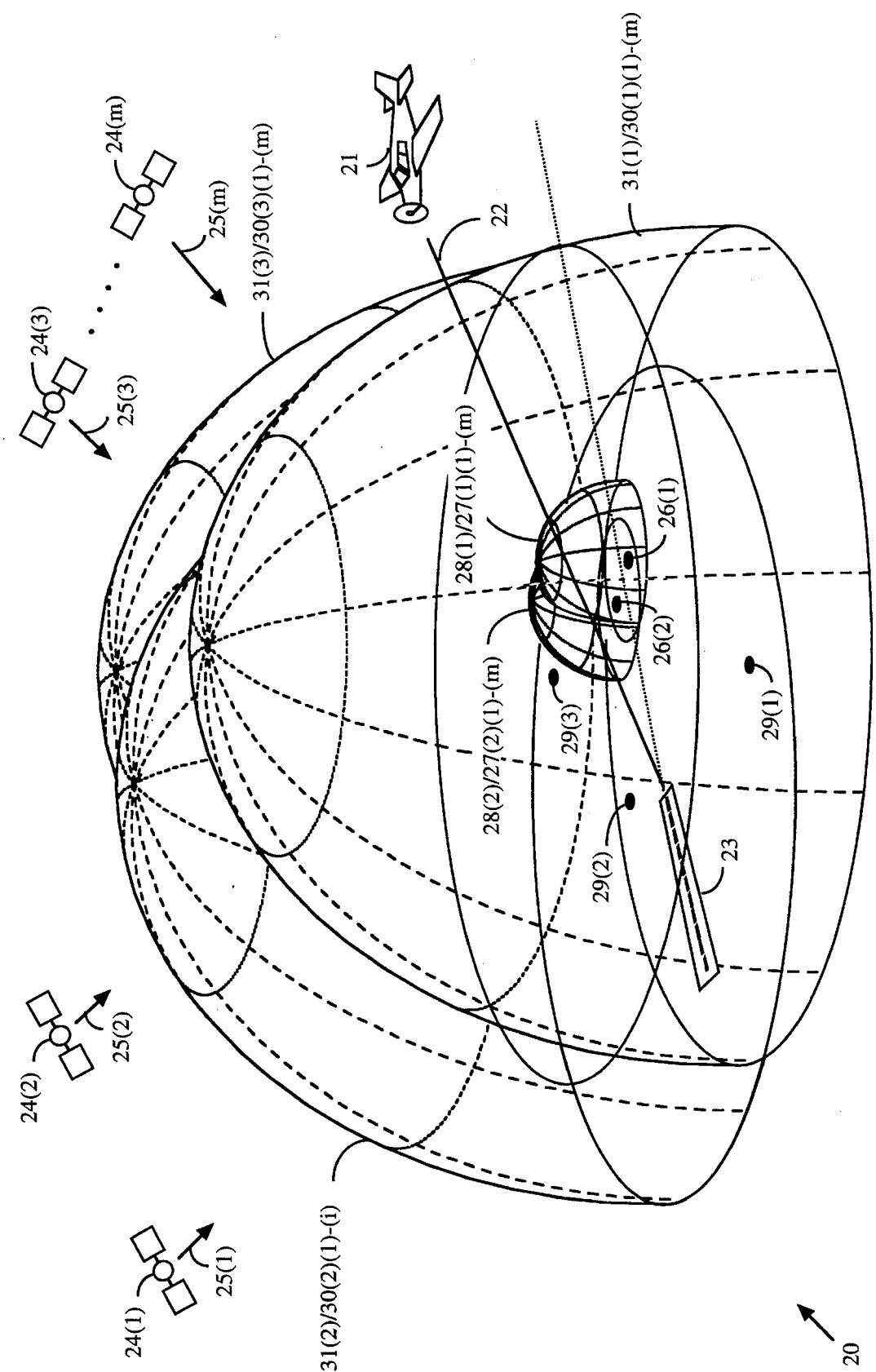
FIG. 2 shows a general view of a GPS system which employs two initialization omni-marker beacons and three reference omni-marker beacons.
Figure 3:
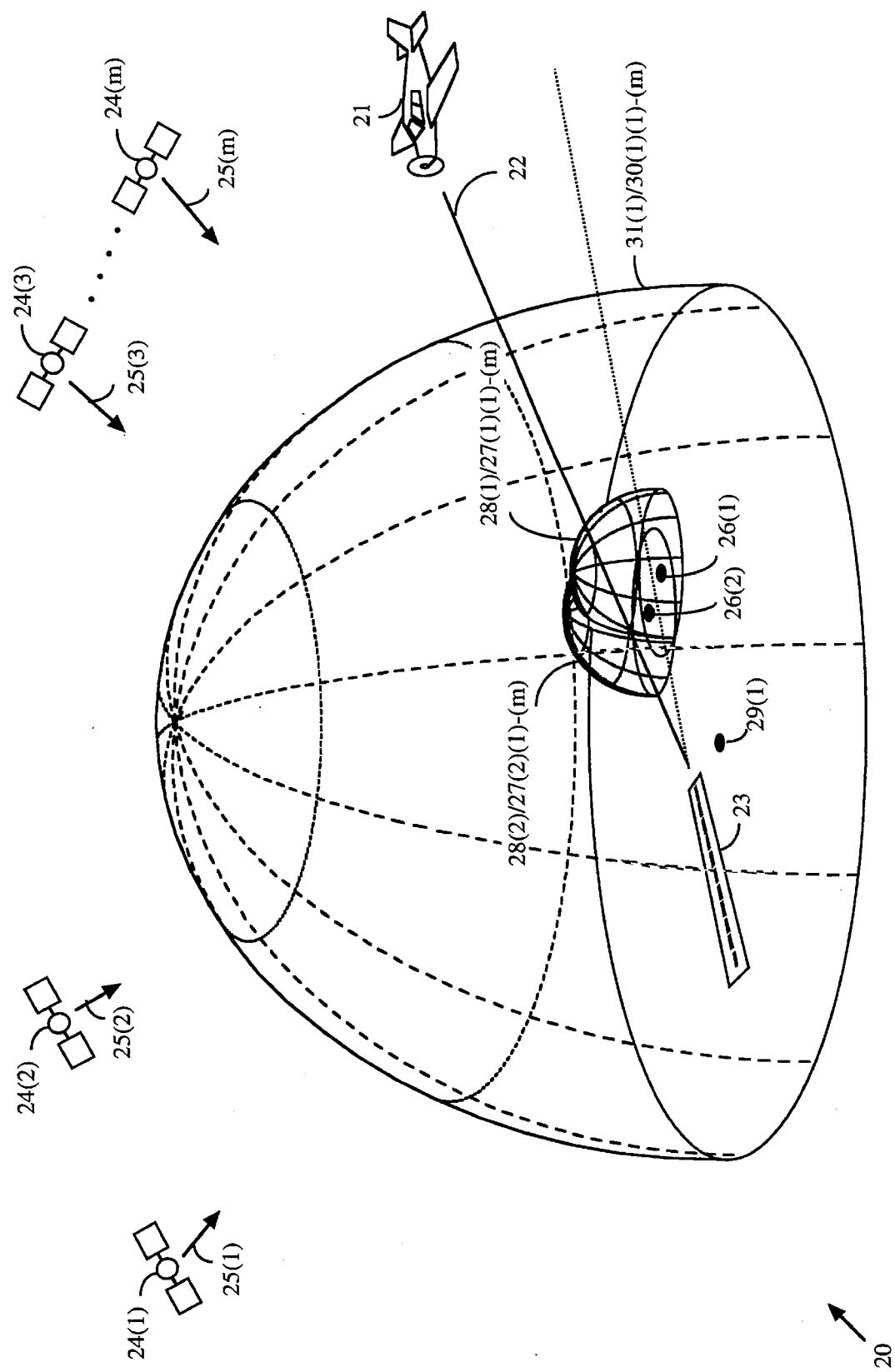
FIG. 3 shows a general view of a GPS system which employs two initialization omni-marker beacons and one reference omni-marker beacon.
Figure 4:
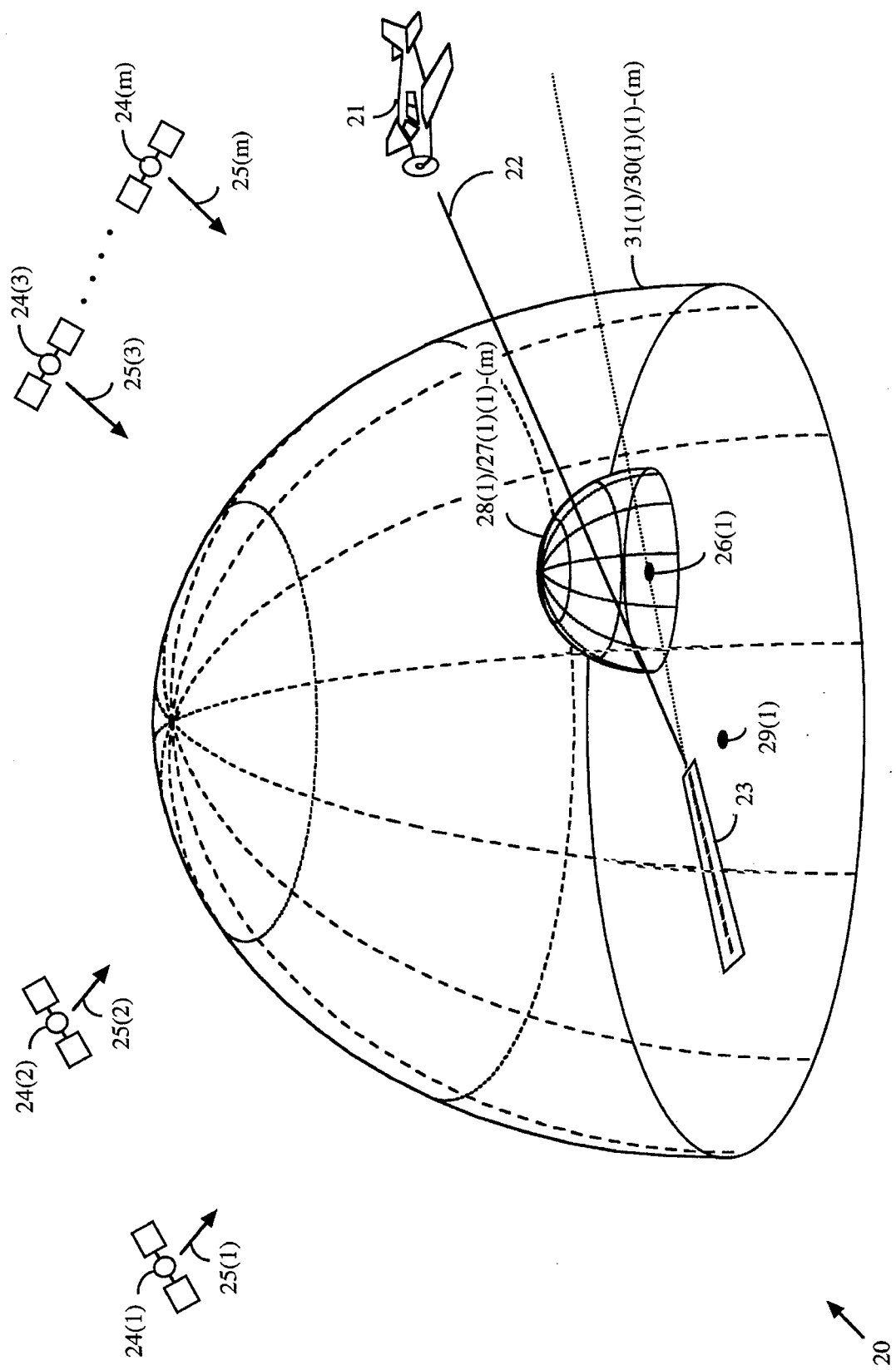
FIG. 4 shows a general view of a GPS system which employs one initialization omni-marker beacon and one reference omni-marker beacon.

FIG. 1 shows the $k^{th}$ omni-marker beacon 26(k) or the $j^{th}$ omni-marker beacon 29(j) of FIGS. 2–4. As will be evident shortly, the omni-marker beacon 26(k) or 29(j) is a specialized pseudolite (i.e. ground based satellite) and is located at a known location.

The omni-marker 26(k) or 29(j) receives the m GPS signals 25(1)–(m) respectively broadcast by the m GPS satellites 24(1)–(m). In response, it phase locks the carrier component and the PRN code component of each of the acquired GPS signals 25(1)–(m) and generates and transmits to airplane 21 the corresponding beacon marker signals 27(k)(1)–(m) or 30(j)(1)–(m) together in the form of a low power signal bubble 28 or 31. Each of the beacon marker signals 27(k)(1)–(m) or 30(j)(1)–(m) includes a carrier component that is phase locked to the carrier component of one of the corresponding received GPS signals 25(1)–(m) and also includes a unique PRN code component that is phase locked to and corresponds to the PRN code component of that same GPS signal 25(1)–(m). Thus, the out-going carrier and PRN code components of each of the beacon marker signals 27(k)(1)–(m) or 30(j)(1)–(m) is exactly phase coherent with respect to their incoming counterparts in the GPS signals 25(1)–(m).

The GPS position receiver 32 on board the airplane 21 then receives the GPS signals 25(1)–(m) and the beacon marker signals 27(k)(1)–(m) or 30(j)(1)–(m). As will be explained shortly, the receiver 32 can make Code Based Differential GPS position determinations and Carrier Phase Differential GPS position determinations based on these received signals without relying on the traditional digital data link for supplying differential corrections, PRN code range measurements, or carrier phase measurements made by a reference receiver.

Thus, as will be developed more fully later, the omni-marker beacon 26(k) or 29(j) serves as a channel for relaying information to position receiver 32 for making differential ranging corrections for both Code Based and Carrier Phase Differential GPS position determinations. In addition, it serves as the means for resolving cycle ambiguities for the Carrier Phase Differential GPS position determinations. Moreover, since a digital data link is not required, bit errors and latency cannot corrupt the integrity of the Code Based and Carrier Phase Differential GPS position determinations that position recover 32 can make.

SYSTEM AND METHOD

FIG. 2 shows the preferred configuration for a GPS system 20 that generates precise position determinations using Code Based or Carrier Phase Differential GPS. In these figures, an airplane 21 is on final approach trajectory 22 to runway 23. The m GPS satellites 24(1)–(m) at known orbital positions are in view and respectively broadcast the m GPS signals 25(1)–(m).

The GPS signals 25(1)–(m) are L1 C/A code GPS signals. In other words, they contain an L1 carrier component, a C/A PRN code, and a data component. The L1 carrier is a sinusoidal wave transmitted at a frequency of 1.575 GHz.

The PRN code comprises a series of variable width pulses broadcast at a frequency of 1.023 MHz. Each of the GPS satellites 24(1)–(m) transmits its own unique PRN code. The information in the data component of each GPS signal 25(1)–(m) includes the orbital position of the GPS satellite 24(1)–(m) which has broadcast it. This information is provided as a bit stream with a frequency of 50 bits per second.

Reference omni-marker beacons 29(1)–(3) are located at known positions around the runway 22. Omni-marker beacons 29(1)–(3) each separately generate and broadcast four beacon marker signals 30(1)(1)–(m), 30(2)(1)–(m), and 30(3)(1)–(m) in the form of low power signal bubbles 31(1)–(3) in the way described earlier.

Initialization omni-marker beacons 26(1)–(2) are located at known positions on each side of the horizontal component of flight trajectory 22. Omni-marker beacons 26(1)–(2) each separately generate and broadcast four beacon marker signals 27(1)(1)–(m) and 27(2)(1)–(m) in the form of low power signal bubbles 28(1)–(2) in the way described earlier. As is evident from FIG. 2, the beacon marker signals 27(1)(1)–(m) and 27(2)(1)–(m) are transmitted at even a lower power than are the beacon marker signals 30(1)(1)–(m), 30(2)(1)–(m), and 30(3)(1)–(m).

Figure 5:
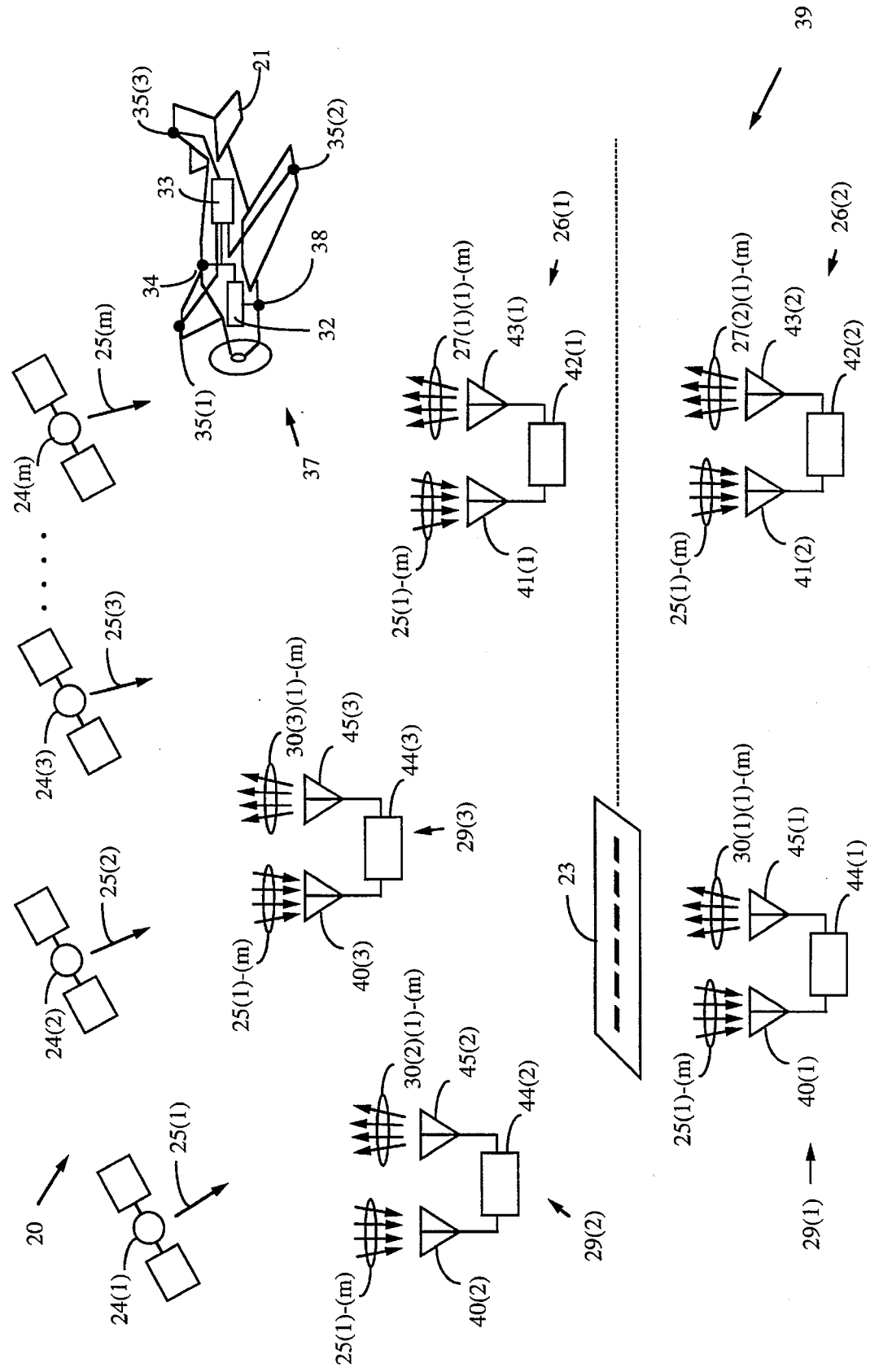
FIG. 5 shows a more detailed view of the GPS system shown in FIG. 2.

FIG. 5 shows a more detailed view of the GPS system 20 shown in FIG. 2. Located near runway 23 is a ground based GPS reference system 39. It includes the omni-marker beacons 26(1)–(2) and 29(1)–(3). The omni-marker beacons 26(1)–(2) respectively comprise receive antennas 41(1)–(2), transceivers 42(1)–(2), and transmit antennas 43(1)–(2). The omni-marker beacons 29(1)–(3) respectively comprise receive antennas 41(1)–(3), transceivers 44(1)–(3), and transmit antennas 45(1)–(3).

Each of the receive antennas 41(1)–(2) and 40(1)–(3) receives the GPS signals 25(1)–(m) and provides them to the corresponding transceivers 42(1)–(2) and 44(1)–(3). As was suggested earlier, each of the transceivers 42(1)–(2) and 44(1)–(3) phase locks the carrier component and the PRN code component of each of the acquired GPS signals 25(1)–(m). In response, transceivers 42(1)–(2) generate respectively the corresponding beacon marker signals 27(1)(1)–(m) and 27(2)(1)–(m) and transceivers 44(1)–(3) generate respectively the corresponding beacon marker signals 30(1)(1)–(m), 30(2)(1)–(m), and 30(3)(1)–(m).

As was mentioned earlier, each of the generated signals 27(1)(1)–(m), 27(2)(1)–(m), 30(1)(1)–(m), 30(2)(1)–(m), and 30(3)(1)–(m) includes a carrier component that is phase locked to the carrier component of the corresponding received GPS signal 25(1)–(m) and also includes a unique PRN code component that is phase locked to and corresponds to the PRN code component of the corresponding received GPS signal 25(1)–(m). In addition, each of these signals may also include a data component that provides important runway and airport status information and provides the position of the omni-marker beacon 26(1)–(2) or 29(1)–(3) that generated and transmitted the signal.

The generated signals 27(1)(1)–(m) and 27(2)(1)–(m) are respectively transmitted by the transmit antennas 43(1)-(2). The generated signals 30(1)(1)–(m), 30(2)(1)–(m), and 30(3)(1)–(m) are respectively transmitted by the transmit antennas 45(1)–(3).

In order to utilize existing GPS technology and methodology, the beacon marker signals 27(1)(1)–(m), 27(2)(1)–(m), 30(1)(1)–(m), 30(2)(1)–(m), and 30(3)(1)–(m) are L1 C/A GPS signals. In other words, the carrier components of these signals are all L1 band carrier waves generated and transmitted at a frequency of 1.575 GHz and the PRN code component of each of these signals is a C/A code repeated at a frequency of 1.023 KHz. Furthermore, if a data component is included with these signals, it is provided as a bit stream at a frequency of 50 bits per second. However, as one skilled in the art will appreciate, the signals 27(1)(1)–(m), 27(2)(1)–(m), 30(1)(1)–(m), 30(2)(1)–(m), and 30(3)(1)–(m) need not be limited to these L1 C/A GPS signals.

Moreover, in order to prevent confusion among receivers of the signals 25(1)–(m), 27(1)(1)–(m), 27(2)(1)–(m), and 30(1)–(m), the PRN code components of the beacon marker signals 27(1)(1)–(m), 27(2)(1)–(m), and 30(1)–(m) are distinct from one another and from the PRN code components of the GPS signal 25(1)–(m). Nevertheless, because of the earlier described PRN code phase locking performed by the omni-marker beacons 26(1)–(2) and 29, the PRN code components of the beacon marker signals 27(1)(1)–(m) respectively correspond to the PRN code components of the GPS signals 25(1)–(m), the PRN code components of the beacon marker signals 27(2)(1)–(m) respectively correspond to the PRN code components of the GPS signals 25(1)–(m), and the PRN code components of the beacon marker signals 30(1)–(m) respectively correspond to the PRN code components of the GPS signals 25(1)–(m).

Figure 6:
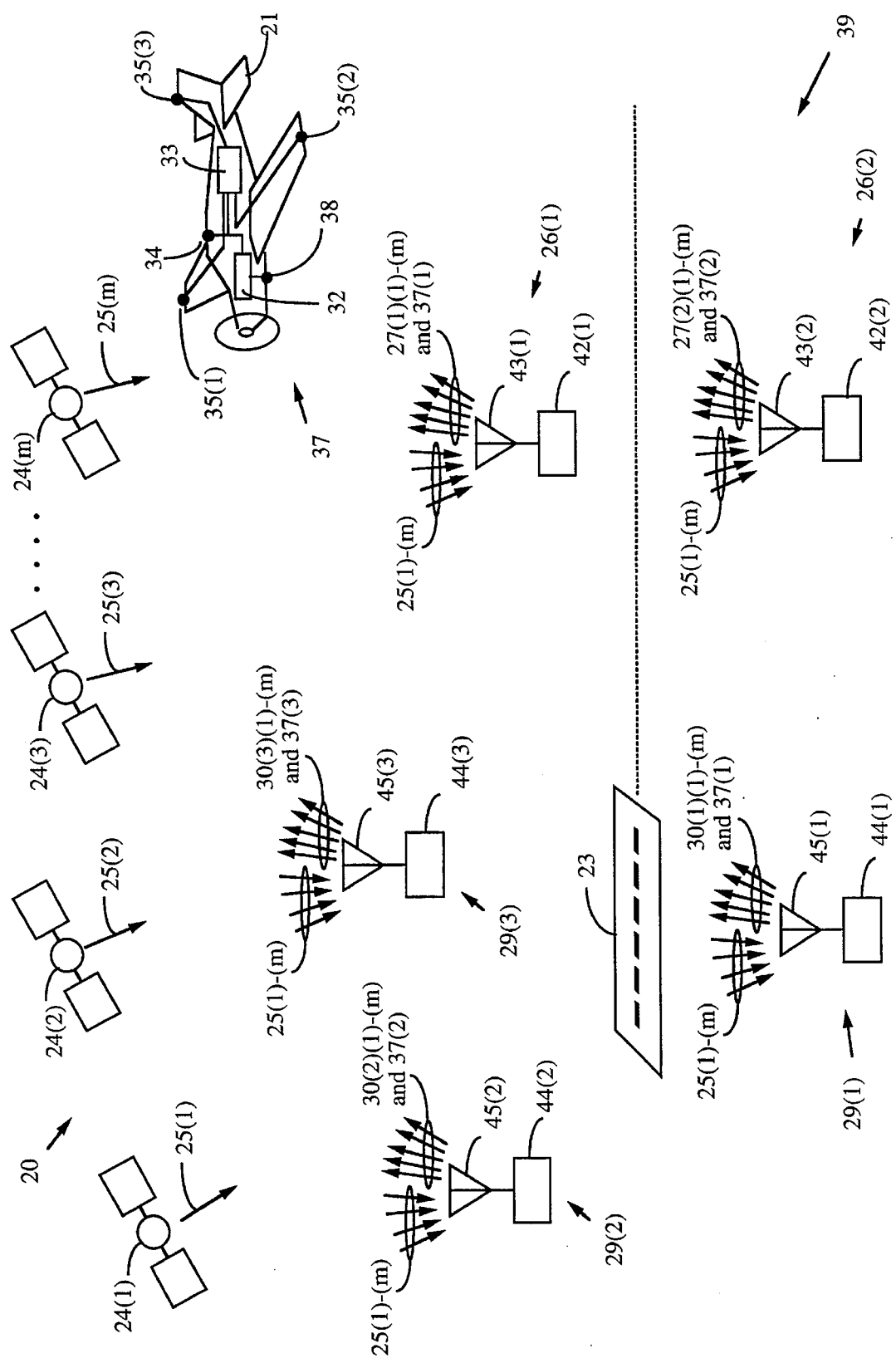
FIG. 6 shows an alternative configuration to that shown in FIG. 5.

FIG. 6 shows an alternative configuration for the ground reference station 39. In this configuration, the omni-marker beacons 26(1)–(2) respectively comprise collocated receive and transmit antennas 43(1)–(2) and transceivers 42(1)–(2) and the omni-marker beacons 29(1)–(3) comprise transceivers 44(1)–(3) and collocated receive and transmit antennas 45(1)–(3).

Each of the receive and transmit antennas 43(1)–(2) and 45(1)–(3) receives the GPS signals 25(1)–(m) and provides them to the corresponding transceivers 42(1)–(2) and 44(1)–(3). As with the configuration shown in FIG. 5, the transceivers 42(1)–(3) respectively each generate m corresponding beacon marker signals 27(1)(1)–(m), 27(2)(1)–(m), and 27(3)(1)–(m) and transceivers 44(1)–(3) respectively each generate m corresponding beacon marker signals 30(1)(1)–(m), 30(2)(1)–(m), and 30(3)(1)–(m).

As with the configuration of FIG. 5, each of the generated signals 27(1)(1)–(m), 27(2)(1)–(m), 30(1)(1)–(m), 30(2)(1)–(m), and 30(3)(1)–(m) includes a carrier component that is phase locked to the carrier component of the corresponding received GPS signal 25(1)–(m) and also includes a unique PRN code component that is phase locked to and corresponds to the PRN code component of same GPS signal 25(1)–(m). And, each of these signals may also include a data component that provides important runway and airport status information and also provides the position of the omni-marker beacon 26(1)–(2) or 29(1)–(3) that generated and transmitted the signal.

However, in this case, not only do the receive and transmit antennas 43(1)–(2) and 45(1)–(3) receive the GPS signals 25(1)–(m), but they respectively also transmit the beacon marker signals 27(1)(1)–(m), 27(2)(1)–(m), 30(1)(1)–(m), 30(2)(1)–(m), and 30(3)(1)–(m). Therefore, in order to provide frequency isolation between these transmitted signals and the received GPS signals, the phase locked L1 carrier components of the beacon marker signals 27(1)(1)–(m), 27(2)(1)–(m), 30(1)(1)–(m), 30(2)(1)–(m), and 30(3)(1)–(m) are translated into L2 carrier components having a frequency of 1.227 GHz and are then transmitted.

But, since the transceivers 42(1)–(2) and 44 have imperfect clocks, carrier phase ranging biases for Carrier Phase Differential GPS position determinations are introduced by the described frequency translation. In order to avoid this problem, the omni-marker beacons 26(1)–(2) and 29(1)–(3) respectively broadcast the additional signals 36(1)–(2) and 37(1)–(3) which include a unique PRN code component and an L2 carrier component that corresponds to the local oscillator signal used to up-convert it and the other beacon marker signals 27(1)(1)–(m), 27(2)(1)–(m), 30(1)(1)–(m), 30(2)(1)–(m), and 30(3)(1)–(m). Since position receiver 32 now receives this reference signal, it can make corrective computations to eliminate the error introduced by the frequency translation.

As in the configuration of FIG. 5, in the preferred embodiment, the PRN code component of each of these signals is a unique and distinct C/A code and the data component is provided as a bit stream at a frequency of 50 bits per second. However, the signals 27(1)(1)–(m), 27(2)(1)–(m), and 30(1)(1)–(m), 30(2)(1)–(m), and 30(3)(1)–(m) in this configuration need not be limited to L2 C/A GPS signals.

Referring to both FIGS. 5 and 6, mounted on airplane 21 is GPS mobile system 37 which includes GPS position receiver 32, GPS attitude receiver 33, GPS top side antenna 34, GPS attitude antennas 35(1)–(3), and GPS bottom side antenna 38. Each of the components 32–34, 35(1)–(3), and 38 of the GPS mobile system 37 is mobile. Furthermore, each of the antennas 34 and 35(1)–(3) receives GPS signals 25(1)–(m) and provides them to position receiver 32. Antenna 38 receives beacon marker signals 27(1)(1)–(m), 27(2)(1)–(m) 30(1)(1)–(m), 30(2)(1)–(m), and 30(3)(1)–(m) and provides them to position receiver 32.

Ordinary Code Based GPS Position Determinations

Referring back to FIG. 2, when airplane 21 is outside of signal bubbles 28(1)–(2) and 31(1)–(3), position receiver 32 it makes coarse position determinations for navigational purposes using Ordinary Code Based GPS. This, is due to the fact that antenna 34 receives the GPS signals 25(1)–(m) but antenna 38 does not yet receive any of the beacon marker signals 27(1)(1)–(m), 27(2)(1)–(m), 30(1)(1)–(m), 30(2)(1)–(m), and 30(3)(1)–(m) which, as will be explained later, can be used for both Code Based and Carrier Phase Differential GPS position determinations.

As was indicated earlier, each of the GPS signals 25(1)–(m) has a unique PRN code component. The GPS satellites 24(1)–(m) each have an atomic clock and generate the PRN code components for the GPS signals 25(1)–(m) with reference to the common time base of GPS system time. Furthermore, position receiver 32 internally generates the PRN code components for the GPS signals 25(1)–(m) with reference to GPS system time as well.

The position receiver 32 compares periodically the PRN code components that it has generated internally with the corresponding PRN code components of the GPS signals 25(1)–(m) received by antenna 34. The fractional wavelength phase difference needed to match the received and generated PRN codes is then measured and computed in terms of distance and added to an integer wavelength component. Since the digital data in the data component of the GPS signals 25(1)–(m) is changes at a rate of 1.023 MHz commensurate with the frequency at which the PRN code is repeated, the integer wavelength component is conventional calculated based on this change in polarity. The total of the fractional wavelength component and the integer wavelength component is computed by the position receiver 32 and issued as the well known pseudo range between the receive antenna 34 and the particular GPS satellite 24(1)–(m) which broadcast the GPS signal 25(1)–(m) which was measured. In the preferred embodiment, these range measurements are issued at a rate of between 1–10 Hz with each cycle constituting a measurement epoch.

Figure 7:
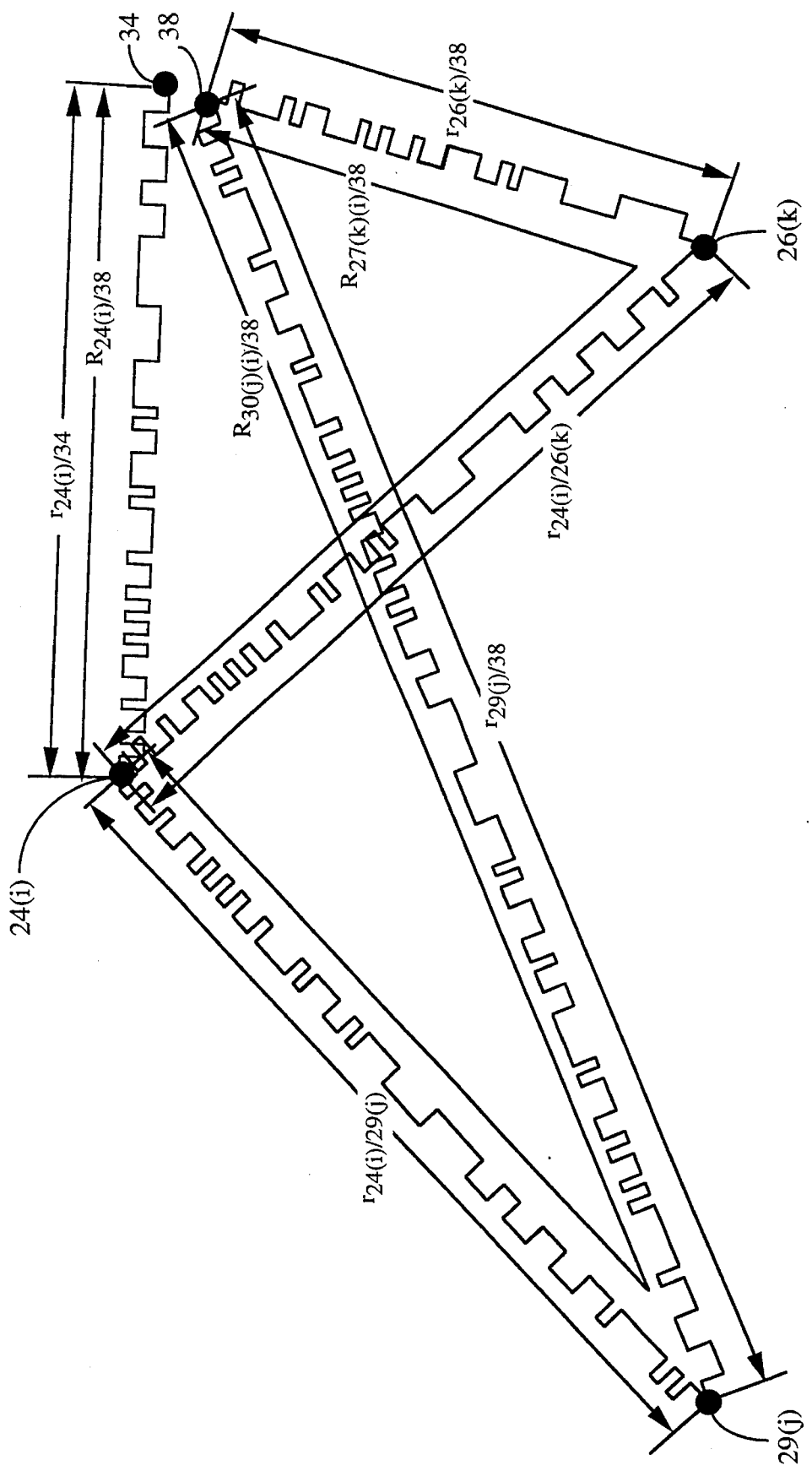
FIG. 7 provides an illustration of the operation of the omni-markers of FIGS. 2–6 for Code Based Differential GPS.

As shown in FIG. 7, the computed PRN code range measurement $R_{25(i)/34}$ at each measurement epoch for the PRN code component of GPS signal $25(i)$ (i.e. the $i^{th}$ of the GPS signals 25(1)–(m)) is an estimate (i.e. the pseudo range) of the actual unknown range $r_{24(i)/34}$ between the transmit antenna of GPS satellite $24(i)$ and antenna 34.

The clocks of the GPS satellites 24(1)–(m) and the position receiver 32 may vary slightly from GPS system time. This means that the PRN code components generated by the GPS satellites and the PRN code components generated internally by the position receiver 32 may be slightly out of phase with respect to GPS system time. As a result, the PRN code range measurements $R_{25(i)/34}$ for these PRN code components at each measurement epoch are not exact. Thus, at each measurement epoch, the receiver 32 has clock synchronization error $\Delta T_{32}$ and the signal generator of GPS satellite $24(i)$ has a clock synchronization error $\Delta T_{24(i)}$.

The relationship between $R_{25(i)/34}$ and $r_{24(i)/34}$ is provided as follows in Equation (1):

$$R_{25(i)/34} = r_{24(i)/34} + \Delta T_{32} - T_{24(i)} \quad (1)$$

where $\Delta T_{32} - \Delta T_{24(i)}$ represents the total clock synchronization error of GPS system 20.

Figure 8:
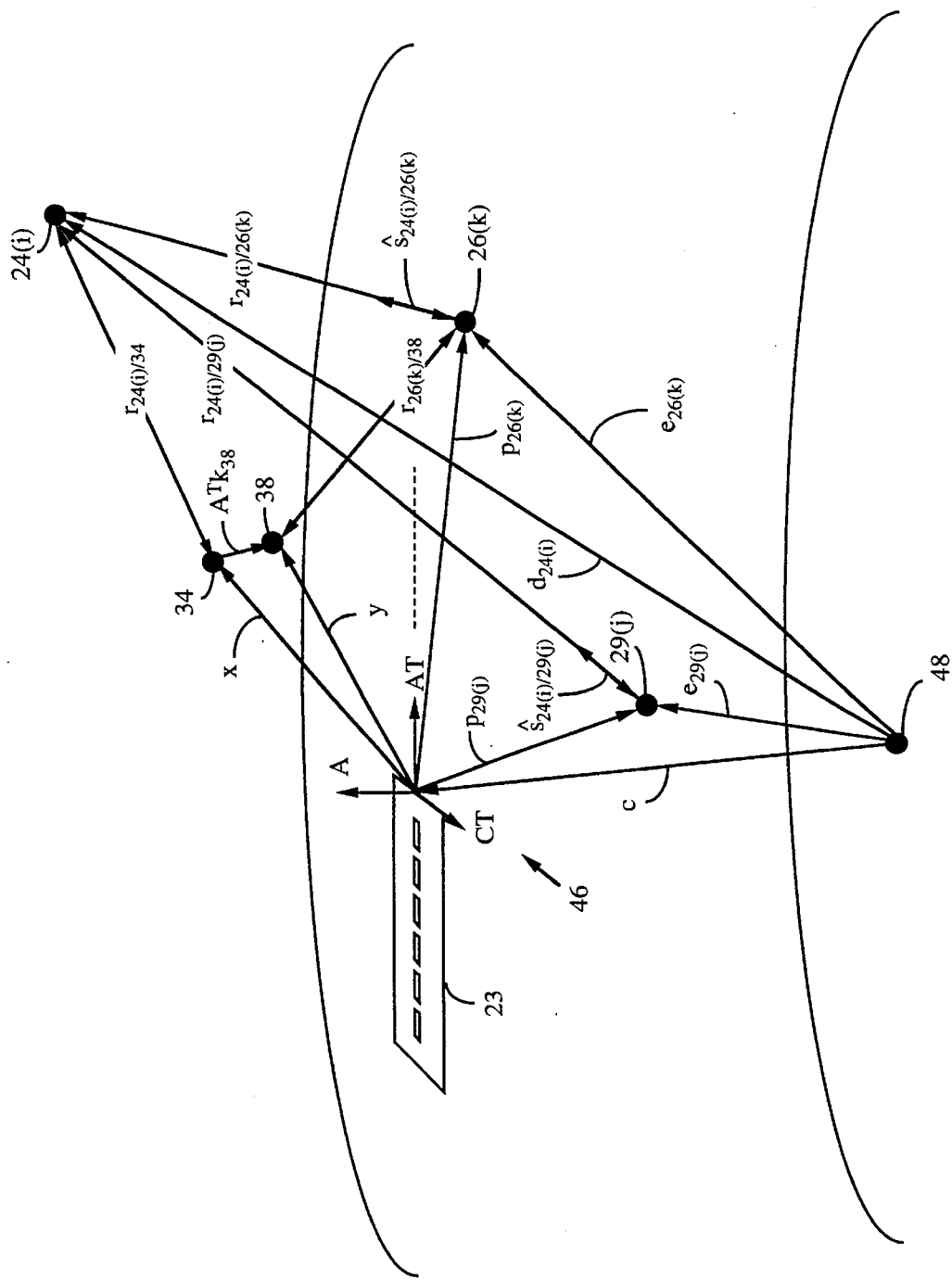
FIG. 8 shows the vector relationships associated with the configurations of FIGS. 2–6.

Referring to FIG. 8, in order to make proper position determinations for airplane 21 relative to the beginning of runway 23, Equation (1) must be manipulated so as to include the vector relationships c, d, and x associated with the range $R_{24(i)/34}$. For convenience and consistency, these relationships are established with respect to the runway coordinate system 46 associated with the threshold of runway 23. Coordinate system 46 is defined by the along track AT, cross track CT, and altitude A coordinates.

The position of the beginning of runway 23 with respect to the center of the Earth 48 is known and represented by the vector c [3×1] provided as follows in Equation (2):

$$c = \begin{bmatrix} c_{AT} \\ c_{CT} \\ c_A \end{bmatrix} \quad (2)$$

where $c_{AT}$, $c_{CT}$, and $c_A$ are respectively the along track, cross track, and altitude distances between the beginning of runway 23 and the center of the Earth 48. The vector c is known through precision surveying techniques and is stored by the position receiver 32.

The position of top side antenna 34 with respect to the beginning of the runway 23 is unknown and represented by the vector x [3×1] provided as follows in Equation (3):

$$x = \begin{bmatrix} x_{AT} \\ x_{CT} \\ x_A \end{bmatrix} \quad (3)$$

where $x_{AT}$, $x_{CT}$, and $x_A$ are respectively the along track, cross track, and altitude distances between antenna 34 and the center of the Earth 48. As will be explained shortly, the vector x is computed at each measurement epoch.

The position of the GPS satellite $24(i)$ with respect to the center of the Earth 48 is known and represented by the vector $d_{24(i)}$ [3×1] provided as follows in Equation (4):

$$d_{24(i)} = \begin{bmatrix} d_{24(i)/AT} \\ d_{24(i)/CT} \\ d_{24(i)/A} \end{bmatrix} \quad (4)$$

where $d_{24(i)/AT}$, $d_{24(i)/CT}$, and $d_{24(i)/A}$ are respectively the along track, cross track, and altitude distances between the GPS satellite $24(i)$ and the center of the Earth 48. The vector d is provided by the data component of the corresponding GPS signal $25(i)$ received by antenna 34 and provided to receiver 32.

From the preceding vector relationships, the following mathematical relationships in Equation (6) may be established:

$$r_{24(i)/34} = |d_{24(i)} - c - x| \quad (6)$$

Equation (6) can be combined with Equation (1) to establish the phase relationship provided in Equation (7):

$$R_{25(i)/34} = |d_{24(i)} - c - x| + \Delta T_{32} - \Delta T_{24(i)} \quad (7)$$

Equation (7) may then be linearized for each measurement epoch to provide the following relationship in Equation (8):

$$R_{25(i)/34} = \left( \frac{(d - c - x_0)}{|d - c - x_0|} \right) \delta x + |d - c - x_0| + \Delta T_{32} - \Delta T_{24(i)} \quad (8)$$

where (A) $x_0$ is an estimate for the precise position vector x at each measurement epoch calculated by receiver 32, and (B) $\delta x$ is the vector at each measurement epoch which represents the unknown precise difference between the unknown precise vector x and the estimate $x_0$. The initial guess for vector $x_0$ may be the vector x computed at the previous epoch.

The relationship between the vectors x and $x_0$ and the vector $\delta x$ is represented as follows in Equation (9):

$$\delta x = x - x_0 \quad (9)$$

Furthermore, the vector $\delta x$ can be expressed as follows in Equation (10):

$$\delta x = \begin{bmatrix} \delta x_{AT} \\ \delta x_{CT} \\ \delta x_A \end{bmatrix} \quad (10)$$

where $\delta x_{AT}$, $\delta x_{CT}$, and $\delta x_A$ represent respectively at each measurement epoch the unknown precise difference between the vectors x and $x_0$ in the along track, cross track, and altitude distances.

As was indicated earlier, at least four of the GPS satellites $24(1)-(m)$ are usually in view. Thus, receiver 32 makes at least four range measurements $R_{25(i)/34}$ at each measurement epoch. As a result, it can stack at each measurement epoch the at least four equations generated from Equation (8) in matrix form for solving for the vector $\delta x$ and the total clock synchronization error $\Delta T_{32} - \Delta T_{41}$. The vector x is then computed using the relationship established in Equation (10).

The vector x is then iteratively computed using a least squares fit at each measurement epoch for greater precision. In other words, position receiver 32 takes vector x computed from the previous iteration and substitutes it as the estimate $x_0$ in Equation (8). The unknown vector $\delta x$ is again used to compute the updated vector x. this process is repeated until the vector x is computed to within a desired tolerance.

A way of adding accuracy to the computation of the vector $\delta x$ at each measurement epoch is to utilize additional GPS satellites $24(i)$ when they are in view. Thus, the PRN code range measurements $R_{25(i)/34}$ for the additional GPS signal $25(i)$ are also made by receiver 32 at each measurement epoch. As a result, additional equations will be generated by receiver 32 from Equation (8) at each measurement epoch for solving the vector $\delta x$ and the total clock synchronization error $\Delta T_{32} - \Delta T_{41}$. Thus, the system and method benefit from the over-determined set of unknowns.

Code Based Differential GPS Position Determinations

Referring to FIG. 2, as was indicated earlier, when airplane 21 is inside one or more of the signal bubbles $31(1)-(3)$ but outside of signal bubbles $28(1)-(2)$, position receiver 32 makes accurate position determinations using Code Based Differential GPS for navigational purposes. In this situation, position receiver 32 can make these position determinations based on range measurements for the PRN code components of the received GPS signals $25(1)-(m)$ and the received beacon marker signals $30(1)(1)-(m)$, $30(2)(1)-(m)$, and/or $30(2)(1)-(m)$.

Furthermore, when airplane 21 is inside signal bubbles $28(1)-(2)$ and $31(1)-(3)$, position receiver 32 makes position determinations using Code Based Differential GPS not only for navigational purposes, but also for initializing receiver 32 to make precise position determinations using Carrier Phase Differential GPS. In this situation, position receiver 32 can make these position determinations based on range measurements for the PRN code components of the received GPS signals $25(1)-(m)$ and the received beacon marker signals $27(1)(1)-(m)$, $27(2)(1)-(m)$, $30(1)(1)-(m)$, $30(2)(1)-(m)$, and/or $30(3)(1)-(m)$.

In both situations, the Code Phase Differential position determinations can be computed in two ways without requiring the traditional digital data link that provides differential corrections or range measurements made by a reference receiver. The first method is to utilize the received beacon marker signals $27(1)(1)-(m)$, $27(2)(1)-(m)$, $30(1)(1)-(m)$, $30(2)(1)-(m)$, and/or $30(2)(1)-(m)$ for PRN code ranging between the bottom side antenna 38 and the omni-marker beacons $26(1)-(2)$ and $29(1)-(3)$ and for relaying the information needed to compute Code Based Differential GPS positioned determinations. The second method is to only utilize these signals for relaying the information needed to compute Code Based Differential GPS positioned determinations. These two methods are discussed in detail later.

As was indicated earlier, each of the GPS signals $25(1)-(m)$ and the beacon marker signals $27(1)(1)-(m)$, $27(2)(1)-(m)$, $30(1)(1)-(m)$, $30(2)(1)-(m)$, and $30(3)(1)-(m)$ has a unique PRN code component. Furthermore, in addition to the internally generated PRN code components for the GPS signals $25(1)-(m)$, position receiver 32 also generates internally the PRN code components for the beacon marker signals $27(1)(1)-(m)$, $27(2)(1)-(m)$, $30(1)(1)-(m)$, $30(2)(1)-(m)$, and $30(3)(1)-(m)$ with reference to GPS system time.

The position receiver 32 compares periodically the PRN code components that it has generated internally with the corresponding PRN code components of the GPS signals $25(1)-(m)$ received by antenna 34 and the beacon marker signals $27(1)(1)-(m)$, $27(2)(1)-(m)$, $30(1)(1)-(m)$, $30(2)(1)-(m)$, and $30(3)(1)-(m)$ received by antenna 38. As was stated earlier, the fractional wavelength phase difference needed to match the received and generated PRN codes is then computed in terms of distance and added to the conventionally determined integer wavelength component to form the pseudo range measurement. As was also stated earlier, in the preferred embodiment, these range measurements are issued at rate of between 1–10 Hz with each cycle being a measurement epoch.

Referring again to FIG. 7, as was indicated earlier, the PRN code components of the beacon marker signals $27(1)(1)$–$(m)$, $27(2)(1)$–$(m)$, $30(1)(1)$–$(m)$, $30(2)(1)$–$(m)$, and $30(3)(1)$–$(m)$ are phase locked to the corresponding PRN code components of the GPS signals $25(1)$–$(m)$ received by the omni-marker beacons $27(1)$–$(2)$ and $29(1)$–$(3)$.

As a result, the computed PRN code range measurement $R_{27(k)(i)/38}$ for the PRN code component of the beacon marker signal $27(k)$ (i) (i.e. the $i^{th}$ of the beacon marker signals $27(1)(1)$–$(m)$ or $27(2)(1)$–$(m)$ broadcast by the $k^{th}$ of the omni-marker pseduolites $26(1)$–$(2)$ and phased locked to the $i^{th}$ of the GPS signals $25(1)$–$(m)$) is an estimate (i.e. the pseudo range) of the actual unknown range $r_{24(i)/26(k)}$ between GPS satellite $24(i)$ and the omni-marker beacon $26(k)$ plus the actual unknown range $r_{26(k)/38}$ between omni-marker beacon $26(k)$ and the antenna $38$.

Similarly, the computed range measurement $R_{30(i)(j)/38}$ for the PRN code component of the beacon marker signal $30(i)$ (j) (i.e. the $i^{th}$ of the beacon marker signals $30(1)(1)$–$(m)$, $30(2)(1)$–$(m)$, or $30(3)(1)$–$(m)$ broadcast by the $j^{th}$ of the omni-marker pseduolites $30(1)$–$(3)$ and phased locked to the $i^{th}$ of the GPS signals $25(1)$–$(m)$) is an estimate (i.e. the pseudo range) of the actual unknown range $r_{24(i)/29(j)}$ between GPS satellite $24(i)$ and the omni-marker beacon $29(j)$ plus the actual unknown range $r_{29(j)/38}$ between omni-marker beacon $29(j)$ and the antenna $38$.

As was mentioned earlier, since the clocks of the GPS satellites $24(1)$–$(m)$ and the position receiver $32$ may vary slightly from GPS system time, the position receiver $32$ has clock synchronization error $\Delta T_{32}$ at each measurement epoch and the signal generator of GPS satellite $24(i)$ has a clock synchronization error $\Delta T_{24(i)}$ at each measurement epoch. Therefore, as was also indicated earlier, the PRN code components generated by the GPS satellites and the PRN code components generated by the position receiver $32$ are slightly out of phase with respect to GPS system time. Moreover, since the PRN code components of generated by the omni-marker beacons 2 $6(1)$–$(2)$ and 2 $9(1)$–$(3)$ are phase locked to the PRN code components received from the GPS satellites $24(1)$–$(m)$, they are also slightly out of phase with respect to GPS system time. Thus, not only are the PRN code range measurements $R_{25(i)/34}$ at each measurement epoch not exact, so are the PRN code range measurements $R_{27(k)(i)/38}$ and $R_{30(i)(j)/38}$.

The relationship between $R_{30(i)(j)/38}$, $r_{24(i)/29(j)}$, and $r_{29(j)/38}$, and the relationship between $R_{27(k)(i)/38}$, $r_{24(i)/26(k)}$, and $r_{26(k)/38}$ are provided as follows in Equations (11) and (12) respectively:

$$R_{30(i)(j)/38}=r_{24(i)/29(j)}+r_{29(j)/38}+\Delta T_{32}-\Delta T_{24(i)} \quad (11)$$

$$R_{27(k)(i)/38}=r_{24(i)/26(k)}+r_{26(k)/38}+\Delta T_{32}-\Delta T_{24(i)} \quad (12)$$

As was mentioned earlier, one method for computing Code Based Differential GPS position determinations utilizes the received beacon marker signals $27(1)(1)$–$(m)$, $27(2)(1)$–$(m)$, or $30(1)$–$(m)$ for PRN code ranging between the bottom side antenna $38$ and the omni-marker beacons $26(1)$–$(2)$ and $29(1)$–$(3)$. In this method, Equation (1) can be difference with Equation (11) for when airplane $21$ is inside one or more of the signal bubbles $31(1)$–$(3)$ shown in FIG. 2 and receives the beacon marker signals $30(1)(1)$–$(m)$, $30(2)(1)$–$(m)$, and $30(3)(1)$–$(m)$. The single difference PRN code range relationship formed from this difference is provided as follows in Equation (13):

$$R_{25(i)/30(i)(j)}=r_{24(i)/34}-r_{24(i)/29}-r_{29/38} \quad (13)$$

where $R_{25(i)/30(i)(j)}$ represents the difference between the PRN code range measurement $R_{25(i)/34}$ for the $i^{th}$ of the GPS signals $25(1)$–$(m)$ and the corresponding PRN code range measurement $R_{30(i)(j)/38}$ for the $i^{th}$ of the beacon marker signals $30(1)(1)$–$(m)$, $30(2)(1)$–$(m)$, and $30(3)(1)$–$(m)$ phase locked to the corresponding $i^{th}$ of the GPS signals $25(1)$–$(m)$ and broadcast by the $k^{th}$ of the reference omni-markers $29(1)$–$(3)$. It is important to note that differencing Equations (1) and (12) removes the total clock synchronization error $\Delta T_{32}$–$\Delta T_{24(i)}$ from Equation (14).

Furthermore, in this method, Equation (1) can be difference with Equation (12) for when airplane $21$ is inside of signal bubbles $28(1)$–$(2)$ as shown in FIG. 3 and receives the beacon marker signals $27(1)(1)$–$(m)$ and $27(2)(1)$–$(m)$. The single difference PRN code range relationship formed from this difference is provided as follows in Equation (14):

$$R_{25(i)/27(k)(i)}=r_{24(i)/34}-r_{24(i)/26(k)}-r_{26(k)/38} \quad (14)$$

where $R_{25(i)/27(k)(i)}$ represents the difference between the PRN code phase measurement $R_{25(i)/34}$ for the $i^{th}$ of the GPS signals $25(1)$–$(m)$ and the corresponding PRN code phase measurement $R_{27(k)(i)/38}$ for the $i^{th}$ of the beacon marker signals $27(1)(1)$–$(m)$ and $27(2)(1)$–$(m)$ that is broadcast by the $k^{th}$ of the omni-marker beacons $26(1)$–$(2)$ and is phase locked to the corresponding $i^{th}$ of the GPS signals $25(1)$–$(m)$. Similar to Equation (13), by differencing Equations (1) and (12) the total clock synchronization error $\Delta T_{32}$–$\Delta T_{24(i)}$ has been removed from Equation (14).

Turning to FIG. 8 again, in order to make proper Code Based Differential GPS position determinations for airplane $21$ relative to the threshold (i.e. beginning) of runway $23$, Equations (13) and (14) must be manipulated so as to include the vector relationships x, y, $\hat{s}_{24(i)/26(k)}$, $\hat{s}_{24(i)/29(j)}$, $p_{26(k)}$, $p_{29(j)}$, and $A^T k_{38}$ associated with the ranges $r_{24(i)/34}$, $r_{24(i)/29(j)}$, $r_{29(j)/38}$, $r_{24(i)/26(k)}$, and $r_{26(k)/38}$. Once again, these relationships are established with respect to the runway coordinate system $46$ associated with the threshold of runway $23$.

As was the case with the discussion regarding Ordinary Code Based GPS position determinations, the position of top side antenna $34$ with respect to the runway $23$ threshold is unknown and represented by the vector x as represented in Equation (3).

The position of bottom side antenna $38$ with respect to the runway $23$ threshold is also unknown and represented by the vector y [3×1] provided as follows in Equation (15):

$$y=\begin{bmatrix} y_{AT} \\ y_{CT} \\ y_A \end{bmatrix} \quad (15)$$

where $y_{AT}$, $y_{CT}$, and $y_A$ are respectively the along track, cross track, and altitude distances between antenna $38$ and the runway $23$ threshold.

The position of omni-marker beacons $29(j)$ and $26(k)$ relative to the beginning of runway $23$ are known and represented by the position vectors $p_{29(j)}$ [3×1] and $p_{26(k)}$ [3×1] provided as follows in Equations (16) and (17) respectively:

$$p_{29(j)} = \begin{bmatrix} p_{29(j)/AT} \\ p_{29(j)/CT} \\ p_{29(j)/A} \end{bmatrix} \quad (16)$$

$$p_{26(k)} = \begin{bmatrix} p_{26(k)/AT} \\ p_{26(k)/CT} \\ p_{26(k)/A} \end{bmatrix} \quad (17)$$

where $p_{29(j)/AT}$, $p_{29(j)/CT}$, and $p_{29(j)/A}$ are respectively the along track, cross track, and altitude distances between omni-marker beacon $29(j)$ and the beginning of runway 23 and $p_{26(k)/AT}$, $p_{26(k)/CT}$, and $p_{26(k)/A}$ are respectively the along track, cross track, and altitude distances between omni-marker beacon $26(k)$ and the beginning of runway 23. These vectors are known through precision surveying techniques and are either stored by the position receiver 32 or provided to position receiver 32 in the data components of the beacon marker signals $30(1)(1)-(m)$, $30(2)(1)-(m)$, $30(3)(1)-(m)$, $27(1)(1)-(m)$, and $27(2)(1)-(m)$.

The known directions to GPS satellite $24(i)$ relative to omni-marker beacons 29 and $26(k)$ are represented by the unit direction vectors $\hat{s}_{24(i)/29(j)}$ [3×1] and $\hat{s}_{24(i)/26(k)}$ [3×1] provided as follows in Equations (18) and (19) respectively:

$$\hat{s}_{24(i)/29(j)} = \begin{bmatrix} \hat{s}_{24(i)/29(j)/AT} \\ \hat{s}_{24(i)/29(j)/CT} \\ \hat{s}_{24(i)/29(j)/A} \end{bmatrix} \quad (18)$$

$$\hat{s}_{24(i)/26(k)} = \begin{bmatrix} \hat{s}_{24(i)/26(k)/AT} \\ \hat{s}_{24(i)/26(k)/CT} \\ \hat{s}_{24(i)/26(k)/A} \end{bmatrix} \quad (19)$$

where $s_{24(i)/29(j)/AT}$, $s_{24(i)/29(j)/CT}$, $s_{24(i)/29(j)/A}$ are respectively the unit along track, cross track, and altitude distances to GPS satellite $24(i)$ with respect to omni-marker beacon $29(j)$ and $s_{24(i)/26(k)/AT}$, $s_{24(i)/26(k)/CT}$, $s_{24(i)/26(k)/A}$ are respectively the unit along track, cross track, and altitude distances to GPS satellite $24(i)$ with respect to omni-marker beacon $26(k)$. These vectors are computed by receiver 32 for each GPS satellite $24(i)$ from the satellite position information contained in the data component of its associated GPS signal $25(i)$ and from the known positions of omni-marker beacons $26(1)-(2)$ and $29(1)-(3)$.

The vector $A^T k_{38}$ [3×1] is the lever arm correction vector needed for determining the unknown position vector x. It is the dot product of the transposed attitude matrix A [3×3] and the known position vector $k_{38}$ [3×1] for the bottom side antenna 38.

Figure 9:
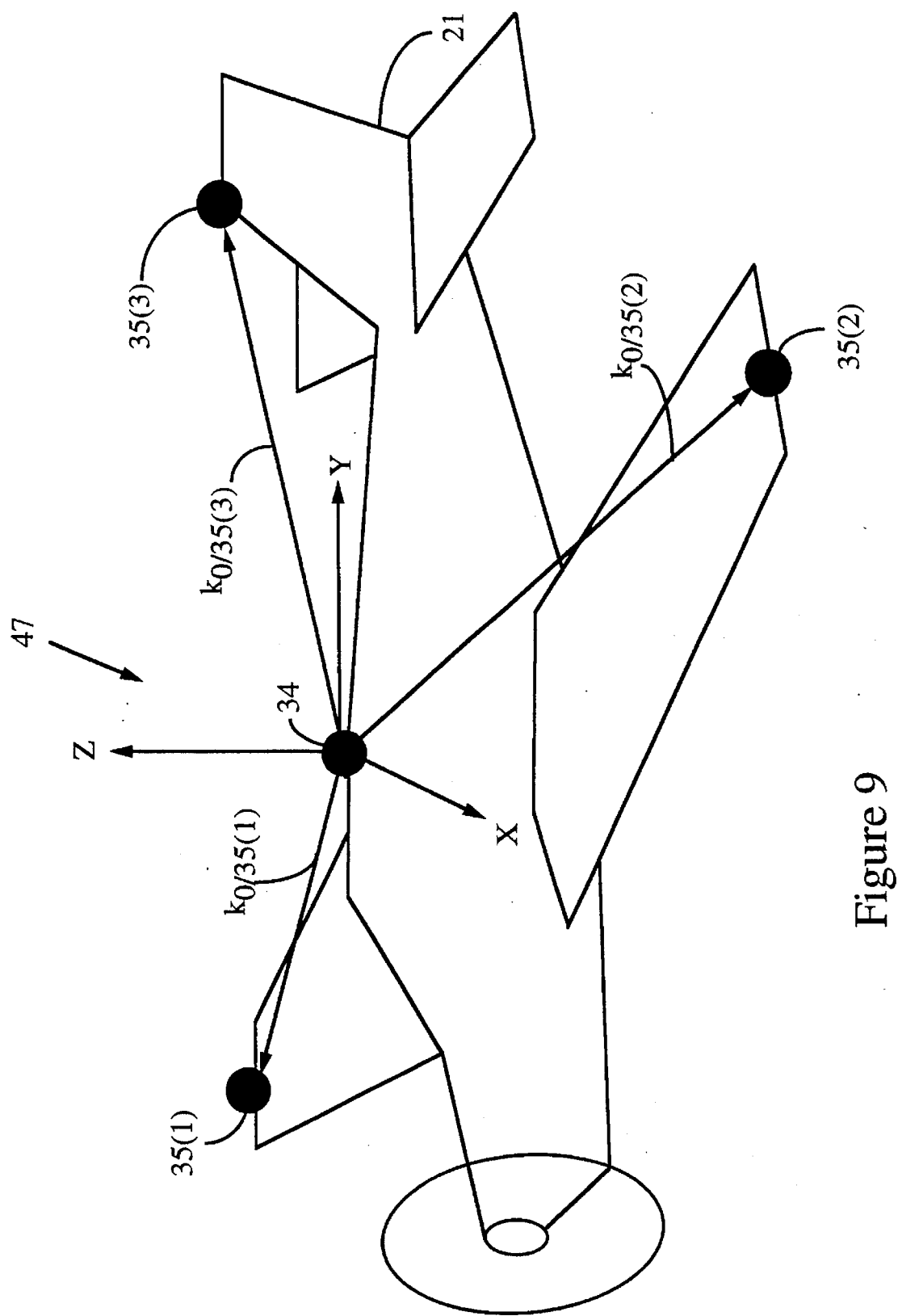
FIG. 9 shows the vectors representing the surveyed positions of antennas which are mounted on an airplane with respect to the body coordinate system of the airplane.

The known position of bottom side antenna 38 relative to top side antenna 34 is precisely surveyed with respect to the body coordinate system 47 defined by the coordinates X, Y, and Z and shown in FIG. 9. This position is represented by vector $k_{38}$ which is provided as follows in Equation (20):

$$k_{38} = \begin{bmatrix} k_{38/AT} \\ k_{38/CT} \\ k_{38/A} \end{bmatrix} \quad (20)$$

where $k_{38/X}$, $k_{38/Y}$ and $k_{38/Z}$ are respectively the distances between antennas 34 and 38 in the X, Y, and Z directions.

Referring to FIGS. 5 and 6, in the preferred embodiment, the attitude matrix A can be generated by position receiver 32 or can be supplied by GPS attitude receiver 33 to position receiver 32. The generation of the attitude matrix A will be discussed later in detail.

Figure 10:
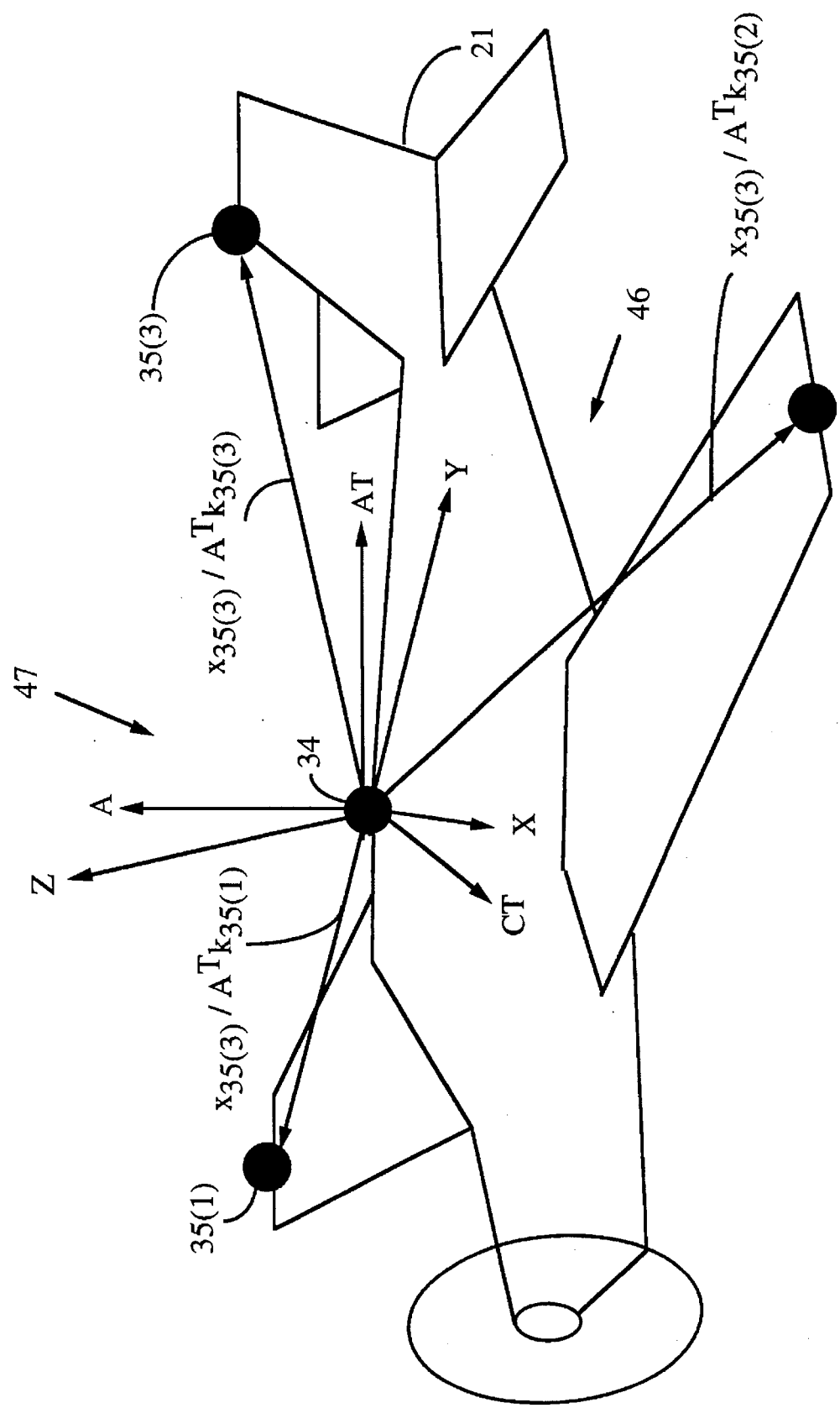
FIG. 10 shows the rotation of the body coordinate system of the airplane with respect to the runway coordinate system.

Turning to FIG. 10, the attitude matrix A is established from the rotation of the body coordinate system 47 of airplane 21 with respect to the runway coordinate system 46. This matrix is provided as follows in Equation (21):

$$A^T = \begin{bmatrix} A_{X/AT} & A_{Y/AT} & A_{Z/AT} \\ A_{X/CT} & A_{Y/CT} & A_{Z/CT} \\ A_{X/A} & A_{Y/A} & A_{Z/A} \end{bmatrix} \quad (21)$$

where each element of the matrix represents the rotation of a coordinate of the body coordinate system 47 with respect to a coordinate of the runway coordinate system 46. As a result the vector $A^T k_{38}$ represents the position of antenna 38 relative to antenna 34 in the runway coordinate system 46.

From the preceding vector relationships, the following mathematical relationships in Equations (22)–(25) may be established:

$$r_{24(i)/34} - r_{24(i)/29(j)} = -\hat{s}^T_{24(i)/29(j)}(x - p_{29(j)}) \quad (22)$$

$$r_{29(j)/38} = |x - p_{29(j)} + A^T k_{38}| \quad (23)$$

$$r_{24(i)/34} - r_{24(i)/26(k)} = -\hat{s}^T_{24(i)/26(k)}(x - p_{26(k)}) \quad (24)$$

$$r_{26(k)/38} = |x - p_{26(k)} + A^T k_{38}| \quad (25)$$

$$y = x + A^T k_{38} \quad (26)$$

Equations (22) and (23) can be combined with Equation (13) to establish the single difference range relationship provided in Equation (27):

$$R_{25(i)/30(i)(j)} = \hat{s}^T_{24(i)/29(j)}(x - p_{29(j)}) - |x - p_{29(j)} + A^T k_{38}| \quad (27)$$

Equations (24) and (25) can be combined with Equation (14) to establish the single difference range relationship provided in Equation (28):

$$R_{25(i)/27(k)(i)} = -\hat{s}^T_{24(i)/26(k)}(x - p_{26(k)}) - |x - p_{26(k)} + A^T k_{38}| \quad (28)$$

Equations (27) and (28) may then be linearized so as to provide for each measurement epoch the following relationships in Equations (29) and (30):

$$R_{25(i)/30(i)(j)} = (-\hat{s}^T_{24(i)/29(j)}) \delta x - \hat{s}_{24(k)/29(j)}(x_0 - p_{29(j)}) - |x - p_{29(j)} + A^T k_{38}| \quad (29)$$

$$R_{25(i)/27(k)(i)} = (-\hat{s}^T_{24(i)/26(k)}) \delta x - \hat{s}_{24(i)/26(k)}(x_0 - p_{26(k)}) - |x - p_{26(k)} + A^T k_{38}| \quad (30)$$

where (A) $|x - p_{29(j)} + A^T k_{38}|$ and $|x - p_{26(k)} + A^T k_{38}|$ are unknown magnitudes, (B) $x_0$ is the estimate for the precise position vector x at each measurement epoch calculated by receiver 32, and (C) $\delta x$ is the unknown vector at each measurement epoch which represents the unknown precise difference between the unknown precise vector x and the estimate $x_0$.

Alternatively, Equations (27) and (28) can be linearized as follows in Equations (31) and (32):

$$R_{25(i)/30(j)(i)} = \left( -\hat{s}^T_{24(i)/29(j)} - \frac{(x_0 - p_{29(j)} + A^T k_{38})}{|x_0 - p_{29(j)} + A^T k_{38}|} \right) \delta x - \quad (31)$$

$$\hat{s}_{24(i)/29(j)}(x_0 - p_{29(j)}) - |x_0 - p_{29(j)} + A^T k_{38}|$$

$$R_{25(i)/27(k)(i)} = \left( -\hat{s}^T_{24(i)/26(k)} - \frac{(x_0 - p_{26(k)} + A^T k_{38})}{|x_0 - p_{26(k)} + A^T k_{38}|} \right) \delta x - \quad (32)$$

-continued $$\hat{s}_{24(i)/26(k)} (x_0 - p_{26(k)}) - |x_0 - p_{26(k)} + A^T k_{38}|$$

where (A) $x_0$ is the estimate for the precise position vector x at each measurement epoch calculated by receiver 32, and (B) $\delta x$ is the unknown vector at each measurement epoch which represents the unknown precise difference between the unknown precise vector x and the estimate $x_0$.

As with Ordinary Code Based GPS position determinations, the relationship of the vectors $\delta x$, x, and $x_0$ is represented in Equation (10). Also, the initial guess for vector $x_0$ may be the vector x computed using Equation (8) to generate Ordinary Code Based GPS position determinations.

Referring to FIG. 2, when airplane 21 is inside one or more of the signal bubbles 31(1)–(3) but outside of signal bubbles 28(1)–(2), receiver 32 makes PRN code range measurements $R_{25(i)/34}$ at each measurement epoch for the GPS signals 25(1)–(m) and PRN code phase measurements $R_{30(i)(j)/38}$ for the beacon marker signals 30(1)(1)–(m), 30(2)(1)–(m), and 30(3)(1)–(m). As a result, it can stack at each measurement epoch at least four equations generated from Equation (29) in matrix form for solving for the three unknowns ($\delta x_{AT}$, $\delta x_{CT}$, and $\delta x_A$) of the vector $\delta x$ and the unknown magnitude $|x-p_{29(j)}+A^T k_{38}|$.

The vector x is then computed using the relationship established in Equation (10). As an integrity check, the magnitude $|x-p_{29(j)}+A^T k_{38}|$ using the computed vector X can be computed and checked against the magnitude that was solved for.

For greater precision, the vector x and the magnitude $|x-p_{29(j)}+A^T k_{38}|$ are iteratively computed at each measurement epoch using the same kind of least squares fit method as was described earlier. This is done until the vector x is computed to within a desired tolerance at each measurement epoch.

Moreover, in the configuration of FIG. 2, since four of the GPS satellites 24(1)–(m) are usually in view, there will almost always be more than four equations generated from Equation (29) at each measurement epoch for solving for the three unknowns (i.e. $\delta x_{AT}$, $\delta x_{CT}$, and $\delta x_A$) of the vector $\delta x$ and the unknown magnitude $|x-p_{29(j)}+A^T k_{38}|$. Thus, the system and method benefit from the overdetermined set of unknowns. However, even if lock on multiple GPS signals 25(1)–(m) is lost by the position receiver 32 or the omni-marker beacons 29(1)–(3), Equation (31) rather than (29) can be used for generating at least three equations for solving for the vector $\delta x$. Thus although the magnitude $|x-p_{29(j)}+A^T k_{38}|$ cannot be independently solved in order to conduct integrity checks, the vector $\delta x$ nevertheless can be solved for in this situation. Since it is likely that in mountainous areas the position receiver 32 or the omni-marker beacons 29(1)–(3) lose lock on one or more of the GPS signals 25(1)–(m), the configuration of FIG. 2 is particularly suited for this possibility.

Also, since four of the GPS satellites 24(1)–(m) are in most situations in view, even in the configurations of FIGS. 3 and 4, four equations can be generated from Equation (29) at each measurement epoch for solving for the vector $\delta x$ and the magnitude $|x-p_{29(j)}+A^T k_{38}|$ to compute the vector X in the way described earlier. But, even if lock on one of the GPS signals 25(1)–(m) is lost by the position receiver 32 or the omni-marker beacon 29(1), three equations can still be generated from Equation (31) at each measurement epoch for solving for the vector $\delta x$ in order to compute the vector x.

Also, referring to FIGS. 2–4, when airplane 21 enters signal bubbles 28(1)–(2), PRN code range measurements $R_{27(i)(k)/38}$ for the beacon marker signals 27(1)(1)–(m) and 27(1)(1)–(m) can be made for aiding in initializing position receiver 32 to make precise Carrier Phase Differential GPS position determinations. As a result, the position receiver 32 can stack additional equations generated at each measurement epoch from Equations (30) or (32) in matrix form for solving for the vector $\delta x$ and the magnitudes $|x-p_{29(j)}+A^T k_{38}|$ and $|x-p_{26(k)}+A^T k_{38}|$. The vector x is then computed in the way described earlier. It is also checked at each iteration by using it to compute both the magnitudes $|x-p_{29(j)}+A^T k_{38}|$ and $|x-p_{26(k)}+A^T k_{38}|$ for comparison with the solved for magnitudes if Equations (29) and (30) are employed.

Accuracy can also be increased by utilizing additional GPS satellites 24(i) when they are in view in any of the configurations of FIGS. 2–4. Thus, the PRN code range measurements $R_{25(i)/34}$, $R_{30(i)(j)/38}$, and $R_{27(i)(k)/38}$ associated with the additional GPS signal 25(i) are made by receiver 32 at each measurement epoch. As a result, additional equations will be generated by receiver 32 from Equations (29)–(31) at each measurement epoch for solving the vector $\delta x$. Thus, the system and method again benefit from the over-determined set of unknowns.

Figure 11:
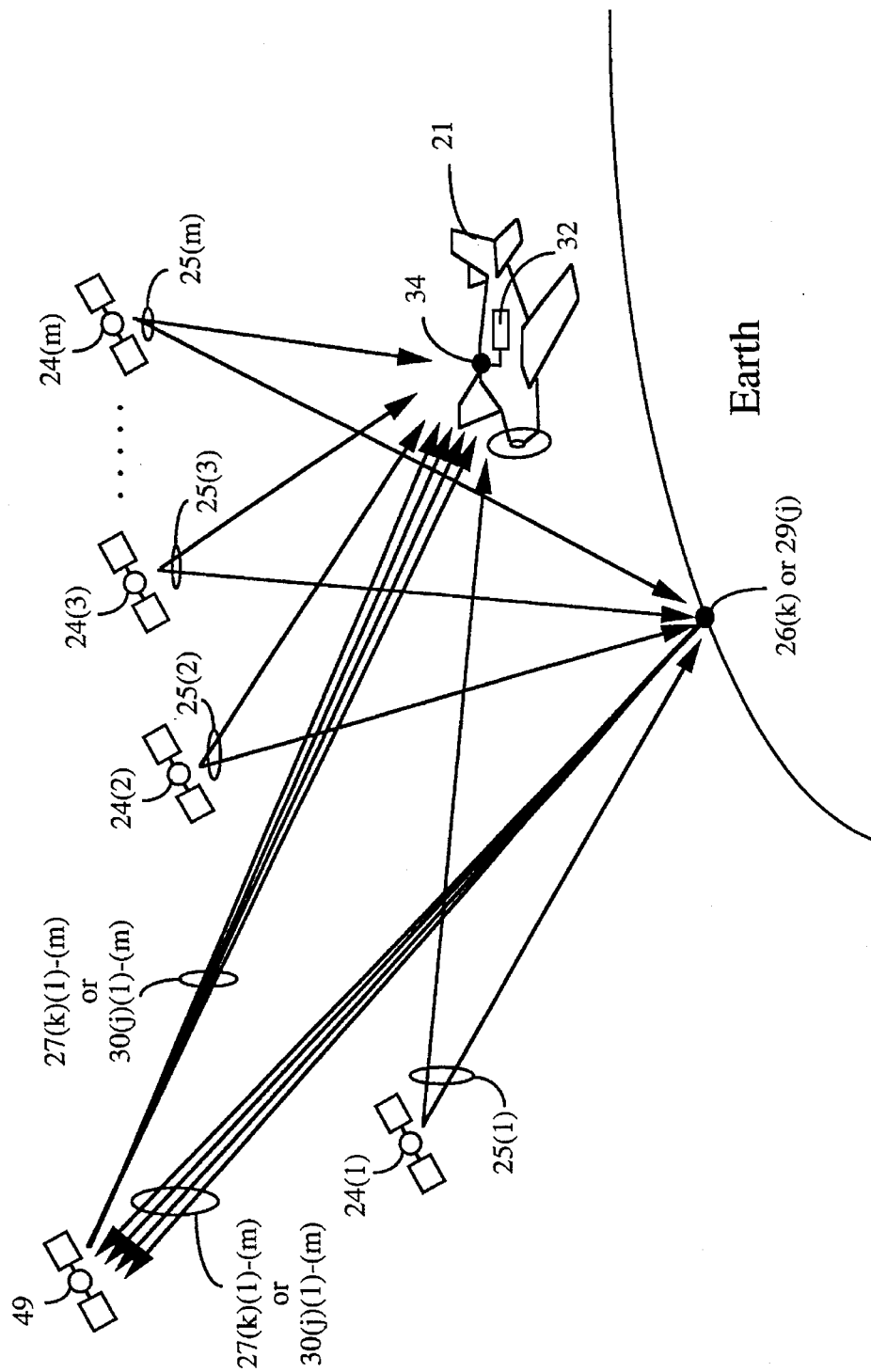
FIG. 11 shows the use of an omni-marker beacon in accordance with the present invention for wide area ranging and positioning.

FIG. 11 shows a way in which the $k^{th}$ omni-marker beacons 26(k) or the $j^{th}$ omni-marker beacon 29(j) can be used for wide area Code Based Differential GPS. In this case, rather than transmitting the beacon marker signals 27(k)(1)–(m) or 30(j)(1)–(m) together in the form of a low power signal bubble, these signals are transmitted together as a directional high power signal beam 27(k)(1)–(m) or 30(j)(1)–(m) to a geosynchronous satellite transponder 49.

Similar to the omni-marker 26(k) or 29(j), the geosynchronous satellite transponder 49 is a repeater that re-broadcasts the incoming signals beacon marker signals 27(k)(1)–(m) or 30(j)(1)–(m) including the carrier component and the PRN code component of each of these signals in the direction of the Earth. Thus, each of the re-transmitted beacon marker signals 27(k)(1)–(m) or 30(j)(1)–(m) includes a carrier component that is phase locked to the carrier component of a corresponding received beacon marker signal 27(k)(1)–(m) or 30(j)(1)–(m) and includes a PRN code component that is the same and is phase locked to the PRN code component of that same received beacon marker signal 27(k)(1)–(m) or 30(j)(1)–(m). Thus, the out-going (i.e. retransmitted) carrier and PRN code components of each of the beacon marker signals 27(k)(1)–(m) or 30(j)(1)–(m) is exactly phase coherent with respect to their incoming counterparts in the received beacon marker signals 27(k)(1)–(m) or 30(j)(1)–(m).

As shown in FIG. 11, the antenna 34 of the airplane 21 then receives these signals. They are then provided to the position receiver 32 which computes the vector x from Equations (29), (30), (31), or (32) in the same way as was described earlier. Moreover, although FIG. 11 shows only one omni-marker beacons 26(k) or 29(j) and only one geosynchronous satellite 49, one skilled in the art will appreciate that multiple omni-marker beacons 26(k) and/or 29(j) may be employed in a similar fashion to that shown in FIG. 2. Also, one skilled in the art will appreciate that multiple geosynchronous satellites 49 can be similarly employed.

Referring again to FIG. 2, in the second method suggested earlier for computing Code Based Differential GPS positions, the omni-markers 26(1)–(2) and 29(1)–(3) only relay the information necessary to make differential corrections.

In other words, no PRN code ranging occurs between the bottom side antenna 38 and the omni-markers 26(1)–(2) and 29(1)–(3).

In this method, receiver 32 computes the position of one or more of the omni-marker beacons 26(1)–(2) or 29(1)–(3) (depending on the configuration) with respect to the center of the Earth 48 and compares it with the actual known location to generate differential corrections. Referring to FIG. 8, the position of omni-marker beacons 29($j$) and 26($k$) relative to the center of the Earth 48 are known and represented by the position vectors $e_{29(j)}$ [3×1] and $e_{26(k)}$ [3×1] provided as follows in Equations (33) and (34) respectively:

$$e_{29}(j) = \begin{bmatrix} e_{29(j)/AT} \\ e_{29(j)/CT} \\ e_{29(j)/A} \end{bmatrix} \quad (33)$$

$$e_{26}(k) = \begin{bmatrix} e_{26(k)/AT} \\ e_{26(k)/CT} \\ e_{26(k)/A} \end{bmatrix} \quad (34)$$

where $e_{29(j)/AT}$, $e_{29(j)/CT}$, and $e_{29(j)/A}$ are respectively the along track, cross track, and altitude distances between omni-marker beacon 29($j$) and the center of the Earth 48 and $e_{26(k)/AT}$, $e_{26(k)/CT}$, and $e_{26(k)/A}$ are respectively the along track, cross track, and altitude distances between omni-marker beacon 26($k$) and the center of the Earth 48. These vectors are known through precision surveying techniques and are either stored by the position receiver 32 or provided to position receiver 32 in the data components of the beacon marker signals 30(1)(1)–(m), 30(2)(1)–(m), 30(3)(1)–(m), 27(1)(1)–(m), and 27(2)(1)–(m).

From the preceding vector relationships, the following relationships in Equations (35) and (36) may be established with respect to the center of the Earth 48 as follows:

$$r_{24(i)/29(j)} = d_{24(i)} - e_{29(j)} \quad (35)$$

$$r_{24(i)/26(k)} = d_{24(i)} - e_{26(k)} \quad (36)$$

Equations (35) and (23) can be combined with Equation (11) and Equations (36) and (25) can be combined with Equation (12) to form the following relationship in Equations (37) and (38) respectively:

$$R_{30(i)(j)/38} = d_{24(i)} - e_{29(j)} + |x - p_{29(j)} + A^T k_{38}| + \Delta T_{32} - \Delta T_{24(i)} \quad (37)$$

$$R_{27(k)(i)/38} = d_{24(i)} - e_{26(k)} + |x - p_{26(k)} + A^T k_{38}| + \Delta T_{32} - \Delta T_{24(i)} \quad (38)$$

Equations (37) and (38) can then be linearized to form the following relationships in Equations (39) and (40):

$$R_{30(j)(i)/38} = d - e_{29(j)} + \frac{(x_0 - p_{29(j)} + A^T k_{38})}{|x_0 - p_{29(j)} + A^T k_{38}|} \delta x + \quad (39)$$

$$|x_0 - p_{29(j)} + A^T k_{38}| + \Delta T_{32} - \Delta T_{24(i)}$$

$$R_{27(k)(i)/38} = d - e_{26(k)} + \frac{(x_0 - p_{26(k)} + A^T k_{38})}{|x_0 - p_{26(k)} + A^T k_{38}|} \delta x + \quad (40)$$

$$|x_0 - p_{26(k)} + A^T k_{38}| + \Delta T_{32} - \Delta T_{24(i)}$$

where (A) $x_0$ is the estimate for the precise position vector $x$ at each measurement epoch calculated by receiver 32, and (B) $\delta x$ is the unknown vector at each measurement epoch which represents the unknown precise difference between the unknown precise vector $x$ and the estimate $x_0$.

Referring to FIG. 2, when airplane 21 is inside one or more of the signal bubbles 31(1)–(3) but outside of signal bubbles 28(1)–(2), receiver 32 makes PRN code range measurements $R_{25(i)/34}$ at each measurement epoch for the GPS signals 25(1)–(m) and PRN code range measurements $R_{30(i)(j)/38}$ for the beacon marker signals 30(1)(1)–(m), 30(2)(1)–(m), and 30(3)(1)–(m). As a result, it can stack at each measurement epoch at least four equations generated from Equation (37) in matrix form for solving for the three unknowns (i.e. $e_{29(j)/AT}$, $e_{29(j)/CT}$, and $d_{29(j)/A}$) of the vector $e_{29(j)}$ and the bias term $|x - p_{29(j)} + A^T k_{38}| + \Delta T_{32} - \Delta T_{24(i)}$.

This vector is then compared at each measurement epoch with the actual values for the position vector $e_{29(j)}$ stored by the receiver 32 or provided by the beacon marker signals 30(1)(1)–(m), 30(2)(1)–(m), and 30(3)(1)–(m) in their data components. In response, the position receiver 32 computes differential corrections which are either applied to the PRN code range measurements $R_{30(i)(j)/38}$ at each measurement epoch or to the vector $x$ computed at each epoch in the manner described next.

Based on the corrected PRN range measurements $R_{30(i)(j)/38}$ at each measurement epoch, at least four equations generated from Equation (39) at each measurement epoch can be stacked in matrix form for solving the three unknowns (i.e. $\delta x_{AT}$, $\delta x_{CT}$, and $\delta x_A$) of vector $\delta x$ and the clock bias term $\Delta T_{32} - \Delta T_{24(i)}$. The vector $x$ is then computed using the relationship established in Equation (10). Alternatively, as was just suggested, the differential corrections may be applied instead after the vector $x$ has been computed.

Moreover, in the configuration of FIG. 2, since four of the GPS satellites 24(1)–(m) are usually in view, there will almost always be more than four equations generated from Equation (37) at each measurement epoch for first solving for the vector $e_{29(j)}$ and the bias term $|x - p_{29(j)} + A^T k_{38}| + \Delta T_{32} - \Delta T_{24(i)}$ to compute the differential corrections to the PRN code range measurements $R_{30(i)(j)/38}$. And, for the same reason, there will almost always be more than four equations generated from Equation (39) at each measurement epoch for solving for the vector $\delta x$ and clock bias term $\Delta T_{32} - \Delta T_{24(i)}$. Thus, the system and method benefit from the overdetermined set of unknowns.

Also, since four of the GPS satellites 24(1)–(m) are in most situations in view, even in the configurations of FIGS. 3 and 4, four equations can be generated from Equation (37) at each measurement epoch for first solving for the vector $e_{29(j)}$ and the bias term $|x - p_{29(j)} + A^T k_{38}| + \Delta T_{32} - \Delta T_{24(i)}$ and four equations can be generated from Equation (39) at each measurement epoch for solving for the vector $\delta x$ and clock bias term $\Delta T_{32} - \Delta T_{24(i)}$ in the way described earlier.

Also, referring to FIGS. 2–4, when airplane 21 enters signal bubbles 28(1)–(2), PRN code range measurements $R_{27(i)(k)/38}$ for the beacon marker signals 27(1)(1)–(m) and 27(1)(1)–(m) can be made for aiding in initializing position receiver 32 to make precise Carrier Phase Differential GPS position determinations. As a result, the position receiver 32 can stack additional equations generated at each measurement epoch from Equation (38) for first solving for the vector $e_{26(k)}$ and the bias term $|x - p_{26(k)} + A^T k_{38}| + \Delta T_{32} - \Delta T_{24(i)}$ to compute differential corrections to the PRN code range measurements $R_{27(i)(k)/38}$ at each epoch. For the same reason, four additional equations can be generated from Equation (40) at each measurement epoch for solving for the vector $\delta x$ and clock bias term $\Delta T_{32} - \Delta T_{24(i)}$).

Accuracy can also be increased by utilizing additional GPS satellites 24($i$) when they are in view in any of the configurations of FIGS. 2–4. Thus, the PRN code range measurements $R_{25(i)/34}$, $R_{30(i)(j)/38}$, $R_{27(i)(k)/38}$ associated with the additional GPS signal $25(i)$ are made by receiver 32 at each measurement epoch. As a result, additional equations will be generated by receiver 32 from Equations (29) or (31) at each measurement epoch for solving the vector $\delta x$. Thus, the system and method again benefit from the over-determined set of unknowns.

Furthermore, the wide area Code Based Differential GPS configuration of FIG. 11 can also be used with the $k^{th}$ omni-marker beacon $26(k)$ or the $j^{th}$ omni-marker beacon $29(j)$. Since the receiver 32 of airplane 21 receives the beacon marker signals $27(k)(1)-(m)$ or $30(j)(1)-(m)$ from the geosynchronous satellite transponder 49, it can compute the vector x in the same way as just described.

Carrier Phase Differential GPS Position Determinations

Referring to FIG. 2, when airplane 21 is inside of the signal bubbles 28(1)–(2), GPS position receiver 32 computes Code Phase differential GPS position determinations for proper navigation during the initialization period for Carrier Phase Differential GPS position determinations.

The initialization of position receiver 32 involves integer ambiguity resolution. In general, integer ambiguity resolution is the process of determining, at a particular point in time, the number of integer wavelengths of the carrier component of a signal (GPS or pseudolite) traveled between a given pair of antennas in the direction of the GPS satellite or pseudolite that broadcasted the GPS signal. However, in the context of the present invention, the integer ambiguity resolution can also be thought of as involving the determination of the difference in the number of integer wavelengths traveled to one or more antennas between the carrier components of a GPS signal and the corresponding carrier component of the beacon marker signal or between the corresponding carrier components of two beacon marker signals generated by different omni-marker beacons.

Figure 12:
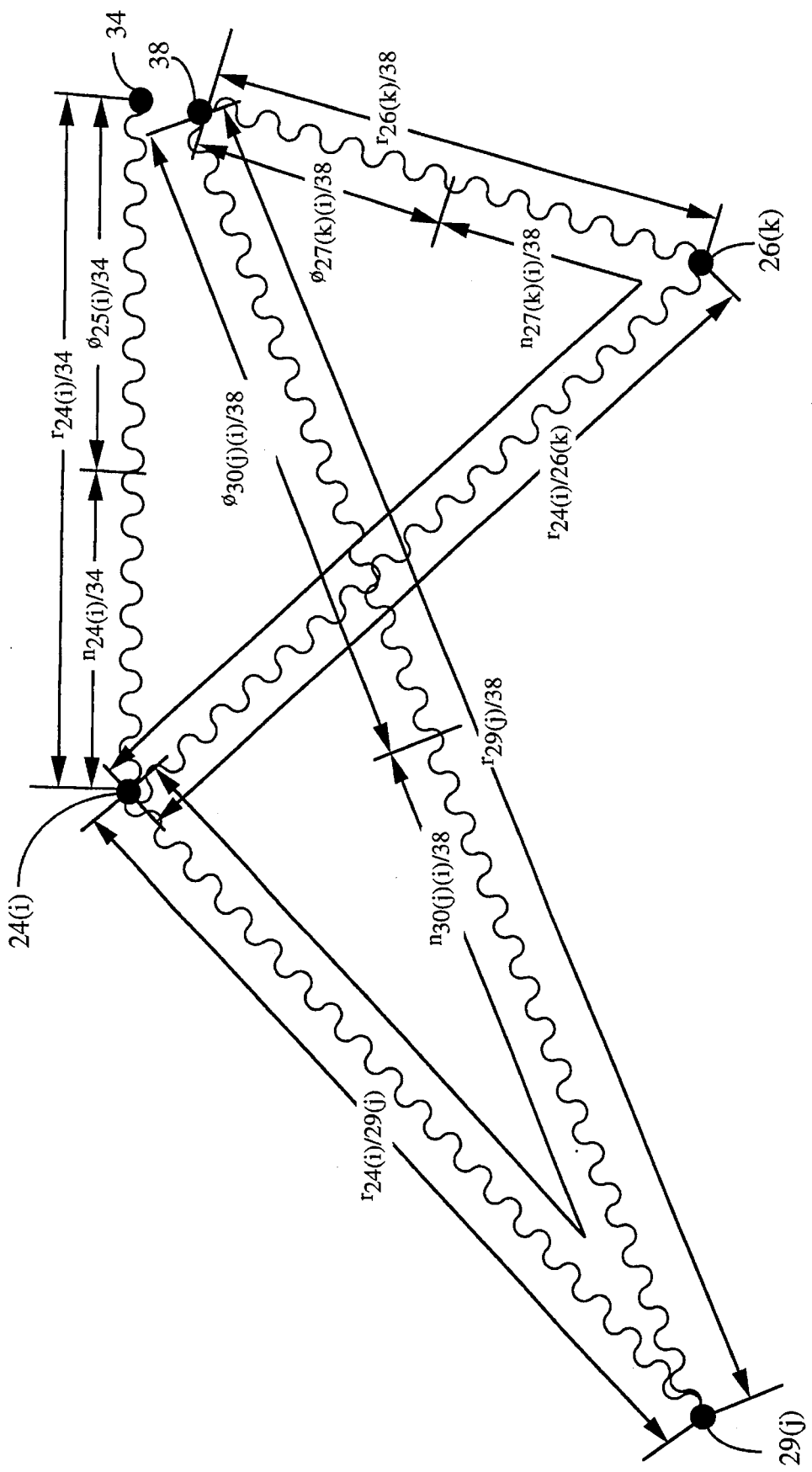
FIG. 12 provides an illustration of how the integer ambiguities at an initial epoch arise.

FIG. 12 provides an illustration of how the later discussed integer ambiguities $n_{25(i)/27(k)(i)}$ and $n_{25(i)/30(j)(i)}$. This figure shows the situation for the first measurement epoch of the initialization period. The integer ambiguities $n_{25(i)/27(k)(i)}$ are associated with the GPS signals $25(i)$ received by top side antenna 34 and the beacon marker signals $27(k)(i)$ received by bottom side antenna 38. The integer ambiguities $n_{25(i)/30(j)(i)}$ are associated with the GPS signals $25(i)$ received by top side antenna 34 and the beacon marker signals $29(j)(i)$ received by bottom side antenna 38.

The receiver 32 is configured to make phase measurements for the acquired signals $25(1)-(m)$, $27(1)(1)-(m)$, $27(2)(1)-(m)$, $30(1)(1)-(m)$, $30(2)(1)-(m)$, and $30(3)(1)-(m)$. Each measurement includes both a fractional wavelength phase component $\Phi_{fr}$ and an integer wavelength phase change component $\Phi_{int}$. The integer wavelength change in phase $\Phi_{int}$ for each raw phase measurement is kept track of by receiver 32 as of the time each of the signals $25(1)-(m)$, $27(1)(1)-(m)$, $27(2)(1)-(m)$, $30(1)(1)-(m)$, $30(2)(1)-(m)$, and $30(3)(1)-(m)$ was first acquired. Thus, each phase measurement is in a sense a partial range measurement. In the preferred embodiment, like the PRN code range measurements, the carrier phase measurements are issued by the receiver 32 at a rate in the range of 1–10 Hz with each cycle being a measurement epoch.

As mentioned previously, position receiver 32 generates internally its own carrier components for phase comparisons with the received carrier component of the signals $25(1)-(m)$, $27(1)(1)-(m)$, $27(2)(1)-(m)$, $30(1)(1)-(m)$, $30(2)(1)-(m)$, and $30(3)(1)-(m)$. These carrier components are not generated precisely with reference to GPS system time because at each measurement epoch the receiver 32 has the earlier described clock synchronization error $\Delta T_{32}$. Furthermore, the GPS satellite $24(i)$ has a clock synchronization error $\Delta T_{24(i)}$ and therefore does not generate the carrier components of GPS signals $25(1)-(m)$ precisely with reference to GPS system time as well.

As shown in FIG. 12, the unknown range $r_{24(i)/34}$ between the GPS satellite $24(i)$ and antenna 34, at the initial epoch of the initialization, includes the carrier phase component $\Phi_{25(i)/34}$ measured by receiver 32 and the unknown integer component $n_{25(i)/34}$ of GPS signal $25(i)$. The unknown range $r_{24(i)/29(j)}+r_{29(j)/38}$ from the GPS satellite $24(i)$ to the omni-marker beacon $29(j)$ and then to the antenna 38, at the initial epoch of the initialization, includes the carrier phase component $\Phi_{30(j)(i)/38}$ measured by receiver 32 and the unknown integer component $n_{30(j)(i)/38}$ of the beacon marker signal $30(j)$ $(i)$. And, the unknown range $r_{24(i)/26(k)}+r_{26(k)/38}$ from the GPS satellite $24(i)$ to the omni-marker beacon $26(k)$ and then to the antenna 38, at the initial epoch of the initialization, includes the carrier phase component $\Phi_{27(k)(i)/38}$ measured by receiver 32 and the unknown integer component $n_{27(k)(i)/38}$ of the beacon marker signal $30(j)$ $(i)$.

The unknown integer components $n_{25(i)/34}$, $n_{30(j)(i)/38}$, and $n_{27(k)(i)/38}$ are assigned at the initial epoch remain constant throughout the initialization process and the subsequent Carrier Phase Differential GPS position determinations. This fact is better illustrated by FIG. 13.

Figure 13:
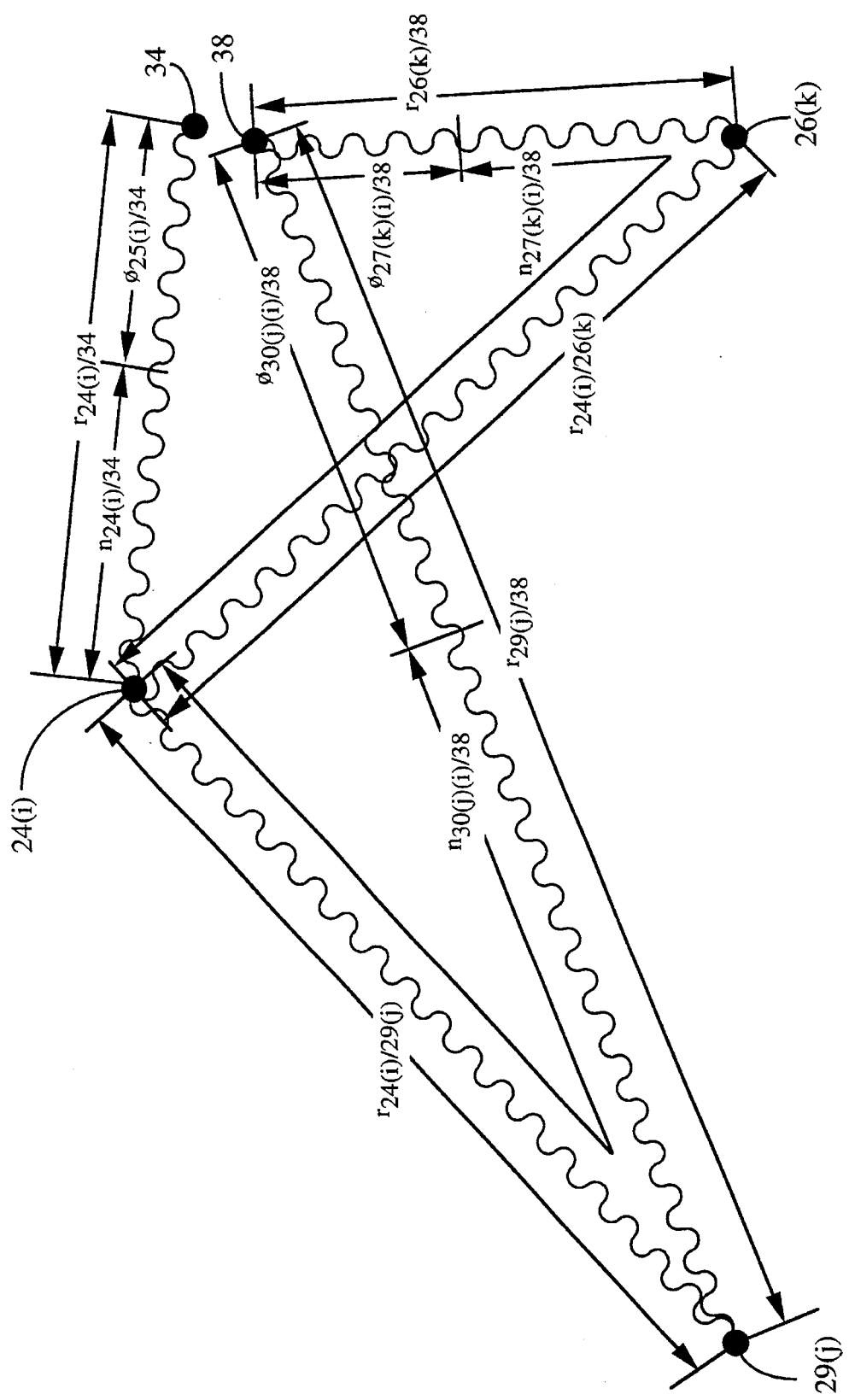
FIG. 13 provides an illustration at later epoch after the initial epoch of FIG. 12.

FIG. 13 shows an epoch after the initial epoch. This second epoch could be during or after the initialization period. Each of the carrier phase measurements $\Phi_{25(i)/34}$, $\Phi_{29(j)(i)/38}$, and $\Phi_{27(k)(i)/38}$ will have changed since the initial epoch. This is due to the fact that the fractional component $\Phi_{fr}$ and integer wavelength change component $\Phi_{int}$ which make up the identified phase measurements have changed since the initial epoch. However, the assigned integer components $n_{25(i)/34}$, $n_{30(j)(i)/38}$, and $n_{27(k)(i)/38}$ have not changed.

The relationship between $\Phi_{25(i)/34}$ and $n_{25(i)/34}$, the relationship between $\Phi_{29(j)(i)/38}$ and $n_{30(j)(i)/38}$, and the relationship between $\Phi_{27(k)(i)/38}$ and $n_{27(k)(i)/38}$ are provided as follows in Equations (41), (42), and (43) respectively:

$$\Phi_{25(i)/34} = r_{24(i)/34} - n_{25(i)/34} + \Delta T_{32} - \Delta T_{24(i)} \quad (41)$$

$$\Phi_{30(i)(j)/38} = r_{24(i)/29(j)} + r_{29(j)/38} - n_{30(j)(i)/38} + \Delta T_{32} - \Delta T_{24(i)} \quad (42)$$

$$\Phi_{27(k)(i)/38} = r_{24(i)/26(k)} + r_{26(k)/38} - n_{27(k)(i)/38} + \Delta T_{32} - \Delta T_{24(i)} \quad (43)$$

Equations (41) and (42) can be difference and Equations (41) and (43) can be difference so as to form the single difference phase relationship provided as follows in Equations (44) and (45) respectively:

$$\Phi_{25(i)/30(j)(i)} = r_{24(i)/34} - r_{24(i)/29(j)} - r_{29(j)/38} - n_{25(i)/30(j)(i)} \quad (44)$$

$$\Phi_{25(i)/27(k)(i)} = r_{24(i)/34} - r_{24(i)/27(k)} - r_{27(k)/38} - n_{25(i)/27(k)(i)} \quad (45)$$

where (A) $n_{25(i)/30(j)(i)}$ is the integer ambiguity associated with the GPS signal $25(i)$ and the corresponding beacon marker signal $30(j)(i)$ and is the difference between the unknown assigned integer component $n_{25(i)/34}$ and the unknown assigned integer component $n_{30(j)(i)/38}$, and (B) $n_{25(i)/27(k)(i)}$ is the integer ambiguity associated with the GPS signal $25(i)$ and the corresponding beacon marker signal $27(k)$ $(i)$ and is the difference between the unknown assigned integer component $n_{25(i)/34}$ and the unknown assigned integer component $n_{30(j)(i)/38}$.

Like in the discussion regarding Code Based Differential GPS, it is important to note that in Equations (44) and (45) the total clock synchronization error $\Delta T_{32} - \Delta T_{24(i)}$ has been removed by differencing Equations (41)–(43) in the way just discussed.

Turning to FIG. 8 again, in order to make proper Carrier Phase Differential GPS position determinations for airplane 21 relative to the threshold (i.e. beginning) of runway 23, Equations (44) and (45) must be manipulated so as to include the vector relationships x, y, $\hat{s}_{24(i)/26(k)}$, $\hat{s}_{24(i)/29(j)}$, $p_{26(k)}$, $p_{29(j)}$, and $A^T k_{38}$ associated with the ranges $r_{24(i)/34}$, $r_{24(i)/29(j)}$, $p_{26(k)}$, $p_{29(j)}$, and $r_{26(k)/38}$. Once again, these relationships are established with respect to the runway coordinate system 46 associated with the threshold of runway 23 and are shown in the earlier described Equations (22)–(26).

Equations (22) and (23) can be combined with Equation (44) to establish the single difference phase relationship provided in Equation (46):

$$\Phi_{25(i)/30(j)(i)} = \hat{s}^T_{24(i)/29(j)}(x - p_{29(j)}) - |x - p_{29(j)} + A^T k_{38}| + n_{25(i)/30(j)(i)} \quad (46)$$

Equations (24) and (25) can be combined with Equation (45) to establish the single difference phase relationship provided in Equation (47):

$$\Phi_{25(i)/27(k)(i)} = \hat{s}^T_{24(i)/26(k)}(x - p_{26(k)}) - |x - p_{26(k)} + A^T k_{38}| + n_{25(i)/27(k)(i)} \quad (47)$$

Equations (46) and (47) may then be linearized so as to provide for each measurement epoch the following relationships in Equations (48) and (49):

$$\Phi_{25(i)/30(j)(i)} = \left( -\hat{s}^T_{24(i)/29(j)} - \frac{(x_0 - p_{29(j)} + A^T k_{38})}{|x_0 - p_{29(j)} + A^T k_{38}|} \right) \delta x - \quad (48)$$

$$\hat{s}_{24(i)/29(j)}(x_0 - p_{29(j)}) - |x - p_{29(j)} + A^T k_{38}| + n_{25(i)/30(j)(i)}$$

$$\Phi_{25(i)/27(k)(i)} = \left( -\hat{s}^T_{24(i)/26(k)} - \frac{(x_0 - p_{26(k)} + A^T k_{38})}{|x_0 - p_{26(k)} + A^T k_{38}|} \right) \delta x - \quad (49)$$

$$\hat{s}_{24(i)/26(k)}(x_0 - p_{26(k)}) - |x - p_{26(k)} + A^T k_{38}| + n_{25(i)/27(k)(i)}$$

where (A) $x_0$ is the estimate for the precise position vector x at each measurement epoch calculated by receiver 32, and (B) $\delta x$ is the unknown vector at each measurement epoch which represents the unknown precise difference between the unknown precise vector x and the estimate $x_0$.

As with Code Based GPS position determinations, the relationship of the vectors $\delta x$, x, and $x_0$ is represented in Equation (10). Also, the initial guess for vector $x_0$ may be the vector x computed using Equations (29), (30), (31), and/or (32) to generate Code Based Differential GPS position determinations.

Resolving the integer ambiguities $n_{25(i)/27(k)(i)}$ and $n_{25(i)/30(j)(i)}$ involves making carrier phase measurements $\Phi_{25(i)/34}$, $\Phi_{27(k)(i)/38}$, and $\Phi_{29(j)(i)/38}$ for the signals $25(1)-(m)$, $27(1)(1)-(m)$, $27(2)(1)-(m)$, $30(1)(1)-(m)$, $30(2)(1)-(m)$, and $30(3)(1)-(m)$. Referring to FIG. 2, in this method, position receiver 32 will make phase measurements $\Phi_{25(i)/34}$, $\Phi_{27(k)(i)/38}$, and $\Phi_{29(j)(i)/38}$ over a number of epochs while airplane 21 is inside the signal bubbles 28(1)–(2) and receives the beacon marker initialization signals $27(1)(1)-(m)$ and $27(2)(1)-(m)$. During this initialization period, there is a large angular change in geometry between antennas 34 and 38 and the initialization omni-markers 26(1)–(2) as the antennas 34 and 38 move through the signal bubbles 28(1)–(2).

Receiver 32 makes and records the carrier phase measurements $\Phi_{25(i)/34}$, $\Phi_{27(k)(i)/38}$, and $\Phi_{29(j)(i)/38}$ for the signals $25(1)-(m)$, $27(1)(1)-(m)$, $27(2)(1)-(m)$, $30(1)(1)-(m)$, $30(2)(1)-(m)$, and $30(3)(1)-(m)$ at a number of epochs during this large angular change in geometry. After this has been done, position receiver 32 can stack in matrix form all of the equations generated at each recorded epoch from the Equations (48) and (49) can simultaneously solve for (a) the integer ambiguities $n_{25(i)/27(k)(i)}$ and $n_{25(i)/30(j)(i)}$, and (b) the unknown vectors $\delta x$ at each recorded epoch.

For greater accuracy, the integer ambiguities $n_{25(i)/27(k)(i)}$ and $n_{25(i)/30(j)(i)}$ are iteratively computed to within a desired tolerance. This is done using the least squares method described earlier where the vector x computed at each iteration using the relationship established in Equation (10) is used as the estimate $x_0$ for the next iteration.

Moreover, in the configurations of FIGS. 2 and 3, since four of the GPS satellites $24(1)-(m)$ are usually in view, there will almost always be more equations generated from Equations (48) and (49) than there are unknowns (i.e. the integer ambiguities $n_{25(i)/27(k)(i)}$ and $n_{25(i)/30(j)(i)}$ and the vectors $\delta x$ at each recorded epoch). Thus, the system and method benefit from the overdetermined set of unknowns. However, even if lock on multiple GPS signals $25(1)-(m)$ is lost by the position receiver 32 or the omni-marker beacons 26(1)–(2), Equations (48) and (49) can still be used for generating enough equations over a number of recorded epochs while airplane 21 is in the signal bubbles 28(1)–(2) for solving for the integer ambiguities $n_{25(i)/27(k)(i)}$ and $n_{25(i)/30(j)(i)}$.

Furthermore, as was stated earlier, four of the GPS satellites $24(1)-(m)$ are in most situations in view. Thus, even in the configuration of FIG. 4, enough equations can be generated from Equations (48) and (49) for solving for the integer ambiguities $n_{25(i)/27(k)(i)}$ and $n_{25(i)/30(j)(i)}$ and the vectors $\delta x$ at each recorded epoch in the way described earlier.

Furthermore, for each of the configurations in FIGS. 2–4, accuracy can also be increased by utilizing additional GPS satellites $24(i)$ when they are in view. Thus, the carrier phase measurements $\Phi_{25(i)/34}$, $\Phi_{27(k)(i)/38}$, and $\Phi_{29(j)(i)/38}$ associated with the additional GPS signal $25(i)$ are made by receiver 32 at each measurement epoch. As a result, additional equations will be generated by receiver 32 from Equations (48) and (49) at each recorded epoch for solving for the integer ambiguities $n_{25(i)/27(k)(i)}$ and $n_{25(i)/30(j)(i)}$ in the way described earlier.

For each of the configurations in FIGS. 2–4, greater accuracy can also be achieved if receiver 32 is programmed to record the phase measurements $\Phi_{25(i)/34}$, $\Phi_{27(k)(i)/38}$, and $\Phi_{29(j)(i)/38}$ at more than the minimum number of epochs needed to compute the integer ambiguities $n_{25(i)/27(k)(i)}$ and $n_{25(i)/30(j)(i)}$. As a result, there will be more equations generated from the Equations (48) and (49) then there are unknowns. Thus, the system and method will benefit again because the set of unknowns will be overdetermined.

Receiver 32 can make precise position determinations using Carrier Phase Differential GPS only after the integer ambiguities $n_{25(i)/27(k)(i)}$ and $n_{25(i)/30(j)(i)}$ been computed. Thus, these are the initialization values generated by receiver 32 during the initialization process.

The fact that the integer ambiguities $n_{25(i)/27(k)(i)}$ and $n_{25(i)/30(j)(i)}$ are integer values serves as a built-in integrity checking device for the method just described. Thus, receiver 32 can check to see during the initialization process that these computed integer ambiguities converge to integer values.

Once the integer ambiguities $n_{25(i)/27(k)(i)}$ and $n_{25(i)/30(j)(i)}$ have been computed, the initialization period is over and the receiver 32 can compute at each measurement epoch the precise position vector x. This is done by substituting the integer ambiguities $n_{25(i)/27(k)(i)}$ into Equation (47) while airplane 21 is still in signal bubbles 28(1)–(2). Since airplane 21 will eventually have left the signal bubbles 28(1)–(2) in FIGS. 2 and 4 and signal bubble 28(1) in FIG. 3, Equation (47) is then no longer usable for computing the vector x.

Referring to FIG. 2, at each measurement epoch while airplane 21 is in one or more of the signal bubbles 31(1)–(3), position receiver 32 makes the phase measurements and $\Phi_{29(j)(i)/38}$. Thus, receiver 32 can stack at each measurement epoch the equations generated from Equation (46) in matrix form for solving for the vector x and the magnitude $|x-p_{29(j)}+A^T k_{38}|$. As with the Code Based Differential GPS position determinations discussed earlier, the magnitude $|x-p_{29(j)}+A^T k_{38}|$ using the computed vector X can be computed and checked against the magnitude that was solved for in order to provide an additional integrity check.

Moreover, in the configuration of FIG. 2, since four of the GPS satellites 24(1)–(m) are usually in view, there will almost always be more than four equations generated from Equation (46) for solving for the three unknowns (i.e. $x_{AT}$, $x_{CT}$, and $x_A$) of the vector x and the unknown magnitude $|x-p_{29(j)}+A^T k_{38}|$. Thus, the system and method benefit from the overdetermined set of unknowns.

Furthermore, even if lock on multiple GPS signals 25(1)–(m) is lost by the position receiver 32 or the omni-marker beacons 29(1)–(3), Equation (48) rather than (46) can be used for generating at least three equations for solving for the vector δx. Thus, although the magnitude $|x-p_{29(j)}+A^T k_{38}|$ cannot be independently solved in order to conduct integrity checks, the vector δx nevertheless can be solved in this situation and the vector X iteratively computed using the relationship in Equation (10) and the least squares fit method described earlier. As was indicated earlier for the discussion regrading Code Based Differential GPS position determinations, the position receiver 32 or the omni-marker beacons 29(1)–(3) may lose lock on one or more GPS signals 25(1)–(m) in mountainous areas. Thus, the configuration of FIG. 2 is particularly suited for this possibility.

Moreover, since four of the GPS satellites 24(1)–(m) in most situations in view, even in the configurations of FIGS. 3 and 4, four equations can be generated from Equation (44) for solving for the vector δx and the magnitude $|x-p_{29(j)}+A^T k_{38}|$ to compute the vector X in the way described earlier. But, even if lock on one of the GPS signals 25(1)–(m) is lost by the position receiver 32 or the omni-marker beacon 29(1), three equations can still be generated from Equation (48) for solving for the vector δx in order to compute the vector x.

Accuracy can also be increased by utilizing additional GPS satellites 24(i) when they are in view in any of the configurations of FIGS. 2–4. Thus, the carrier phase measurements $\Phi_{25(i)/34}$ and $\Phi_{30(i)(j)/38}$ associated with the additional GPS signal 25(i) are made by receiver 32 at each measurement epoch. As a result, additional equations will be generated by receiver 32 from Equations (46) or (48) at each measurement epoch for solving the vector x or the vector δx. Thus, the system and method again benefit from the overdetermined set of unknowns.

Once the precise position vector x is computed, the position (i.e. vector y) of the bottom antenna 38 or any other part of the airplane 21 can easily be computed. The vector y can easily be computed from the relationship established in Equation (26). Additionally, it is particularly critical for the position of the landing gear of the airplane 21 to be known during a landing. Thus, using a similar equation to that of Equation (26), the precise position of the landing gear can also be computed if its location relative to top side antenna 34 in the runway coordinate system 46 is precisely surveyed beforehand.

Still another built-in integrity check is the use of Code Based Differential GPS position determinations by receiver 32. The system and method do not require PRN code ranging except for generating the coarse initial guess for position vector $x_0$ at each measurement epoch of the initialization period. Thus, the coarse position determinations made by receiver 32 can be used after the initialization period to monitor the Carrier Phase Differential GPS position determinations made by receiver 32.

Referring again to FIG. 4, airplane 21 moves through the signal bubble 28(1) in a simple linear trajectory 22 over the single initialization omni-marker beacon 26(1) during the initialization period. As indicated previously, the system and method utilizes the large angular change in geometry between airplane 21 and the beacon antenna 43(1) of beacon 26 in order to resolve the integer ambiguities $n_{25(i)/26(k)(i)}$ and $n_{25(i)/30(j)(i)}$. Considered with respect to the slowly changing GPS satellite geometry, this large angular change in geometry will make the along track component $\delta x_{AT}$ and altitude component $\delta x_A$ of precise position change vector δx clearly observable during the initialization period. Thus, the resolved integer ambiguities $n_{25(i)/27(k)(i)}$ and $n_{25(i)/30(j)(i)}$ will provide subsequent position determinations where the along track component $x_{AT}$ and the altitude component $x_A$ of precise position vector x are accurate to within centimeters.

However, in most cases the flight trajectory 22 during initialization will be in a line closely over the single initialization beacon 26(1) with little or no cross track (i.e. lateral) deviation. Under these circumstances, as is evident from the linearized Equations (48) and (49), the cross track component $\delta x_{CT}$ of precise position change vector δx will be unobservable during initialization. Thus, the resolved integer ambiguities $n_{25(i)/27(k)(i)}$ and $n_{25(i)/30(j)(i)}$ will result in subsequent position determinations where the cross track component $x_{CT}$ of precise position vector x will only be accurate to within meters. This accuracy is commensurate with the accuracy of the initial guess $x_0$ for the vector $x_0$ calculated by receiver 32 at each measurement epoch of the initialization.

Figure 14:
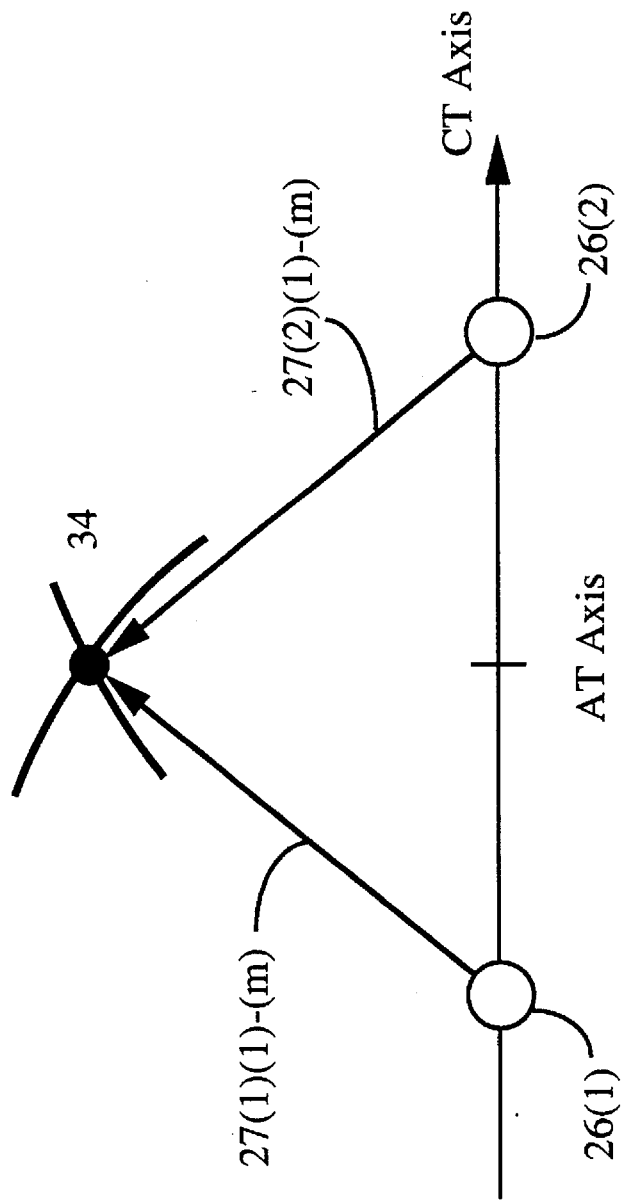
FIG. 14 illustrates elimination of cross track uncertainty by use of two initialization pseudolites.

One way in which the cross track error can be reduced to within centimeters is to employ the configuration of FIGS. 2 or 3 which utilizes two initialization omni-marker beacons 26(1)–(2). As shown in FIG. 14, the two initialization beacons 26(1)–(2) are placed on each side of the along track component of the flight trajectory 22. Because there are now multiple carrier ranging link signals 27(1)(1)–(m) and 27(2)(1)–(m) in the cross track plane, the cross track component $\delta x_{CT}$ of precise position change vector δx will be clearly observable during initialization. As a result, the cross track uncertainty of the single beacon configuration is eliminated and the resolved integer ambiguities $n_{25(i)/27(k)(i)}$ and $n_{25(i)/30(j)(i)}$ will then provide subsequent position determinations having a cross track component $x_{CT}$ accurate to within centimeters.

Figure 15:
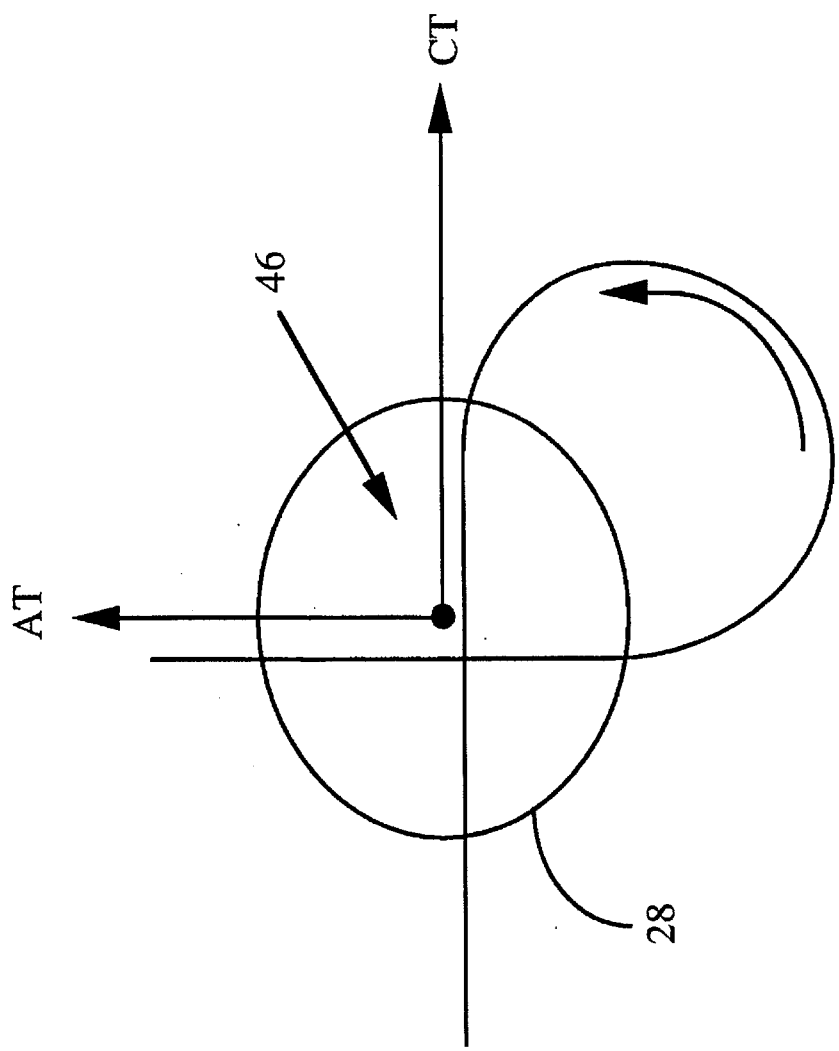
FIG. 15 illustrates elimination of cross track error by overflying a single initialization pseudolite twice.

Another way of reducing the cross track error to within centimeters is to overfly the single initialization beacon 26(1) twice. As shown in FIG. 15, the first overflight is made in the along track AT direction and the second in the cross track CT direction.

With the first overflight, a first set of integer ambiguities $n_{25(i)/27(k)(i)}$ and $n_{25(k)/30(j)(i)}$ are resolved during a first initialization period. As was discussed for the single initialization beacon configuration, after initialization, position receiver 32 provides Carrier Phase Differential GPS position determinations with a cross track error of several meters.

During the second overflight, the coarse initial guess position vector $x_0$ is calculated by position receiver 32 using Carrier Phase Differential GPS position determinations. Since the overflight is in the cross track direction (rather than in the along track direction), the cross track component $\delta x_{CT}$ and the altitude component $\delta x_{CT}$ of the precise position change vector $\delta x$ will be clearly observable. But, the along track component $\delta x_{AT}$ will not be observable during this second overflight. However, the along track component $x_{0/AT}$ of the initial estimate for position vector $x_0$ calculated for the second overflight is already within centimeter level due to the earlier overflight. Therefore, the second set of integer ambiguities $n_{25(i)/27(k)(i)}$ and $n_{25(k)/30(j)(i)}$ resolved during the second overflight will provide subsequent position determinations with the cross track component $x_{CT}$, the along track component $x_{AT}$, and the altitude component $x_A$ all accurate to within centimeters.

Another significant advantage to Carrier Phase Differential GPS position determinations is that the integer ambiguities $n_{25(i)/30(j)(i)}$ associated with additional GPS signals 25(i) broadcast by GPS satellites 24(i) which were not in view during the initialization period can now be resolved easily once they do become in view after the initialization period. Receiver 32 accomplishes this by measuring the carrier phase $\Phi_{25(i)/34}$ for any new GPS signal 25(i) and measuring the carrier phase $\Phi_{30(i)(j)/38}$ for the corresponding new beacon marker signal 30(j)(i) at a particular epoch after the initialization period. At this epoch, the precise position vector x is already being determined by receiver 32 from the phase measurements $\Phi_{25(i)/34}$ and $\Phi_{30(i)(j)/38}$ of the GPS signal 25(i) and the beacon marker signal 30(j)(i) for which the integer ambiguities $n_{25(k)/30(j)(i)}$ have already been resolved during the initialization period described earlier.

The calculated position vector x and the phase measurements $\Phi_{25(i)/34}$ and $\Phi_{30(i)(j)/38}$ associate with the new GPS signal 25(i) and the corresponding new beacon marker signal 30(j)(i) are substituted into Equation (46) so as to solve for the new integer ambiguity $n_{25(i)/30(j)(i)}$. Then, a new equation is generated from Equation (46) at each measurement epoch for use in solving for the position vector x. Thus, this technique results in a seamless integer hand-off so that a new initialization period is unnecessary.

Carrier Phase Differential GPS Attitude Determinations

Referring to FIG. 2, the attitude matrix A is generated by GPS attitude receiver 33 from the GPS signals 25(1)–(m) received by antennas 35(1)–(3) and 38. In doing so, receiver 33 utilizes Equation (1) associated with antenna 34 and a set of similarly derived phase relationships each associated with one of the antennas 35(1)–(3). For antenna 35(m) (i.e. the $m^{th}$ of the attitude antennas 35(1)–(3)) this phase relationship is provided in Equation (50):

$$\Phi_{25(i)/35(m)} = r_{24(i)/35(m)} - n_{25(i)/35(m)} + \Delta T_{33} - \Delta T_{24(i)} \quad (50)$$

where (A) $r_{24(i)/35(m)}$ represents the unknown range from GPS satellite 24(i) to antenna 35(m), (B) $\Phi_{25(i)/35(m)}$ represents the phase component of the unknown range $r_{24(i)/35(m)}$ measured by receiver 32 for the GPS signal 25(i) received at antenna 35(m), and (C) $n_{25(i)/35(m)}$ represents the integer component of the unknown range $r_{24(i)/35(m)}$ associated with GPS signal 25(i) received at antenna 35(m).

Receiver 33 measures $\Phi_{25(i)/34}$ and $\Phi_{25(i)/35(m)}$ in the same way as was discussed earlier for receiver 32. These measurements are issued at the same rate (i.e. 1–10 Hz) so that the attitude solutions generated by receiver 33 are synchronized with the position determinations of receiver 32.

Differencing Equations (41) and (50) provides the single difference phase relationship given as follows in Equation (51):

$$\Phi_{25(i)/34/35(m)} = \Phi_{25(i)/34} - \Phi_{25(i)/35(m)} = \Delta r_{24(i)/34/35(m)} - n_{25(i)/34/35(m)} \quad (51)$$

where (A) $n_{25(i)/34/35(m)}$ represents the unknown integer ambiguity for GPS signal 25(i) associated with antennas 34 and 35(m) and (B) $\Delta r_{24(i)/34/35(m)}$ represents the difference in the unknown ranges $R_{24(i)/34}$ and $r_{24(i)/35(m)}$.

Figure 16:
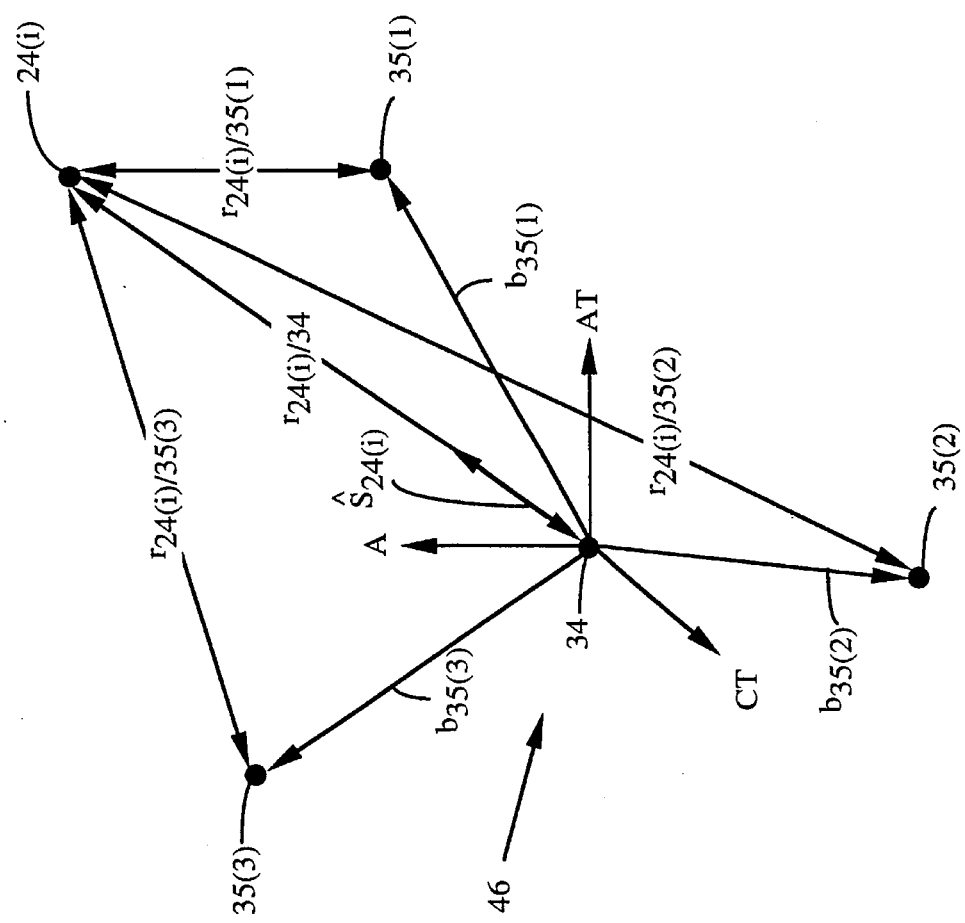
FIG. 16 provides an illustration of the vector relationships associated with the integer ambiguities which are resolved during an initialization period required for generating precise GPS attitude determinations.

In order to resolve the integers ambiguities $n_{25(i)/34/35(m)}$ properly, Equation (51) must be manipulated so as to include the baseline vector relationships which are associated with the ranges $r_{24(i)/34}$ and $r_{24(i)/35(m)}$. These relationships are shown in FIG. 16 and are established with respect to the runway coordinate system 46 which is defined by the coordinates along track AT, cross track CT, and altitude A.

The baseline vectors $b_{35(1)}$, $b_{35(2)}$, and $b_{35(3)}$ respectively represent the unknown positions of attitude antennas 35(1)–(3) with respect to antenna 34 at the initial epoch of the initialization period. The baseline vector $b_{35(m)}$ [3×1] (i.e. the $m^{th}$ of the baseline vectors $b_{35(1)}$, $b_{35(2)}$, and $b_{35(3)}$) is provided as follows in Equation (52):

$$b_{35(m)} = \begin{bmatrix} b_{35(m)/AT} \\ b_{35(m)/CT} \\ b_{35(m)/A} \end{bmatrix} \quad (52)$$

where $b_{35(m)/AT}$, $b_{35(m)/CT}$, and $b_{35(m)/A}$ are respectively the distances between antennas 35(m) and 34 in the along track AT, cross track CT, and altitude A directions.

The direction to GPS satellite 24(i) (i.e. the $i^{th}$ of GPS satellites 24(1-4)) in relation to antenna 34 is represented by the known unit direction vector $\hat{s}_{24(i)/34}$ [3×1] provided as follows in Equation (53):

$$\hat{s}_{24(i)/34} = \begin{bmatrix} \hat{s}_{24(i)/34/AT} \\ \hat{s}_{24(i)/34/CT} \\ \hat{s}_{24(i)/34/A} \end{bmatrix} \quad (53)$$

where $\hat{s}_{24(i)/34/AT}$, $\hat{s}_{24(i)/34/CT}$, $\hat{s}_{24(i)/34/A}$ are respectively the unit distances to GPS satellite 24(i) in the along track AT, cross track CT, and altitude A directions. This vector is computed by receiver 33 for a GPS satellite 24(i) from the satellite position information contained in the data component of the associated GPS signal 25(i) and form the coarse position fix generated by receiver 32 for antenna 34 with respect to the coordinate system used to determine the positions of the GPS satellite 24(i).

From the preceding vector relationships in Equations (52) and (53), the following mathematical relationship is provided in Equation (54):

$$\Delta r_{24(i)/34/35(m)} = \hat{s}^T_{24(i)} b_{35(m)} \quad (54)$$

Combining Equation (54) with Equation (50) results in the following relationship in Equation (55):

$$\Phi_{25(i)/34/35(m)} = \hat{s}^T_{24(i)} b_{35(m)} - n_{25(i)/34/35(m)} \quad (55)$$

The integer ambiguities $n_{25(i)/34/35(m)}$ can be computed during an initialization period using two different approaches. The first approach requires that the airplane 21 remain stationary during the initialization process. The second is motion-based.

The static method is similar to that used in surveying applications. After several epochs of measuring $\Phi_{25(i)/34}$ and $\Phi_{25(i)/35(m)}$, receiver 33 can generate equations from Equation (54) which are stacked in matrix form for solving the integer ambiguities $n_{25(i)/34/35(m)}$.

In order to insure greater accuracy for the computed values, receiver 33 employs more than the minimum number of epochs needed to compute these values. As a result, the system benefits from the over-determined set of unknowns.

Furthermore, receiver 33 makes measurement epochs over a large enough time period to allow the slowly changing GPS satellite geometry to reveal the integer ambiguities $n_{25(i)/34/35(m)}$. This typically requires approximately fifteen minutes.

Additionally, where possible, phase measurements $\Phi_{25(i)/34}$ and $\Phi_{25(i)/35(m)}$ for additional GPS signals 25($i$) are made by receiver 33. Again, the system benefits from the overdetermined set of unknowns.

Figure 17:
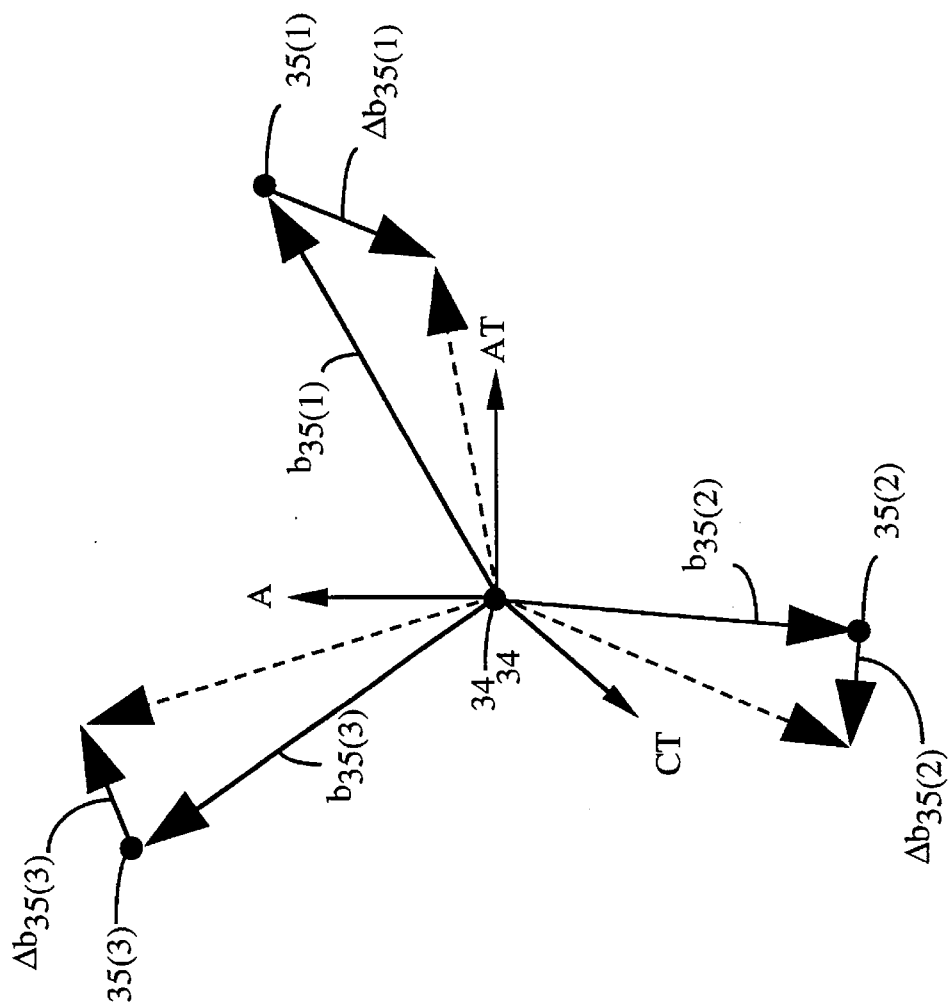
FIG. 17 shows rotation of the attitude antennas about a single axis of the runway coordinate system during the initialization period required for GPS attitude determinations.

The second approach to resolving the integer ambiguities $n_{24(i)/34/35(m)}$ requires rotation of the antennas 35(1)–(3) about at least one of the axis of the runway coordinate system 46. FIG. 17 shows the vector relationships for such a rotation.

In FIG. 17, antennas 35(1)–(3) rotate about the altitude A axis. The baseline vectors $b_{35(1)}$, $b_{35(2)}$, and $b_{35(3)}$ are unknown at the initial epoch of the initialization process. The vectors $\Delta b_{35(1)}$, $\Delta b_{35(2)}$, and $\Delta b_{35(3)}$ respectively represent the change in positions of the antennas 35(1)–(3) at a second epoch with respect to the initial baseline vectors $b_{35(1)}$, $b_{35(2)}$, and $b_{35(3)}$. The vector $\Delta b_{35(m)}$ (i.e. the $m^{th}$ of the vectors $\Delta b_{35(1)}$, $\Delta b_{35(2)}$, and $\Delta b_{35(3)}$) is provided as follows in Equation (56):

$$\Delta b_{35(m)} = \begin{bmatrix} \Delta b_{35(m)/AT} \\ \Delta b_{35(m)/CT} \\ \Delta b_{35(m)/A} \end{bmatrix} \quad (56)$$

where $\Delta b_{35(m)/AT}$, $\Delta b_{35(m)/CT}$, and $\Delta b_{35(m)/A}$ are respectively the change in position of the antenna 35($m$) at the second epoch in the along track AT, cross track CT, and altitude directions.

The equations generated from Equation (56) at the initial and the second epoch can be subtracted to establish the following relationship in Equation (57):

$$\Delta \Phi_{25(i)/34/35(m)} = \hat{s}^T_{24(i)} \Delta b_{35(m)} \quad (57)$$

where $\Delta \Phi_{25(i)/34/35(m)}$ represents the change in $\Phi_{25(i)/34/35(m)}$ between the initial epoch and the second epoch.

The equations generated from Equation (57) may be stacked at a number of epochs after the initial epoch to solve for the vectors $\Delta b_{35(m)}$. Thus, the vectors $\Delta b_{35(m)}$ may be simultaneously computed at each of these epochs without resolving the integer ambiguities $n_{25(i)/34/35(m)}$.

The antennas 35(1)–(3) are fixed to the airplane 21. Thus, the following constraint relationship may be imposed on the baseline vectors $b_{35(y)}$ and $b_{35(z)}$ (i.e. the $y^{th}$ and $z^{th}$ of the vectors $b_{35(1)}$–$b_{35(3)}$) as follows in Equation (58):

$$(b_{35(y)} + \Delta b_{35(y)})(b_{35(z)} + \Delta b_{35(z)}) = b^T_{35(y)} b_{35(z)} \quad (58)$$

However Equation (58) can also be mathematically expressed as follows in equation (59):

$$(b_{35(y)} + \Delta b_{35(y)})(b_{35(z)} + \Delta b_{35(z)}) = b^T_{35(y)} b_{35(z)} + \Delta b^T_{35(z)} b_{35(y)} + \Delta b^T_{35(y)} b_{35(z)} + \Delta b^T_{35(y)} \Delta b_{35(z)} \quad (59)$$

Thus, the Equations (58) and (59) can be combined to form the following relationship in Equation (60):

$$\Delta b^T_{35(z)} b_{35(y)} + \Delta b^T_{35(y)} b_{35(z)} = -\Delta b^T_{35(y)} \Delta b_{35(z)} \quad (60)$$

Equation (60) can be stacked by receiver 33 in matrix form to provide equations at each measurement epoch employed after the initial epoch for solving the unknown vectors $b_{35(m)}$. This includes the situations where $y \neq z$ and where $y = z$.

For greater accuracy more than the minimum number of epochs needed to calculate the baseline vectors $b_{35(m)}$ should be employed by receiver 33. As a result, receiver 33 can generate additional equations from Equation (60) for simultaneously solving the over-determined set of unknown baseline values.

Once these baseline values are computed, receiver 33 can compute each integer ambiguity $n_{25(i)/34/35(m)}$. This is done by plugging a computed baseline vector $b_{35(m)}$ and the phase measurement $\Phi_{25(i)/34/35(m)}$ recorded by receiver 33 at the initial epoch into Equation (55) and solving for the integer ambiguity $n_{25(i)/34/35(m)}$. As a built in integrity check, the computed $n_{25(i)/34/35(m)}$ values are checked during the initialization period to see that they converge to integer values.

Once the integer ambiguities have been resolved, the initialization process is over and attitude solutions for airplane 21 can then be computed. The integer ambiguities $n_{25(i)/34/35(m)}$ are included in the set of initialization values needed for computing the attitude solutions.

FIG. 9 shows the vector relationships associated with antennas 35(1)–(3) with respect to the body coordinate system 47. The known vectors $k_{35(1)}$, $k_{35(2)}$, and $k_{35(3)}$ respectively represent the precisely surveyed positions of attitude antennas 35(1)–(3) from antenna 34 with respect to the body coordinate system 47. The known vector $k_{35(m)}$ [3×1] (i.e. the $m^{th}$ of the known vectors $k_{35(1)}$, $k_{35(2)}$, and $k_{35(3)}$) is provided as follows in Equation (61):

$$k_{35(m)} = \begin{bmatrix} k_{35(m)/X} \\ k_{35(m)/Y} \\ k_{35(m)/Z} \end{bmatrix} \quad (61)$$

where $k_{35(m)/X}$, $k_{35(m)/Y}$, and $k_{35(m)/Z}$ are respectively the known distances between antennas 35($m$) and 34 in the X, Y, and Z directions.

FIG. 10 shows the vector relationships associated with antennas 35(1)–(3) as the body coordinate system 47 rotates about the runway coordinate system 46. The unknown vectors $x_{35(1)}$, $x_{35(2)}$, and $x_{35(3)}$ respectively represent the unknown positions of attitude antennas 35(1), 35(2), and 35(3) from antenna 34 with respect to the runway coordinate system 46. The unknown vector $x_{35(m)}$ [3×1] (i.e. the $m^{th}$ of the unknown vectors $x_{35(1)}$, $x_{35(2)}$, and $x_{35(3)}$) is provided as follows in Equation (62):

$$x_{35(m)} = \begin{bmatrix} x_{35(m)/AT} \\ x_{35(m)/CT} \\ x_{35(m)/A} \end{bmatrix} \quad (62)$$

where $x_{35(m)/AT}$, $x_{35(m)/CT}$, and $x_{35(m)/A}$ are respectively the unknown distances between antennas 35($m$) and 34 in the along track AT, cross track CT, and altitude A directions.

From the preceding vector relationships in Equations (53) and (62), the following relationship is provided in Equation (63):

$$\Delta r_{24(i)/34/35(m)} = \hat{s}^T_{24(i)} x_{35(m)} \quad (63)$$

Combining Equations (63) and (51) results in the following relationship in Equation (64):

$$\Phi_{25(i)/34/35(m)} = \hat{s}^T_{24(i)} x_{35(m)} - n_{25(i)/34/35(m)} \quad (64)$$

Since, as discussed earlier, the attitude matrix A represents the rotation of the body coordinate system 47 about the runway coordinate system 46, the following relationship may be established in Equation (65):

$$x_{35(m)} = A^T k_{35(m)} \quad (65)$$

Combining equation (65) with Equation (64) results in the following relationship provided by Equation (66):

$$\Phi_{25(i)/34/35(m)} = \hat{s}^T_{24(i)} A^T k_{35(m)} - n_{25(i)/34/35(m)} \quad (66)$$

A complete attitude solution can be generated by receiver 33 by utilizing the differential ranges $\Delta r_{24(i)/34/35(m)}$ which can be computed from Equation (51). This is done by minimizing the following quadratic cost function provided in Equation (67):

$$J = \sum_{m=1}^{l} \sum_{i=1}^{j} w_{35(m)/24(i)} (\Delta r_{24(i)/34/35(m)} - k^T_{35(m)} A \hat{s}_{24(i)})^2 \quad (67)$$

where $w_{35(m)/24(i)}$ represent the optional measurement weighting associated with antenna 35(m) and GPS satellite 24(i). Starting with an assumed estimate $A_0$[3×3] for the matrix A, a better estimate may be obtained by linearizing Equation (67) about the current solution $A_0$ as follows in Equation (68):

$$J = \sum_{m=1}^{l} \sum_{i=1}^{j} w_{35(m)/24(i)} (\Delta r_{24(i)/34/35(m)} - k^T_{35(m)} \delta A A_0 \hat{s}_{24(i)})^2 \quad (68)$$

where δA [3×3] is an attitude correction matrix of small angle rotations.

Thus, the attitude matrix A may be expressed as follows in Equation (69):

$$A = \delta A A_0 \quad (69)$$

The correction matrix δA is expressed as follows in Equation (70):

$$\delta A = I + \Theta^x \quad (70)$$

where (A) I [3×3] is an identity matrix, and (B) $\Theta^x$ [3×3] is the skew symmetric matrix associated with the unknown vector δΘ of small angle rotations.

The unknown vector δΘ [3×1] can be expressed as follows in Equation (71):

$$\delta \Theta = \begin{bmatrix} \delta \theta_X \\ \delta \theta_Y \\ \delta \theta_Z \end{bmatrix} \quad (71)$$

where $\delta\Theta_x$, $\delta\Theta_y$, and $\delta\Theta_z$ respectively represent the unknown small angle rotations about the X, Y, and Z coordinates of the body coordinate system 47.

The skew symmetric matrix $\Theta^x$ associated with the vector δΘ can be expressed as follows in Equation (72):

$$\Theta^x = \begin{bmatrix} 0 & -\delta\theta_Z & \delta\theta_Y \\ \delta\theta_Z & 0 & -\delta\theta_X \\ -\delta\theta_Y & \delta\theta_X & 0 \end{bmatrix} \quad (72)$$

After combining Equations (69)–(72) with Equation (68), the attitude cost function can be expressed as follows in Equation (73):

$$J = \sum_{m=1}^{l} \sum_{i=1}^{j} w_{35(m)/24(i)} (\Delta r_{24(i)/34/35(m)} - k^T_{35(m)} A_0 \hat{s}_{24(i)} - \hat{s}_{24(i)} A_0^T K^x_{35(m)} \delta\theta)^2 \quad (73)$$

where the dot product of the matrix $K_{35(m)}$ and the vector δΘ equals the dot product of the matrix $\Theta^x$ and the vector $k_{35(m)}$.

The matrix $K^x_{35(m)}$ may be represented as follows in Equation (74):

$$K^x_{35(m)} = \begin{bmatrix} 0 & -k_{35(m)/AT} & k_{35(m)/AT} \\ k_{35(m)/CT} & 0 & -k_{35(m)/CT} \\ -k_{35(m)/A} & k_{35(m)/A} & 0 \end{bmatrix} \quad (74)$$

By minimizing Equation (73), the vector δΘ may be computed by receiver 33. As a result, the matrix $\Theta^x$ may be computed from Equation (72) and the matrix δA may then be computed from Equation (70). Using the computed matrix δA and the computed matrix $A_0$, receiver 33 computes a more accurate estimate for matrix A from Equation (69).

The estimate A from the previous iteration is used as the current solution $A_0$ for the next iteration. The new estimate A is then computed and compared with the estimate A from the previous iteration. This process is continued until the estimate for A converges to within a desired level.

Another significant advantage to this approach is that the integer ambiguities $n_{25(i)/34/35(m)}$ of an additional GPS signal 25(i) broadcast by GPS satellite 24(i) which was not in view during the initialization period can be resolved once it does become in view after the initialization period. Receiver 33 accomplishes this by measuring $\Phi_{25(i)/34}$ and $\Phi_{25(i)/35(m)}$ for the new GPS signal 25(i) at a particular epoch after the initialization period. At this epoch the matrix A has already being determined by receiver 33 from the other GPS signals 25(1)–(m) which have had their respective integer ambiguities $n_{25(i)/34/35(m)}$ resolved during the initialization period. The calculated attitude matrix A and the phase measurements and $\Phi_{25(i)/35(m)}$ are substituted into Equation (61) so as to solve for the new integer ambiguity $n_{25(i)/34/35(m)}$. Then, this newly computed integer ambiguity $n_{25(i)/34/35(m)}$ together with the phase measurements for the newly acquired GPS signal 25(i) may be used in computing the matrix A in the two ways just described. Thus, this technique results in a seamless integer hand-off so that a new initialization period is unnecessary.

DETAILED DESCRIPTION OF GROUND SYSTEM

FIGS. 2–4 as well as FIGS. 5 and 6 show the various configurations for the reference ground system 39. As shown in these figures, the reference system 39 can comprise one or more of the reference omni-marker beacons 29(1)–(3) and one or more of the initialization omni-markers 26(1)–(2).

FIG. 2 shows the preferred configuration where three reference omni-marker beacons 29(1)–(3) are used. As was indicated earlier, the three reference omni-markers 29(1)–(3) are at known locations. These omni-marker beacons are strategically placed so that the broadcast radii of the signal bubbles 31(1)–(3) overlap and so that each of the signal bubbles 28(1)–(2) is within each of the signal bubbles 31(1)–(3). In the preferred embodiment, the omni-markers 29(1)–(3) are placed at approximately 300 meters from the runway 23 threshold on around the airport vicinity with one of the omni-marker beacons being located on the top of the control tower of the airport. However, in mountainous areas they may be strategically placed so as to direct the signals 30(1)(1)–(m), 30(2)(1)–(m), and 30(3)(1)–(m) in the direction of the airport. And, the power used to generate the signal bubbles 31(1)–(3) is selected to be approximately 100 µW.

In the configurations of FIGS. 3 and 4, a single reference omni-marker is used. It is placed at known location so that the signal bubbles 28(1)–(2) in FIG. 3 and the lone signal bubble 28(1) in FIG. 4 are within the broadcast radius of the signal bubble 31(1). In the preferred embodiment, like in the configuration of FIG. 2, the power level selected for generating the signal bubble 31(1) is approximately 100 µW. Moreover, the omni-marker 29(1) is placed at approximately 300 meters on top of the control tower of the airport.

The preferred configuration shown in FIG. 2 and 5 and the configuration shown in FIG. 3 employ the dual initialization omni-marker configuration discussed earlier. As was suggested, in these configurations, the initialization omni-marker beacons 26(1)–(2) are placed on each side of the estimated flight trajectory in the along track direction. In the preferred embodiment, these antennas are located on each side of the along track axis approximately 100meters apart in the cross track direction and are approximately 1000 meters in front of the runway 23 threshold in the along track direction.

Furthermore, the power level for the signal bubbles 28(1)–(2) is selected so that the broadcast radii of the two signal bubbles 28(1)–(2) will overlap at a height which is larger than the nominal altitude (i.e. the normal altitude) for an estimated flight trajectory along the along track axis and between the omni-marker beacons 26(1)–(2). In the preferred embodiment, the nominal altitude for a flight trajectory inside the signal bubbles 28(1)–(2) will be approximately several hundred meters. As a result, the power used will be on the order of several µW so that signal bubbles 28(1)–(2) have broadcast radii which overlap at a height greater than the preferred nominal altitude of several hundred meters.

Each of these omni-markers 26(1)–(2) and 29(1)–(3) are basically configured the same. A top level block diagram of the preferred configuration for each of the omni-markers 26(1)–(2) and 29(1)–(3) is shown in FIG. 18.

As shown in this figure, each of the receive antennas 41($k$) or 40($j$) (i.e. the receive antenna for the $k^{th}$ of the omni-marker beacons 26(1)–(3) or the receive antenna for the $j^{th}$ of the omni-marker beacons 29(1)–(3) shown in FIGS. 2–4, 5, and 6) receives the GPS signals 25(1)–($m$). The receive antenna 41($k$) or 40($j$) then provides the detected GPS signals 25(1)–($m$) to the reference GPS transceiver 42($k$) or 44($j$) (i.e. the receive antenna for the $k^{th}$ of the omni-marker beacons 26(1)–(3) or the receive antenna for the $j^{th}$ of the omni-marker beacons 29(1)–(3) shown in FIGS. 2–4, 5, and 6).

The reference transceiver 42($k$) or 44($j$) includes a signal receiving stage 53, a multi-channel signal processing stage 51, a reference oscillator 55, a synthesizer 56, a computer 57, and a signal transmitting stage 52.

Figure 18:
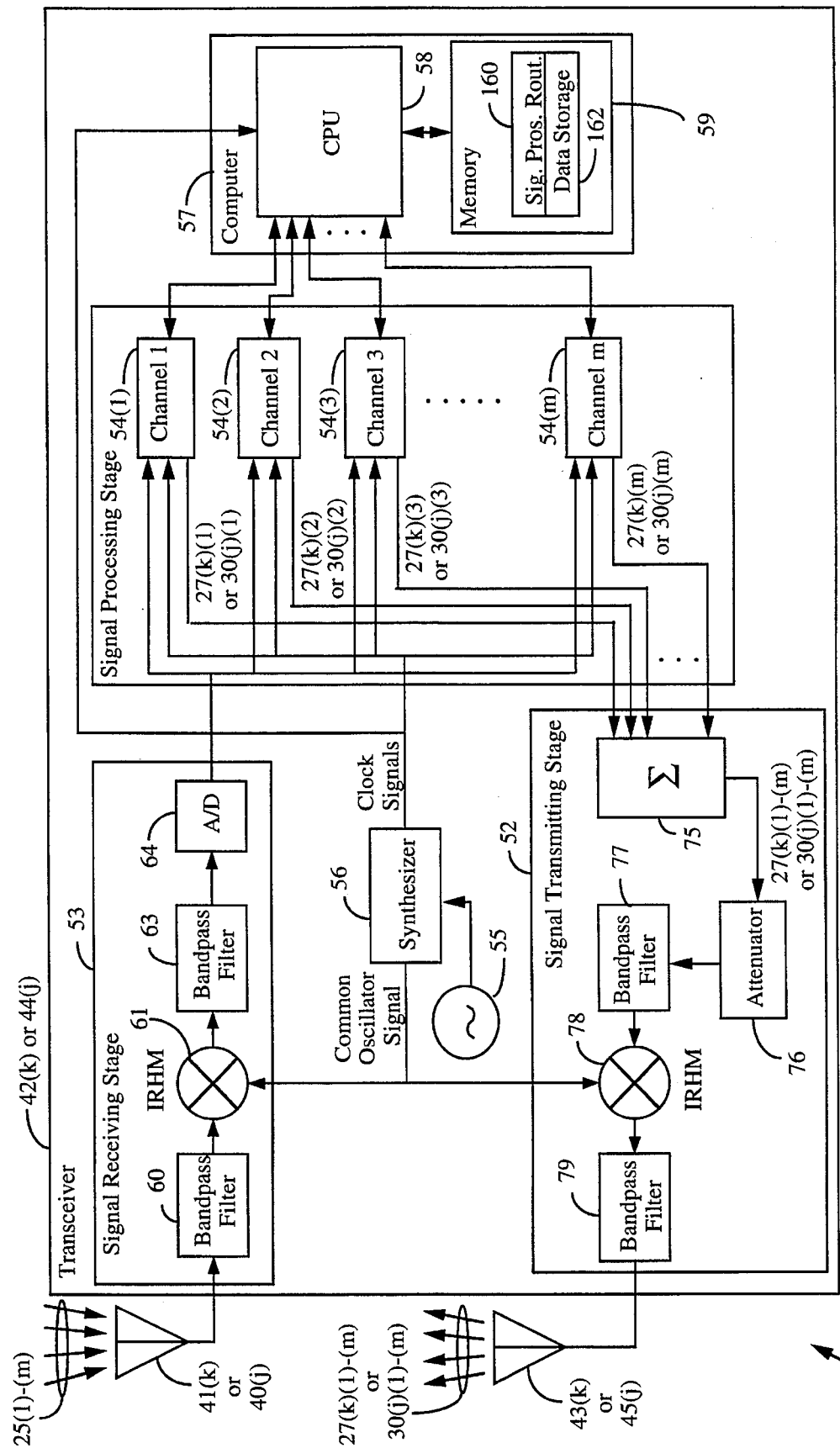
FIG. 18 shows a detailed description of an omni-marker in accordance with the present invention.

As shown in FIG. 18, bandpass filter 60 of the signal receiving stage 53 is coupled to the receive antenna 41($k$) or 40($j$) for receiving the GPS signals 25(1)–($m$). The bandpass filter 60 extracts the GPS signals 25(1)–($m$) and provides them to the image rejection harmonic mixer 61. The mixer 61 down converts each of the GPS signals 25(1)–($m$) to an intermediate frequency of approximately 4 MHz. The down converted GPS signals 25(1)–($m$) are then filtered by the bandpass filter 63 to suppress all spurious signals. The signal is then converted to a digital signal by an analog to digital (A/D) converter 64. This may simply be a hard limiter which amplifies the GPS signals 25(1)–($m$) to the point of saturation. Thus, the signal receiving stage extracts the received GPS signals 25(1)–($m$) and prepares them for signal processing by the signal processing stage 51.

The signal processing stage 51 includes m signal processing channels 54(1)–($m$) for processing m GPS signals including GPS signals 25(1)–($m$). Each channel 54($i$) is configured similarly and is coupled to the A/D converter 64 for receiving the m down converted GPS signals 25(1)–($m$).

Figure 19:
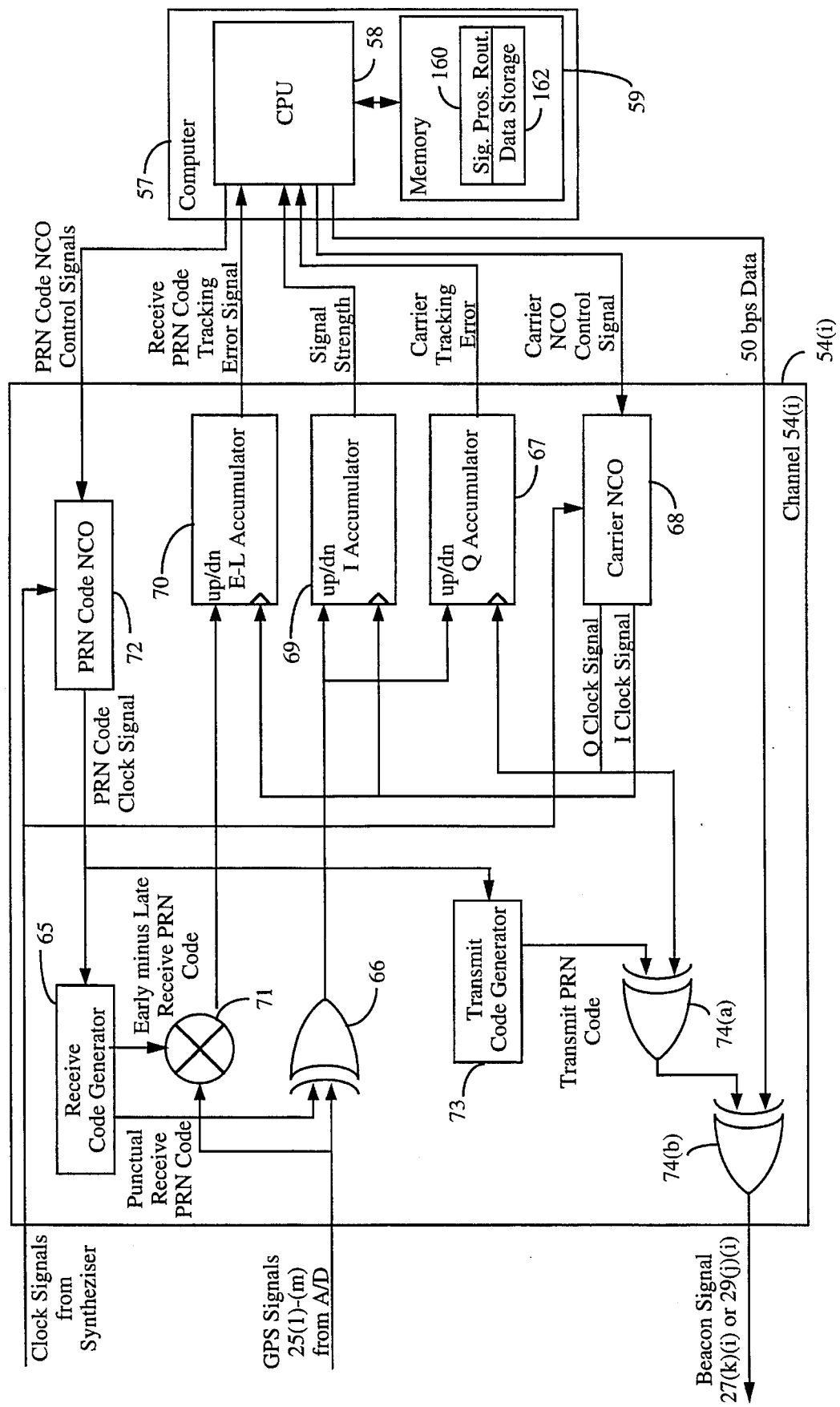
FIG. 19 shows a detailed description of a signal processing channel an omni-marker in accordance with the present invention.

FIG. 19 shows a detailed block diagram of the $i^{th}$ of the channels 54(1)–($m$). The channel 54($i$) includes a receive PRN code generator 65 which generates a punctual version of the PRN code component of the received GPS signal 25($i$) which is provided to the multiplier 66. The receive PRN code generator 65 for each channel 54($i$) of the signal processing stage 51 produces a different assigned GPS PRN code component than any of the other receive PRN code generators 65. As will be evident shortly, this is so that each channel 54($i$) can lock onto a different GPS signal 25(1)–($m$).

As shown, the multiplier can be an exclusive-or gate. The multiplier 66 multiplies the punctual version of the PRN code of GPS signal (i) with the down converted GPS signals 25(1)–($m$) received from the A/D converter 64 to reconstruct the carrier component of the GPS signal (i).

The reconstructed carrier component (i.e. the output of the multiplier 66) is provided to the Q accumulator 67. The Q accumulator 67 is typically an up/down counter. It also receives from the carrier numerically controlled oscillator (NCO) 68 a Q clock signal. The Q accumulator compares the Q clock signal and the reconstructed carrier component and in response measures the tracking error and outputs a carrier tracking error signal provided to the computer 57.

The computer 57 includes a central processing unit (CPU) 58 and a memory 59. The memory 59 stores a signal processing routine 160 for controlling the operations of the m signal processing channels 54(1)–($m$). In response to the carrier tracking error signal, the signal processing routine 160 generates control signals which are provided by the CPU 58 to the carrier NCO 68 for steering the Q clock signal (i.e. speeding up or slowing down the Q clock signal depending on the polarity and size of the error) so that the tracking error signal indicates no tracking error. When this occurs, the Q clock signal is exactly in phase with the reconstructed carrier component and the Q clock signal is phase locked to the carrier component of the GPS signal 25($i$).

Furthermore, the reconstructed carrier component (i.e. the output of the multiplier 66) is also provided to the I accumulator 69. Like the Q accumulator, the I accumulator 69 is typically an up/down counter. The I accumulator 69 receives from the carrier NCO 68 an I clock signal which is 90° out of phase (i.e. in quadrature) with the Q clock signal. The I accumulator compares the I clock signal and the reconstructed carrier component and in response measures the signal strength. The output signal is provided to the CPU 58 as the 50 bits per second data component of the GPS signal (i) which was modulated onto its carrier component.

Moreover, the mixer 71 receives the incoming downconverted GPS signals $25(1)$–$(m)$ from the A/D converter 64. It also receives from PRN code generator 65 the difference between an early version and a late version of the PRN code component (i.e. an early minus late PRN code signal) of the GPS signal $25(i)$. The mixer 71 mixes the early minus late PRN code signal with the incoming GPS signals $25(1)$–$(m)$ to produce a mixer output signal.

The early minus late (E/L) accumulator 70 receives the mixer output signal samples (mixes) it with the I clock signal from the carrier NCO 68 to strip out the carrier component. Thus, the output of the E/L accumulator 70 is the PRN code tracking error signal and is proportional to the tracking error for the PRN code component of GPS signal $25(i)$.

In response to the PRN code tracking error signal, the signal processing routine 160 generates control signals which are provided by the CPU 58 to the PRN code numerically controlled oscillator (NCO) 72 for steering the tracking error to zero. In response to these signals, the PRN code NCO 72 steers the clock signal it produces so that the punctual version of the PRN code produced by the PRN code receive generator 65 is exactly in phase with the PRN code component of the GPS signal $25(i)$. When this occurs, the PRN code tracking error signal will indicate no tracking error and the punctual version of the PRN code component of GPS signal $25(i)$ is phase locked to the actual PRN code component of this signal.

Thus, the receive code generator 65, the multiplier 66, the Q accumulator 67, the computer 57, the PRN code NCO 72, and the carrier NCO 68 together form a phased lock loop for phase locking onto the carrier component and the PRN component of the GPS signal (i). This form of a phase locked loop is well known in the art and is commonly found in the signal processing channels of commercially available GPS receivers such as the Trimble 4000 Series GPS receiver.

However, unlike these conventional receivers, each of the m channels $54(1)$–$(m)$ of transceiver $42(k)$ or $44(j)$ include a transmit PRN code generator 73 and a second multiplier 74. The transmit code generator 73 is configured the same as the conventional receive PRN code generator 72 except that it generates a unique unassigned PRN code component. Furthermore, the multiplier 74 is configure$_d$ the same as the conventional multiplier 66.

The transmit PRN code generator 72 receives the clock signal produced by the PRN code NCO 72. In response, it produces a unique unassigned GPS PRN code component. As was stated earlier, the clock signal produced by the PRN code NCO 72 results in the phase locked punctual version of the receive PRN code component of the GPS signal $25(i)$ produced by the receive PRN code generator 65. Since the transmit PRN code generator 73 receives this clock signal as well, the unique unassigned transmit PRN code component it produces is also in phase with the PRN code component of the received GPS signal $25(i)$.

This phase locked PRN code component is then provided to the multiplier $74(a)$. The multiplier $74(a)$ also receives the Q clock signal which is phase locked to the reconstructed carrier component of the GPS signal $25(i)$. The multiplier $74(a)$ multiplies these signals together and the product is then multiplied by the multiplier $74(b)$ with a 50 bit per second data stream from the computer 57. As suggested earlier, this data stream can contain important runway and airport status information as well as the position vector $p_{26(k)}$ or $p_{29(j)}$ for the omni-marker $26(k)$ or $29(j)$ which is all stored in the data memory 162 of the computer 57. Thus the output of the multiplier one of the beacon marker signals $27(k)(1)$–$(m)$ or $30(j)(1)$–$(m)$ (i.e. the $i^{th}$ of the beacon marker signals $27(1)(1)$–$(m)$ and $27(2)(1)$–$(m)$ generated by the $k^{th}$ of the omni-markers $26(1)$-$(2)$ and phase locked to the $i^{th}$ GPS signal $25(1)$–$(m)$ or the $j^{th}$ of the beacon marker signals $30(1)(1)$–$(m)$, $30(2)(1)$–$(m)$, and $30(3)(1)$–$(m)$ generated by the $j^{th}$ of the omni-markers $26(1)$-$(2)$ and phase locked to the $i^{th}$ GPS signal $25(1)$–$(m)$).

Referring again to FIG. 18, the summer 75 of the signal transmitting stage 52 of transceiver $42(k)$ or $44(j)$ receives the phase locked signals $27(k)(1)$–$(m)$ or $30(j)(1)$–$(m)$ from the m channels $54(1)$–$(m)$ of the signal processing stage 51. In response, it sums together these signals and provides them to the attenuater 76.

For the omni-markers $26(1)$–$(2)$, the attenuater 76 reduces the strength of the received signal so that the summed signals $27(k)(1)$–$(m)$ are provided to the bandpass filter 77 at a power level of 1 μW. However, for the omni-markers $29(1)$–$(3)$, the attenuater 76 reduces the strength of the received signal so that the summed signals $30(j)(1)$–$(m)$ are provided to the bandpass filter 77 at a power level of 100 μW.

These summed signals $27(k)(1)$–$(m)$ or $30(j)(1)$–$(m)$ are then filtered by the bandpass filter 77 to get rid of any spurious signals and to round out the summed signals $27(k)(1)$–$(m)$ or $30(j)(1)$–$(m)$ so that they are in sinusoidal form. Alternatively, a digital synthesizer and a digital to analog (D/A) converter can be placed prior to the attenuater 76 to convert the summed signals $27(k)(1)$–$(m)$ or $30(j)(1)$–$(m)$ to analog form.

The summed signals are then provided to the intermediate frequency harmonic mixer 78. The mixer 78 up-converts the summed signals $27(k)(1)$–$(m)$ or $30(j)(1)$–$(m)$ to the L1 carrier frequency of 1.575 GHz. These signals are filtered again so as to remove spurious signals by the bandpass filter 79. Thus, the signal trnasmitting stage prepares the generated beacon marker signals $27(k)(1)$–$(m)$ or $30(j)(1)$–$(m)$ for transmission.

The signals $27(k)(1)$–$(m)$ or $30(j)(1)$–$(m)$ are then transmitted by the transmit antenna $43(k)$ or $45(j)$ (i.e. the transmit antenna for the $k^{th}$ of the omni-marker beacons $26(1)$–$(3)$ or the transmit antenna for the $j^{th}$ of the omni-marker beacons $29(1)$–$(3)$ shown in FIGS. 2–4, 5, and 6).

It is important here to note that the same local oscillator signal is provided by the reference oscillator 55 for downconversion and up-conversion by the mixers 61 and 78 respectively. This ensures that the outgoing transmitted signals $27(k)(1)$–$(m)$ or $30(j)(1)$–$(m)$ are phase coherent (i.e. in phase) with the incoming GPS signals $25(1)$–$(m)$.

Figure 20:
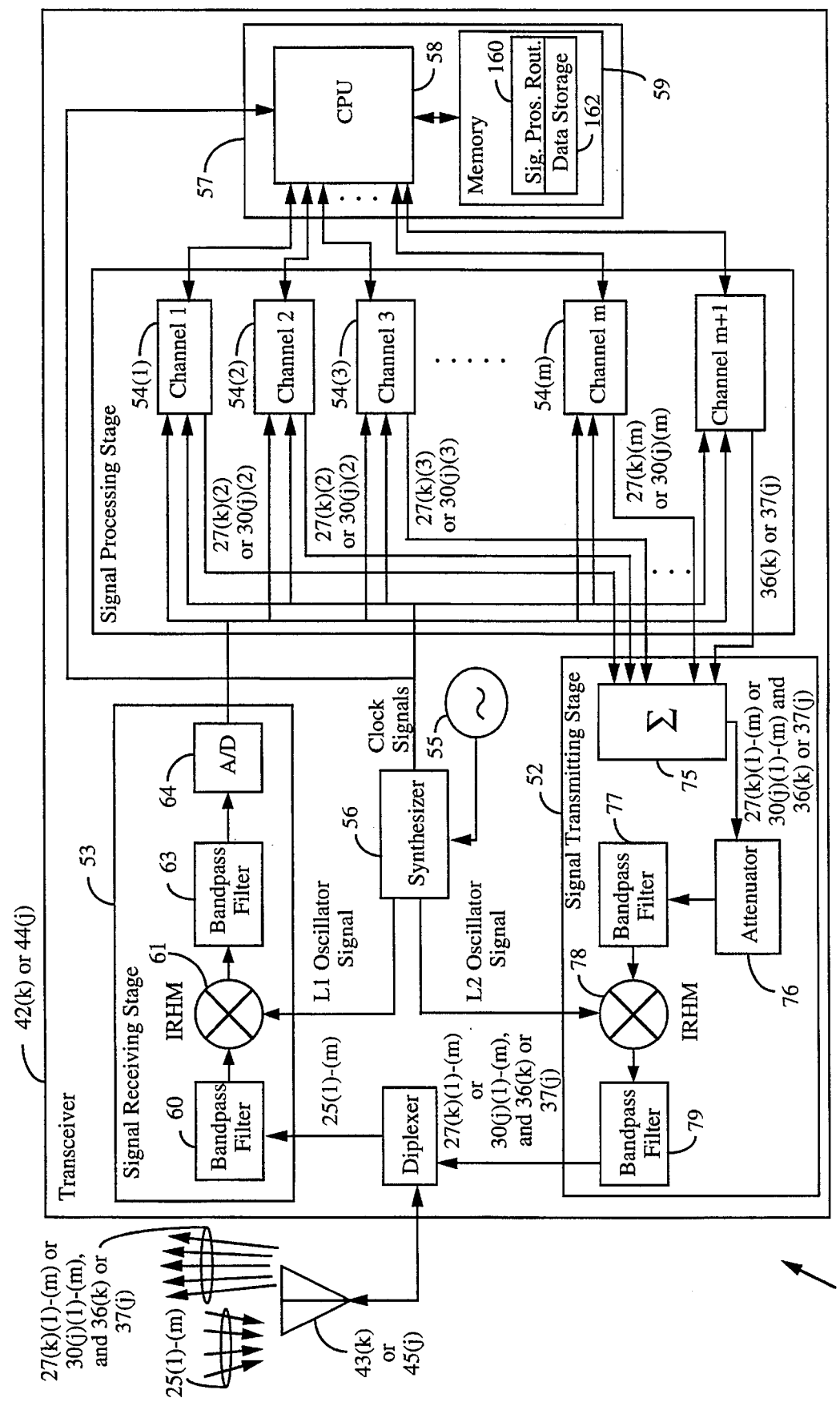
FIG. 20 shows a detailed description of an alternative omni-marker in accordance with the present invention.
Figure 21:
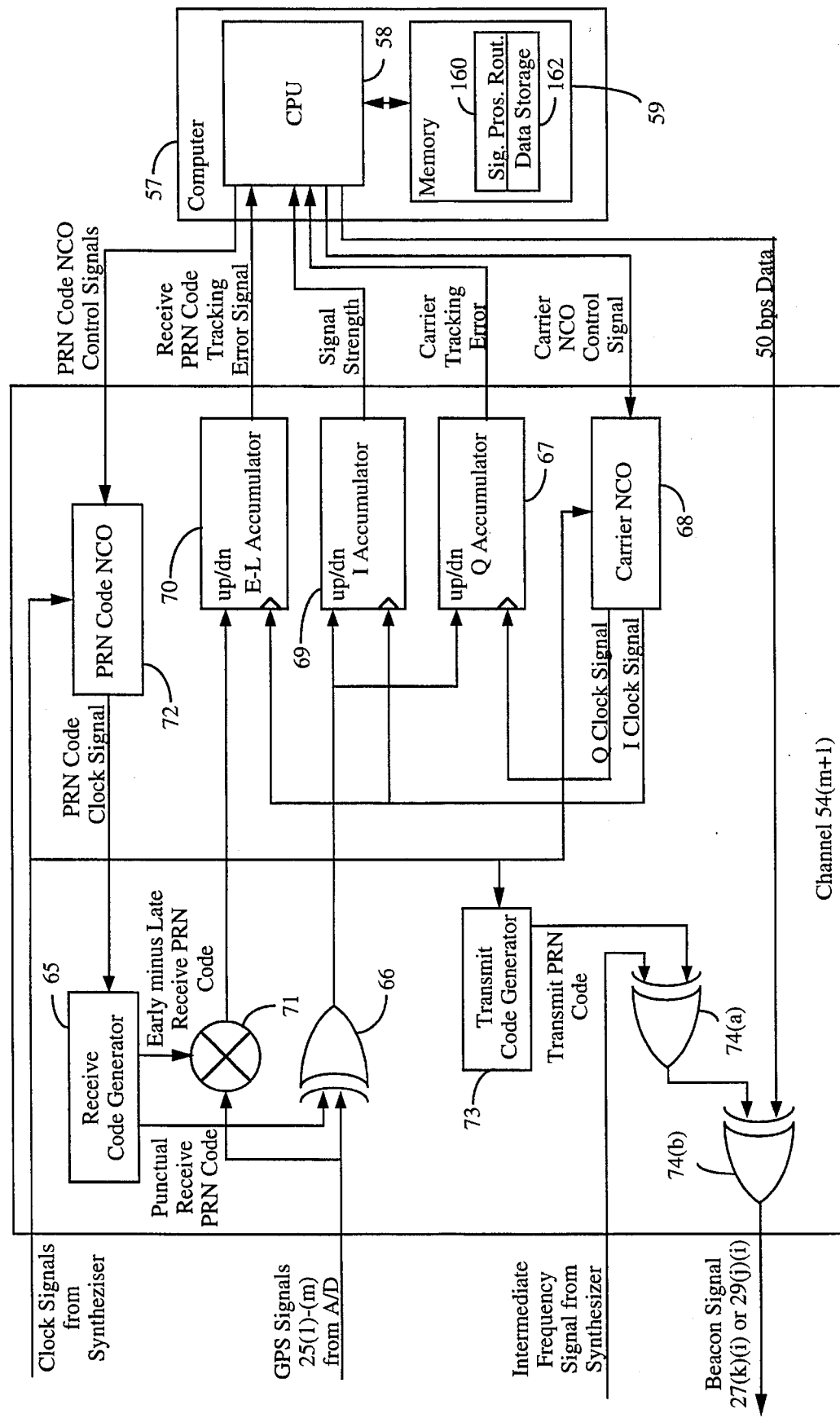
FIG. 21 shows a detailed description of a signal processing channel of the omni-marker in FIG. 20.

FIGS. 6, 20, and 21 present an alternative configuration for the omni-marker $26(k)$ or $30(j)$. In this configuration, the omni-marker $26(k)$ or $30(j)$ includes only a single collocated receive and transmit antenna $43(k)$ or $45(j)$. The receive and transmit antenna $43(k)$ or $45(j)$ provides the received signals $25(1)$–$(4)$ to the conventional configured diplexer 62. The diplexer 62 routes the incoming L1 GPS signals $25(1)$–$(m)$ from the receive and transmit antenna $43(k)$ or $45(j)$ and simultaneously routes the outgoing L2 beacon marker signals 27(k)(1)–(m) or 30(j)(1)–(m) to the receive and transmit antenna 43(k) or 45(j) for transmission.

The diplexer 62 then sends only the L1 C/A GPS signals 25(1)–(4) to the signal receive stage 53 which is configured in the same way as the signal receive stage 53 in FIG. 18 and performs the same signal extraction and down conversion operations. Furthermore, the signal processing stage 51 includes the same m channels 54(1)–(m) for generating the phase locked signals 27(k)(1)–(m) or 30(j)(1)–(m). However, the signal processing stage 51 of this configuration also includes an additional channel 54(m+1) which will be explained shortly.

The signal transmitting stage 52 is configured in the same way as the signal transmitting stage 52 of FIG. 18 except that the up-conversion mixer 78 receives a local oscillator signal which is different from the local oscillator signal received by the down-conversion mixer 61. Based on this signal, the mixer 61 up converts the summed signals 27(k)(1)–(m) or 30(j)(1)–(m) to a frequency, such as the L2 frequency 1.227 GHz, which is different than the L1 frequnecy 1.575 GHz. This is done in order to provide the frequency isolation necessary for the diplexer 62 to distinguish between the outgoing transmitted signals 27(k)(1)–(m) or 30(j)(1)–(m) and the incoming GPS signals 25(1)–(m).

But, since the reference oscillator 55 is not a perfect clock, carrier phase ranging biases for Carrier Phase Differential GPS position determinations are introduced by the described frequency translation. In order to avoid this problem, the additional channel 54(m+1) is included in the signal processing stage 51. As shown in FIG. 21, an intermediate frequency signal from the synthesizer 56, having the earlier described intermediate frequency, is provided to the multiplier 74(a) of this. channel. And, the transmit PRN code generator 73 of this channel generates the unique PRN code component simply based on a clock signal provided by the synthesizer 56.

The multiplier 74(a) then multiplies these two signals together to produce the additional signals 36(k) or 37(j) (i.e. the $k^{th}$ of the additional signals 36(1)–(2) described earlier or the $j^{th}$ of the additional signals 37(1)–(3) described earlier and shown in FIG. 6). Thus, this signal is simply a PRN coded L2 pilot carrier signal. After it is summed, attenuated, filtered, up-converted and transmitted together with the other signals 27(k)(1)–(m) or 30(j)(1)–(m) produced by the signal processing stage 51. Referring to FIG. 6, since this signal serves as a relay for providing the receiver 32 with the local oscillator signal used to up-convert the signals 27(k)(1)–(m) or 30(j)(1)–(m), position receiver 32 can make corrective computations to eliminate the error introduced by the frequency translation.

In either of the configurations described, the PRN code component generated by the transmit PRN code generator 73 is unique so as to avoid confusion among other users of GPS. Therefore, the unique PRN code component generated by the transmit PRN code generator is (a) different from any of the PRN code components of any GPS signal 25(i) received, (b) different from any other PRN code component generated by the m channels 54(1)–(m), and (c) different than any other PRN code component produced by another omni-marker beacon 26(k) or 29(j) used in the same ground system 39.

The PRN code component generated by the transmit PRN code generator 73 may be different from the received PRN code component of the GPS signals 25(1)–(m) in several ways. It may simply include the same sequence of random binary pulses as the PRN code component of the corresponding GPS signal 25(1)–(m) to which it is phase locked. But, this sequence of pulses will be out of phase with the sequence of pulses of the PRN code component of the corresponding GPS signal 25(1)–(m) by a predefined and significant amount so as to avoid confusion. In other words, the twp PRN code components are phase locked and have the same sequence of pulses, but these pulses occur at substantially different times in GPS system time. Alternatively, it may simply be a completely different and arbitrary sequence.

However, as is evident from the foregoing discussion, each of the PRN code components of the beacon marker signals 27(1)(1)–(m), 27(2)(1)–(m), 30(1)(1)–(m), 30(2)(1)–(m), and 30(3)(1)–(m) corresponds to one of the PRN code components of the GPS signals 25(1)–(m). As a result, the position receiver 32 can make the earlier described Code Based Differential GPS and Carrier Phase Differential GPS position determinations by recognizing the predefined and previously unassigned PRN code components that correspond to the already assigned PRN code components of the GPS signals 25(1)–(m).

DETAILED DESCRIPTION OF THE MOBILE SYSTEM

FIGS. 22–26 provide detailed illustrations of the GPS mobile system 37 which makes up part of the entire GPS system 20. The functions of the components of the mobile system 37, in relation to the previously described equations, are better understood with reference to these figures.

FIGS. 5 and 6 show one embodiment of mobile system 37. In this embodiment, mobile system 37 includes GPS position receiver 32, GPS attitude receiver 33, antennas 34, 35(1)–(3), and 38.

Figure 22:
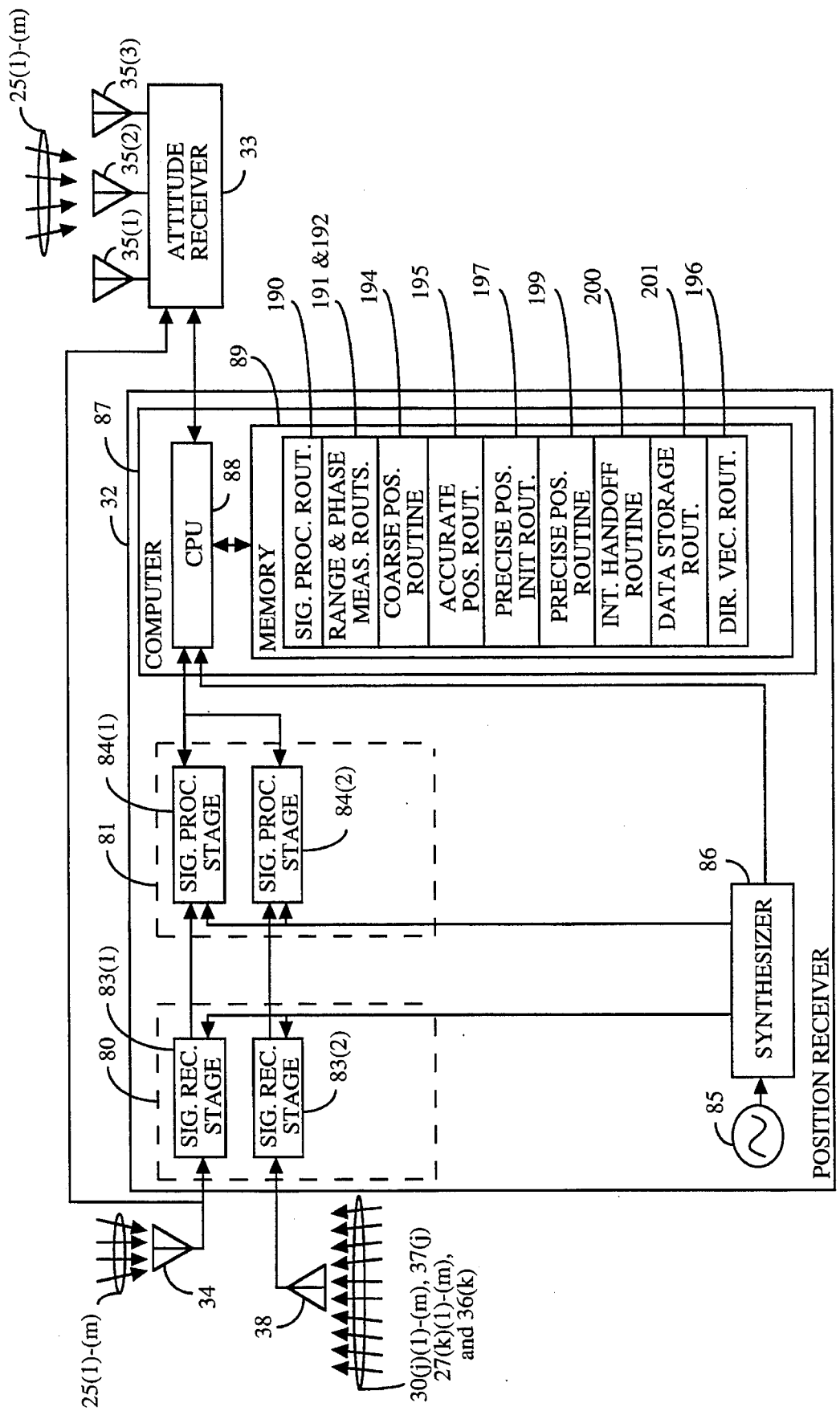
FIG. 22 provides a detailed illustration of a portion of a GPS mobile system which is part of the entire GPS system of FIG. 2–6 and which includes a GPS position receiver and several antennas.

FIG. 22 provides a more detailed illustration of part of the configuration of FIGS. 5 and 6. This figure shows the relationship between antennas 34 and 38 and GPS receiver 32.

The antenna 34 receives GPS signals 25(1)–(m). As was indicated earlier, its position with respect to the runway 23 threshold is given by the vector x.

The antenna 38 can receive the GPS signals 25(1)–(m) and the beacon marker signals 27(1)(1)–(m), 27(2)(1)–(m), 30(1)(1)–(m), 30(2)(1)–(m), and 30(3)(1)–(m). Furthermore, if the transceiver 42(k) or 44 (k) outputs these beacon marker signals at the L2 frequency, then the signals 36(1)–(2) and 37(1)–(3) may also be received by the antenna 38. As was also indicated earlier, its position with respect to the runway 23 threshold is given by the vector y.

GPS position receiver 32 receives the signals 25(1)–(m), 27(1)(1)–(m), 27(2)(1)–(m), 30(1)(1)–(m), 30(2)(1)–(m), 30(3)(1)–(m), 36(1)–(2), and 37(1)–(3) from the antennas 34 and 38. Similar to the transceivers 42(1)–(2) and 44(1)–(2), it includes a signal receiving block 80, a signal processing block 81, a reference oscillator 85, a synthesizer 86, and a computer 87.

In this configuration, the signal receiving block 80 comprises two signal receiving stages 83(1)–(2). The signal receiving stage 83(1) is coupled to antenna 34 for receiving the GPS signals 25(1)–(m). The signal receiving stage 83(2) is coupled to antenna 38 for receiving the beacon marker signals 27(1)(1)–(m), 27(2)(1)–(m), 30(1)(1)–(m), 30(2)(1)–(m), 30(3)(1)–(m), 36(1)–(2), and 37(1)–(3). The signal receiving stages 83(1)–(2) are configured and coupled in the same way and perform the same signal extracting and down converting functions for each of these signals as does the signal receiving stage 53 transceiver 42(k) or 44(j) shown in FIG. 18 and described earlier. However, if the beacon marker signals are at the L2 frequency, then the signal receiving stage 83(2) down converts the beacon marker signals from the L2 frequency to the intermediate frequnecy.

The signal processing block 81 includes two multi-channel signal processing stages 84(1)–(2). The signal processing stages 84(1)–(2) are respectively coupled to the signal receiving stages 83(1)–(2). The signal processing stages 84(1)–(2) are configured similar to, perform the same signal separating and phase locking functions as, and generate the same type of phase tracking information (i.e. error tracking signals) as does the signal processing stage 53 of transceiver 42(k) or 44(j) described earlier. The only difference is that the channels of the signal processing stages 84(1)–(2) do not include circuitry for outputting a phase locked version of the incoming signal. Furthermore, in order to perform the phase locking operation described earlier, each channel of the signal provessing stage generates the PRN code of one of the signals 27(1)(1)–(m), 27(2)(1)–(m), 30(1)(1)–(m), 30(2)(1)–(m), 30(3)(1)–(m), 36(1)–(2), and 37(1)–(3).

The computer 87 is coupled to each of the signal processing stages 84(1)–(2). It includes a central processing unit (CPU) 88 and a computer memory 89.

Similar to what was described earlier for transceiver 42(k) or 44(j), the CPU 88 receives from the signal processing stages 84(1)–(2) the information (i.e. carrier and PRN code tracking error signals) necessary for making the carrier phase measurements $\Phi_{25(i)/34}$, $\Phi_{27(k)(i)/38}$, and $\Phi_{30(j)(i)/38}$ and the PRN code range measurements $R_{25(i)/34}$, $R_{30(i)(j)/38}$, and $R_{27(i)(k)/38}$ for each received GPS signal 25(1)–(m), 27(1)(1)–(m), 27(2)(1)–(m), 30(1)(1)–(m), 30(2)(1)–(m), and 30(3)(1)–(m). Furthermore, the CPU 88 also receives from the signal processing block 81 the demodulated data components of these signals.

The computer memory 89 stores the signal processing routine 190, the carrier phase measuring routine 191, the PRN code range measuring routine 192, the coarse position generating routine 194, the accurate position generating routine 195, the GPS satellite unit directional vector computation routine 196, the initialization routine 197, the precise position generating routine 199, and the precise position integer hand-off routine 200. Data generated by the routines 190, 191, 194, and 195–200 are stored in the data storage area 201 of the computer memory 89. The CPU 88 is coupled to the computer memory 89 for receiving the routines 190–200 and the data in the data storage area 201.

The signal processing routine 190 generates the signal processing control signals for controlling the carrier and PRN code phase locking operations of the signal processing block 81. These control signals are outputted by the CPU 88 and received by the signal processing block 81 in the same manner as was described earlier for the transceiver 42(k) or 44(j) for omni-marker beacon 26(k) or 29(j) in FIG. 18.

The carrier phase measuring routine 191 makes the phase measurements $\Phi_{25(i)/34}$, $\Phi_{30(j)(i)/38}$, and $\Phi_{27(k)(i)/38}$ on the information (carrier tracking error signal) received from the signal processing block 81. It also makes the phase measuremnts $\Phi_{30(j)(i)/38}$ and $\Phi_{27(i)(i)/38}$ in the same way if the signals 37(1)–(3) or 36(1)–(2) are received. Thus, the routine 191 and the signal processing block 81 make up the carrier phase measuring component of the receiver 32. As was indicated earlier, each of these carrier phase measurement includes both a fractional wavelength phase component $\Phi_{fr}$ and an integer wavelength phase change component $\Phi_{int}$. These phase measurements are used by receiver 32 for making Carrier Phase Differential GPS position determinations.

The PRN code range measuring routine 192 makes the PRN code range measurements $R_{25(i)/34}$, $R_{30(j)(i)/38}$, and $R_{27(i)(k)/38}$ described earlier based on the information (i.e. PRN code tracking error signals) received from the signal processing block 81. Thus, the routine 192 and the signal processing block 81 make up the PRN code phase measuring component of the receiver 32. As was indicated earlier, these measurements are used by receiver 32 for Conventional GPS and Code Based Differential GPS position determinations.

As was stated earlier, in the preferred embodiment, the routines 191 and 192 issue their respective measurements at the rate of 1–10 Hz.

The coarse position generating routine 194 is called up by CPU 88 for coarse navigation when airplane 21 is out of view of the omni-marker beacons 26(1)–(2) and 29(1)–(3). The routine 194 computes position determinations (i.e. vector x) to within tens of meters of the exact location. This is done with Ordinary Code Based GPS using Equations (8) and (1) in the iiterative process discussed earlier. Thus, routine 194 computes vector x based on (A) the range measurements $R_{25(i)/34}$ computed at each epoch by the code range measuring routine 192, (B) the known position (i.e. vector c) of the beginning of the runway 23 stored by the data storage area 201, and (C) the known orbital position (i.e. vector $d_{24(i)}$) of each GPS satellite 24(1)–(m) provided by the data component of the corresponding GPS signals 25(1)–(m).

The unit directional vector computation routine 196 computes the vectors $\hat{s}_{24(i)/29(j)}$ and $\hat{s}_{24(i)/26(k)}$ in the way discussed earlier. Thus, these vectors are computed from (A) the satellite orbital positions received in the data components of the GPS signals 25(1)–(m), and (B) the known locations (i.e. $e_{29(j)}$ and $e_{26(k)}$) of the omni-marker beacons 26(1)–(2) and 29(1)–(3) stored by data storage area 201 or provided by the data components of the beacon marker signals 27(1)(1)–(m), 27(2)(1)–(m), 30(1)(1)–(m), 30(2)(1)–(m), and 30(3)(1)–(m).

The accurate position generating routine 195 is called up by CPU 88 for more accurate navigation when airplane 21 is in view of any of the beacons 26(1)–(2) or 29(1)–(3). The routine 195 generates position determinations (i.e. vector x) using Code Based Differential GPS to within several meters of the exact location. The routine 195 can do so in the two ways discussed earlier.

In the first method, PRN code ranging between the antenna 38 and the omni-marker beacons 26(1)–(2) and/or 29(1)–(3) occurs as well as the relaying of information necessary to compute Code Based Differential GPS positions. As was mentioned earlier, this is done by employing the Equations (29), (30), (31), and/or (32) and, if applicable, Equation (10) in the iterative manner previously described. Thus, routine 195 can compute these position determinations (i.e. vector x) based on (A) the range measurements $R_{25(i)/34}$, $R_{30(i)(j)/38}$, and $R_{27(i)(k)/38}$ computed at each measurement epoch by the routine 192, (B) the known locations (i.e. $p_{29(j)}$ and $p_{26(k)}$) of the omni-marker beacons 26(1)–(2) and 29(1)–(3) with respect to the runway 23 threshold which are stored in data storage area 201 or provided by the data components of the beacon marker signals 27(1)(1)–(m), 27(2)(1)–(m), 30(1)(1)–(m), 30(2)(1)–(m), and 30(3)(1)–(m), (C) the unit directional vectors $\hat{s}_{24(i)/29(j)}$ and $\hat{s}_{24(i)/26(k)}$ computed by routine 196, (D) the attitude matrix A computed by attitude receiver 33, and (E) the known vector k to antenna 38 stored by the data storage area 201.

In the second method, only relaying of information for making differential corrections is done. In this case, routine 195 can compute these position determinations by first computing the vector position $e_{29(j)}$ and/or the vector position $e_{26(k)}$ of the omni-marker beacons 26(1)–(2) and/or 29(1)–(3) using Equations (37) and/or (38) in the way described earlier. Thus, routine 195 can compute these position determinations based on (A) the range measurements $R_{30(i)(j)/38}$ and $R_{27(i)(k)/38}$ computed at each measurement epoch by the routine 192, and (B) the known orbital position (i.e. vector $d_{24(i)}$) of each GPS satellite 24(1)–(m) provided by the data component of the corresponding GPS signals 25(1)–(m). The routine 195 compares the computed vector position $e_{29(j)}$ and/or the vector position $e_{26(k)}$ with the actual known positions of the omni-marker beacons 26(k) or 29(j), and in response computes differential corrections to the range measurements $R_{30(i)(j)/38}$ and $R_{27(i)(k)/38}$.

Then, routine 195 computes the vector x using Equations (39) and/or (40) together with Equation (10) in the iterative manner described earlier. Thus, this computation is based on (A) the corrected range measurements $R_{30(i)(j)/38}$ and $R_{27(i)(k)/38}$ computed at each measurement epoch by the routine 195, (B) the known orbital position (i.e. vector $d_{24(i)}$) of each GPS satellite 24(1)–(m) provided by the data component of the corresponding GPS signals 25(1)–(m), (C) the known vector positions $e_{29(j)}$ and $e_{26(k)}$ of the omni-marker beacons 26(k) or 29(j) with respect to the center of the Earth 48, (D) the known vector positions $p_{29(j)}$ and $p_{26(k)}$ of the omni-marker beacons 26(k) or 29(j) with respect to the runway 23 threshold, (E) the attitude matrix A computed by attitude receiver 33, and (F) the known vector k to antenna 38 stored by the data storage area 201.

The initialization routine 197 generates the earlier described initialization values (i.e. the integer ambiguities $n_{25(i)/27(k)(i)}$ and $n_{25(i)/30(j)(i)}$ necessary for precise position determinations using Carrier Phase Differential GPS. It does so by employing the Equations (48), (49), and (10) in the iterative process previously discussed. Thus, the integer ambiguities integer ambiguities $n_{25(i)/27(k)(i)}$ and $n_{25(i)/30(j)(i)}$ are computed based on (A) the phase measurements $\Phi_{25(i)/34}$, $\Phi_{30(j)(i)/38}$, and $\Phi_{27(k)(i)/38}$ made by routine 192 and recorded by routine 197 over a number of measurement epochs by while airplane 21 is inside signal bubbles 28(1)–(2), (B) the known vector locations $p_{29(j)}$ and $p_{26(k)}$ of the omni-marker beacons 26(1)–(2) and 29(1)–(3) with respect to the runway 23 threshold and which are stored in data storage area 201 or provided by the data components of the beacon marker signals 27(1)(1)–(m), 27(2)(1)–(m), 30(1)(1)–(m), 30(2)(1)–(m), and 30(3)(1)–(m), (C) the unit directional vectors $\hat{s}_{24(i)/29(j)}$ and $\hat{s}_{24(i)/26(k)}$ computed by routine 196, (D) the attitude matrix A computed by attitude receiver 33, and (E) the known vector k to antenna 38 stored by the data storage area 201. The computed integer ambiguities $n_{25(i)/27(k)(i)}$ and $n_{25(i)/30(j)(i)}$ are recorded in data storage area 201.

If the position receiver 32 receives the beacon marker signals 27(1)(1)–(m), 27(2)(1)–(m), 30(1)(1)–(m), 30(2)(1)–(m), and 30(3)(1)–(m) at the L2 frequency, then the routine 197 computes corrections to the phase measurments $\Phi_{30(j)(i)/38}$ and $\Phi_{27(k)(i)/38}$ based on the phase measurments $\Phi_{37(j)/38}$ and $\Phi_{36(k)/38}$ made by routine 192 to eliminate the error introduced by the frequency translation of these signals by transceivers 42(k) and 44(j) of omni-markers 29(j) and 26(k).

The precise position generating routine 199 is called up by CPU 88 for precise position determinations when the integer ambiguities $n_{25(i)/27(k)(i)}$ and $n_{25(i)/30(j)(i)}$ have been resolved and airplane 21 is still in at least one of the signal bubbles 31(1)–(3) of the omni-marker beacons 29(1)–(3). The routine 199 generates position determinations using Carrier Phase Differential GPS to within centimeters of the exact location. The precise position routine 199 generates the precise position vector x with Equation (46) in the previously discussed way. Thus, it computes the vector x based on (A) the stored integer ambiguities $n_{25(i)/30(j)(i)}$ resolved by routine 197, (B) the phase measurements $\Phi_{25(i)/34}$ and $\Phi_{27(k)(i)/38}$ made by routine 192 at each measurement epoch, (C) the known vector locations $p_{29(j)}$ of the omni-marker beacons 29(1)–(3) with respect to the runway 23 threshold and which are stored in data storage area 201 or provided by the data components of the beacon marker signals 30(1)(1)–(m), 30(2)(1)–(m), and 30(3)(1)–(m), (D) the unit directional vectors $\hat{s}_{24(i)/29(j)}$ computed by routine 196, (D) the attitude matrix A computed by attitude receiver 33, and (E) the known vector k to antenna 38 stored by the data storage area 201.

As was just stated earlier, if the position receiver 32 receives the beacon marker signals 27(1)(1)–(m), 27(2)(1)–(m), 30(1)(1)–(m), 30(2)(1)–(m), and 30(3)(1)–(m) at the L2 frequency, then the routine 197 computes corrections to the phase measurments $\Phi_{30(j)(i)/38}$ and $\Phi_{27(k)(i)/38}$ based on the phase measurments $\Phi_{37(j)/38}$ and $\Phi_{36(k)/38}$ made by routine 192 to eliminate the error introduced by the frequency translation of these signals by transceivers 42(k) and 44(j) of omni-markers 29(j) and 26(k).

The integer hand-off routine 200 computes after the initialization period the integer ambiguities $n_{25(i)/30(j)(i)}$ associated with an additional GPS signal 25(i) and the corresponding extra beacon marker signal 30(j)(i) which were not in view during the initialization period or which were lost after this period. This is done by using Equation (46) in the way described earlier. The routine 199 will then use these additionally computed integer ambiguities $n_{25(i)/30(j)(i)}$ for computing the precise position vector x.

The synthesizer 86 and the reference oscillator 85 are coupled together. The synthesizer 86 is configured and coupled in the same way and generates the same type of down converting and clock signals as was described earlier for the synthesizer 56 of transceiver 42(k) or 44(j) 41 of FIG. 18.

The clock signal generated by the synthesizer 85 is received by the signal processing stages 84(1)–(2) and the CPU 88. Since the CPU 88 and the signal processing stages 84(1)–(2) operate based on the same clock source, the carrier phase measurements and PRN code range measurements for each of the GPS signals 25(1)–(m) and beacon marker signals 27(k)(1)–(m) and 30(j)(1)–(m) are coherent (i.e. made at the same time) with respect to each other.

Figure 23:
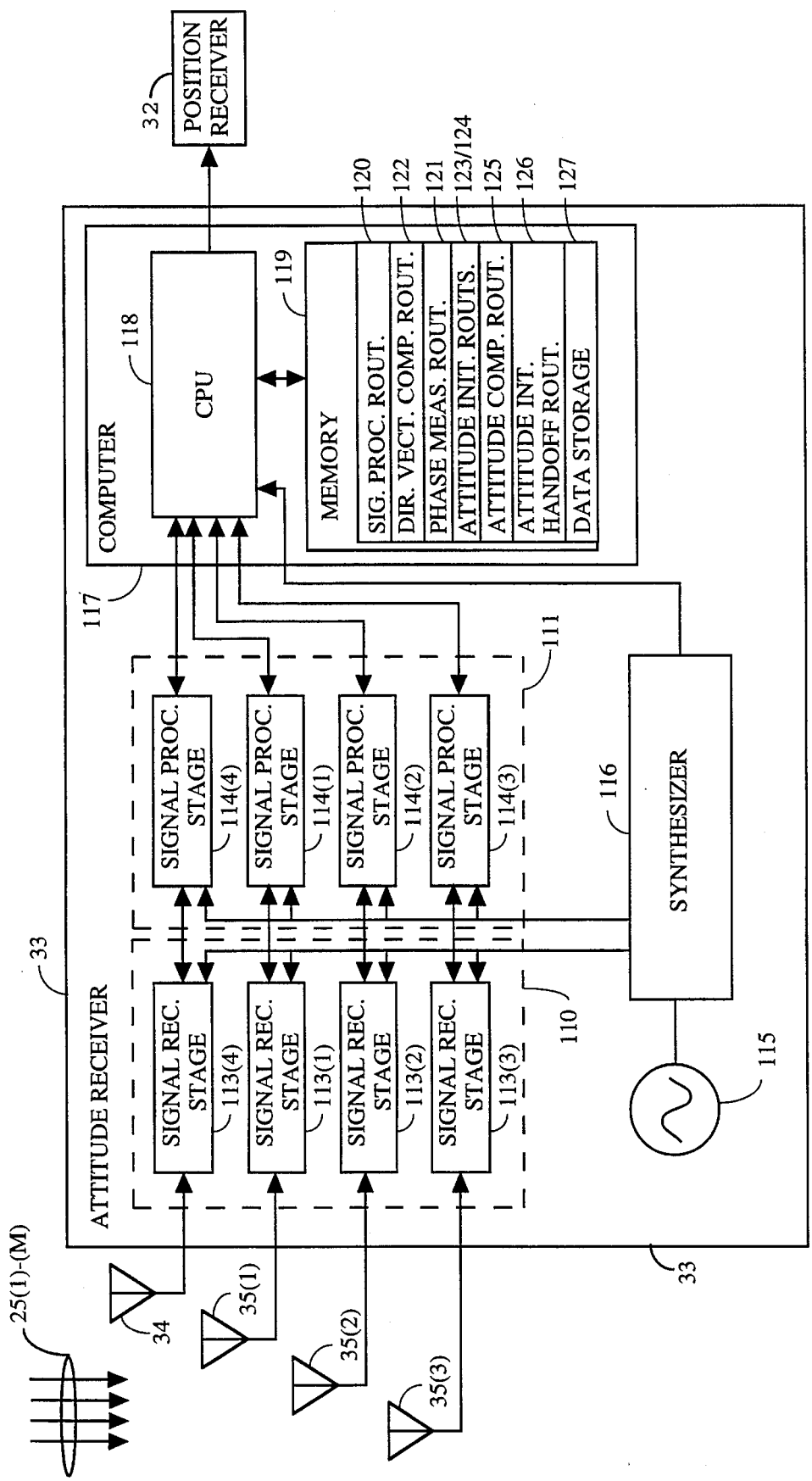
FIG. 23 provides a detailed illustration of another portion of the GPS mobile system including a GPS attitude receiver and several antennas.

FIG. 23 provides another detailed illustration of part of the mobile system 37. It shows the antennas 34 and 35(1)–(3) and the GPS attitude receiver 33.

Antennas 34 and 35(1)–(3) receive GPS signals 25(1)–(m). As was indicated earlier, the positions of antennas 35(1)–(3) with respect to antenna 34 are respectively given by the vectors $x_{35(1)}$, $x_{35(2)}$, and $x_{35(3)}$ in the runway coordinate system 46 and given by the vectors $k_{35(1)}$, $k_{35(2)}$, and $k_{35(3)}$ in the body coordinate system 47.

The GPS attitude receiver 33 is coupled to GPS position receiver 32. It computes the attitude matrix A using Carrier Phase Differential GPS. As was described earlier, the attitude matrix A is used by the routines 197 and 198 of receiver 32 in computing the initialization values described earlier and is used by routine 199 of receiver 32 in computing the precise position vector y.

GPS receiver 33 receives the GPS signals 25(1)–(m) from each of the antennas 34 and 35(1)–(3). Like the position receiver 32 shown in FIG. 22 and transceiver 42(k) or 44(j) shown in FIG. 18, it includes a signal receiving block 110, a signal processing block 111, a reference oscillator 115, a synthesizer 116, and a computer 117.

In this configuration, the signal receiving block 110 comprises four signal receiving stages 113(1)–(4). The signal receiving stage 113(4) is coupled to antenna 34 for receiving the GPS signals 25(1)–(m). The signal receiving stages 113(1)–(3) are respectively coupled to antennas 35(1)–(3) for also receiving the GPS signals 25(1)–(m). The signal receiving stages 113(1)–(4) are otherwise configured and coupled in the same way and perform the same signal extracting and down converting functions as do the signal receiving stages 53 and 83(1)–(2) described earlier for transceivers 42(k) and 44(j) and position receiver 32.

The signal processing block 111 includes four multi-channel signal processing stages 114(1)–(4). The signal processing stages 114(1)–(4) are respectively coupled to the signal receiving stages 113(1)–(4). The signal processing stages 114(1)–(4) are configured and coupled in the same way, perform the same type of signal separating and phase locking functions, and generate the same type of phase information (i.e. tracking error signals) as do the signal processing stages 51 and 83(1)–(2).

The computer 117 is coupled to each of the signal processing stages 114(1)–(4). It includes a central processing unit (CPU) 118 and a computer memory 119.

The CPU 118 receives from the signal processing stages 114(1)–(4) the information (i.e. carrier tracking error signals) for making phase measurements for GPS signals 25(1)–(m).

The computer memory 119 stores the signal processing routine 120, the carrier phase measuring routine 121, the directional vector computation routine 122, the static attitude initialization routine 123, the motion based attitude initialization routine 124, the attitude generating routine 125, and the attitude integer ambiguity hand-off routine 126. The computer memory also stores data generated from these routines 120–126 in the data storage area 127. The CPU 118 is coupled to the computer memory 119 for receiving the routines 120–126 and the data in the data storage area 127. The CPU 118 is also coupled to the CPU 88 of the GPS position receiver 32 for passing the computed attitude matrix A to the receiver 32.

The signal processing routine 120 generates the signal processing control signals for controlling the carrier and PRN code phase locking operations of the signal processing block 111. These control signals are outputted by the CPU 118 and received by the signal processing block 111.

The carrier phase measuring routine 121 makes the phase measurements $\Phi_{25(i)/34}$ and $\Phi_{25(i)/35(m)}$ based on the information received from the signal processing block 111. Thus, the routine 121 and the signal processing block 111 make up the carrier phase measuring component of the receiver 33. As was indicated earlier, each of these carrier phase measurement includes both a fractional wavelength phase component $\Phi_{fr}$ and an integer wavelength phase change component $\Phi_{int}$. These phase measurements are used by receiver 33 for making Carrier Phase Differential GPS attitude determinations.

The routine 121 issues the phase measurements at the same rate as is do the measurement routines in receiver 32.

This is done so that the phase measurements of receiver 32 can be synchronized with the carrier phase measurements of receiver 33. As was discussed earlier, these carrier phase measurements are made by the routine 121 at the rate of approximately 1–10 Hz.

The unit directional vector computation routine 122 computes the vectors $\hat{s}_{24(i)/34}$ in the manner described earlier. Thus, these vectors are computed from (A) the satellite orbital positions received in the data components of the GPS signals 25(1)–(m), and (B) the location of reference antenna 34 in the coordinate system used to define the satellite orbital positions computed by routine 122 from Conventional GPS or Code Based Differential GPS.

The static attitude initialization routine 123 when selected computes the initialization values $n_{25(i)/34/35(m)}$ from Equation (55) in the manner described earlier. Thus, routine 123 is responsive to (A) the measurements $\Phi_{25(i)/34}$ and $\Phi_{25(i)/35(m)}$ made by routine 122 over several epochs, and (B) the directional vectors $\hat{s}_{24(i)/34}$ computed by routine 122. Since routine 12 3 records these values so that Equation (43) is stacked in matrix form, the values $n_{25(i)/34/35(m)}$ can be simultaneously solved. These initialization values $n_{25(i)/34/35(m)}$ are then stored in the data storage area 127 for use by the attitude determination routine 125. As a built in integrity check, these values are checked to see that they converge to integer values.

The motion based attitude initialization routine 124 when selected also computes the initialization values $n_{25(i)/34/35(m)}$ in the manner described earlier. This requires a multiple step process.

First, routine 124 initially computes the vectors $\Delta b_{35(m)}$ using Equation (57) in the manner described earlier. Routine 124 records in data storage area 127 the measurements $\Phi_{25(i)/34}$ and $\Phi_{25(i)/35(m)}$ by routine 122 at an initial epoch. Then, at a number of succeeding epochs routine 124 computes the vectors $\Delta b_{35(m)}$ from (A) the measurements $\Phi_{25(i)/34}$ and $\Phi_{25(i)/35(m)}$ recorded at the initial epoch and made at these succeeding epochs, and (B) the unit directional vectors $\hat{s}_{24(i)/34}$ computed by routine 122.

Routine 124 then computes the baseline vectors $b_{35(m)}$ from Equation (60). These values are generated from (A) measurements $\Phi_{25(i)/34}$ and $\Phi_{25(i)/35(m)}$ made by routine 122 at the epochs employed, (B) the vectors $\Delta b_{35(m)}$ computed from Equation (57) at each of the epochs employed after the initial epoch, and (C) the unit directional vectors $\hat{s}_{24(i)/34}$ computed by routine 122. Routine 124 records these values in the data storage area 127 so that Equation (60) is stacked in matrix form. As a result, the baseline vectors $b_{35(m)}$ can be simultaneously solved and stored in the data storage area 127.

Once the baseline vectors $b_{35(m)}$ are computed, routine 124 computes the values $n_{25(i)/34/35(m)}$ from Equation (55). Thus, these values are generated by routine 124 from (A) the measurements $\Phi_{25(i)/34}$ and $\Phi_{25(i)/35(m)}$ made by routine 122 and recorded at the initial epoch, (B) from the baseline vectors $b_{35(m)}$ computed and stored in storage area 127, and (C) the unit directional vectors $\hat{s}_{24(i)/34}$ computed by routine 122. The computed initialization values $n_{25(i)/34/35(m)}$ are then stored in data storage area 127 for use by the attitude determination routine 125. As a built in integrity check, the values $n_{25(i)/34/35(m)}$ can be checked to see that they converge to integer values.

The attitude determination routine 125 computes the attitude matrix A at each measurement epoch in the manner described earlier. This involves a five step process.

First, routine 125 computes at each measurement epoch the differential ranges $\Delta r_{24(i)/34/35(m)}$ using Equation (51).

block 81 has a single multi-channel signal processing stages 84. The signal receiving stage 83 is coupled to the signal processing stage 84.

The signal receiving stage 83 is coupled to the antenna 34. Except for this difference, the signal receiving stage 83 is otherwise configured and coupled in the same way and performs the same signal extracting and down converting functions as was earlier described for the signal receiving stage 53 of FIG. 18. Moreover, the signal processing stage 84 is configured and coupled in the same way, performs the same type of separating and phase locking functions, and generates the same type of phase information (i.e. tracking error signals) as was described earlier for the signal processing stage 51.

The computer 87 is coupled to the signal processing stage 83. It otherwise is coupled in the same way and stores the same routines as was the computer 87 described earlier for the receiver 32 of the embodiment of FIG. 22.

CONCLUSION

Many of the individual elements of the components of system 20 are known in the art. In fact, many are found in commercially available products.

Specifically, the GPS antennas 34, 35(1)–(3), 38, 40(1)–(3), 41(1)–(2), 45(1)–(3), and 43(1)–(3) are of the type commonly known as standard hemispherical microstrip patch antennas. The GPS antenna 45 is of the type commonly known as a standard helical antenna.

The signal receiving stages 53(1)–(4), 83(1)–(5), and 113(1)–(4), the signal processing stages 84(1)–(5) and 114(1)–(4), the oscillators 55, 85 and 115, the synthesizers 56, 86, and 116, and the computers 57, 87, and 117 and their respective signal processing routines 160, 190, and 120, carrier phase measuring routines 161, 191, and 121, PRN code phase measuring routine 192, may be of the type commonly found in a Trimble 4000 Series GPS receiver. These are described in U.S. Pat. No. 4,754,465 which is hereby explicitly incorporated by reference.

Although these figures and the accompanying description are provided in relation to an airplane, one skilled in the art would readily understand that the invention is applicable to Carrier Phase Differential Position determinations for any land, sea, air, or space vehicle. Furthermore, while the present invention has been described with reference to a few specific embodiments, the description is illustrative of the invention and is not to be construed as limiting the invention. Indeed, various modifications may occur to those skilled in the art without departing from the true spirit and scope of the invention as defined by the appended claims.

What is claimed is:

1. In a GPS system for making position determinations with GPS satellite signals transmitted by GPS satellites, each of the GPS satellite signals having a carrier component and a pseudo-random code component, said GPS system including a mobile GPS receiver system that receives the transmitted GPS satellite signals, a GPS beacon at a fixed known location with respect comprising:

receiving means for receiving GPS satellite signals each having a carrier component and a pseudo-random code component;

generating means for phase locking onto the carrier component and the pseudo-random code component of each of the GPS satellite signals received by the receiving means and for generating GPS beacon signals each having a carrier component and a pseudo-random code component respectively in phase with the phase locked onto carrier component and the phase locked onto pseudo-random code component of a corresponding one of the GPS satellite signals received by the receiving means; and transmitting means for transmitting the generated GPS beacon signals so that the mobile GPS receiver system receives the transmitted GPS beacon signals and computes its position with respect to the reference coordinate system in response to the GPS satellite and GPS beacon signals it receives and the known location of the GPS beacon.

2. The GPS beacon of claim 1 wherein, for each respective one of the generated GPS beacon signals, the generating means includes:

a first phase locked loop to phase lock onto the pseudo-random code component of a respective corresponding one of the GPS satellite signals received by the receiving means and produce in response a pseudo-random code phase locking clock signal;

a second phase locked loop to phase lock onto the carrier component of the respective corresponding one of the GPS satellite signals and produce in response a reconstructed carrier component that is an in phase version of the phase locked onto carrier component of the respective corresponding one of the GPS satellite signals;

a transmit pseudo-random code generator, responsive to the pseudo-random code phase locking clock signal, to generate a transmit pseudo random code in phase with the phase locked onto pseudo-random code component of the respective corresponding one of the GPS satellite signals; and circuitry to combine the transmit pseudo-random code component and the reconstructed carrier component and generate in response the respective one of the generated GPS beacon signals.

3. The GPS beacon of claim 2 wherein:

the first phase locked loop includes a receive pseudo-random code generator, responsive to the pseudo-random code phase locking clock signal, to generate a receive pseudo-random code component that is an in phase version of the phase locked onto pseudo-random code component of the respective corresponding one of the GPS satellite signals;

the second phase locked loop is responsive to the receive pseudo-random code component to phase lock onto the carrier component of the respective corresponding one of the GPS satellite signals.

4. The GPS beacon of claim 1 wherein the pseudo-random code component of each GPS beacon is unique from the pseudo-random code components of the GPS satellite signals and the other ones of the GPS beacon signals.

5. In a GPS system for making position determinations with GPS satellite signals transmitted by GPS satellites, each of the GPS satellite signals having a carrier component and a pseudo-random code component, said GPS system including a mobile GPS receiver system that receives the transmitted GPS satellite signals, a method of generating GPS beacon signals at a fixed known location with respect to a reference coordinate system comprising the steps of:

receiving GPS satellite signals each having a carrier component and a pseudo-random code component;

phase locking onto the carrier component and the pseudo-random code component of each of the GPS satellite signals received in the receiving step and generating GPS beacon signals each having a carrier component Thus, these differential ranges $\Delta r_{24(i)/34/35(m)}$ are computed from (A) the measurements $\Phi_{25(i)/34}$ and $\Phi_{25(i)/35(m)}$ made by routine 122 at each measurement epoch, (B) the initialization values $n_{25(i)/34/35(m)}$ computed by routines 123 or 124, and (C) the unit directional vectors $\hat{s}_{24(i)/34}$ computed by routine 122.

Routine 125 computes the initial estimate $A_0$ at each measurement epoch by minimizing Equation (67). Thus, the initial estimate $A_0$ is generated by routine 125 from (A) the predetermined measurement weights $w_{35(m)/24(i)}$, (B) the differential ranges $\Delta r_{24(i)/34/35(m)}$ computed by routine 125, (C) the known vectors $k_{35(m)}$, and (D) the unit directional vectors $\hat{s}_{24(i)}$ computed by routine 122.

The routine 125 then computes the vector $\delta\Theta$ at each measurement epoch by minimizing the Equation (73). Thus, the vector $\delta\Theta$ is generated by routine 12 5 from (A) the predetermined measurement weights $w_{35(m)/24(i)}$, (B) the differential ranges $\Delta r_{24(i)/34/35(m)}$ computed by routine 125, (C) the initial estimate $A_0$ computed by routine 125, (D) the matrix computed by routine 125, and (E) the computed unit directional vectors $\hat{s}_{24(i)/34}$.

Routine 125 then computes the matrix $\Theta^x$ using Equation (72). Thus, the matrix $\Theta^x$ is generated by routine 125 from the elements of the computed vector The routine 125 then computes the correctional matrix $\delta A$ using Equation (70). As a result, the matrix $\delta A$ is generated by routine 125 from the computed matrix $\Theta^x$.

The routine 125 then computes the matrix A using Equation (69). Thus, matrix A is generated by routine from the computed correctional matrix $\delta A$.

The routine 125 repeats this process iteratively until the value for A converges to within a desired level. As was discussed earlier, this is done by substituting the estimate matrix A from the previous iteration into Equation (73) as the matrix $A_0$ for the next iteration. The new estimate A is then computed and compared with the estimate A from the previous iteration. This process is continued until the estimate for A converges to within the desired level.

The integer hand-off routine 126 computes after the initialization period the integer ambiguities $n_{25(i)/34/35(m)}$ for any GPS signals 25(i) which were not in view during the initialization period or which were lost after this period. This is done by using Equation (59). Thus, the values for the new integer ambiguities $n_{25(i)/34/35(m)}$ are generated from (A) the measurements $\Phi_{25(i)/34}$ and $\Phi_{25(i)/35(m)}$ made at an epoch, (B) the known vectors $k_{35(m)}$, and (C) the known attitude matrix A computed by routine 125. The routine 125 will then use these additionally computed integer ambiguities in computing the attitude matrix A.

The synthesizer 116 and the reference oscillator 115 are coupled together. The synthesizer 116 is configured and coupled in the same way and performs the same down converting and clock signal generating functions as do the synthesizers 56 and 86. The oscillator 115 is configured and coupled in the same way and performs the same reference frequency signal generating functions as does the reference oscillator 55 and 85.

The clock signal generated by the synthesizer 116 is received by the signal processing stage 114 and the CPU 118. Since the CPU 118 and the signal processing stage 114 operate based on the same clock source, the carrier phase measurements made for each of the GPS signals 25(1)–(m) are coherent (i.e. made at the same time) with respect to each other.

Figure 24:
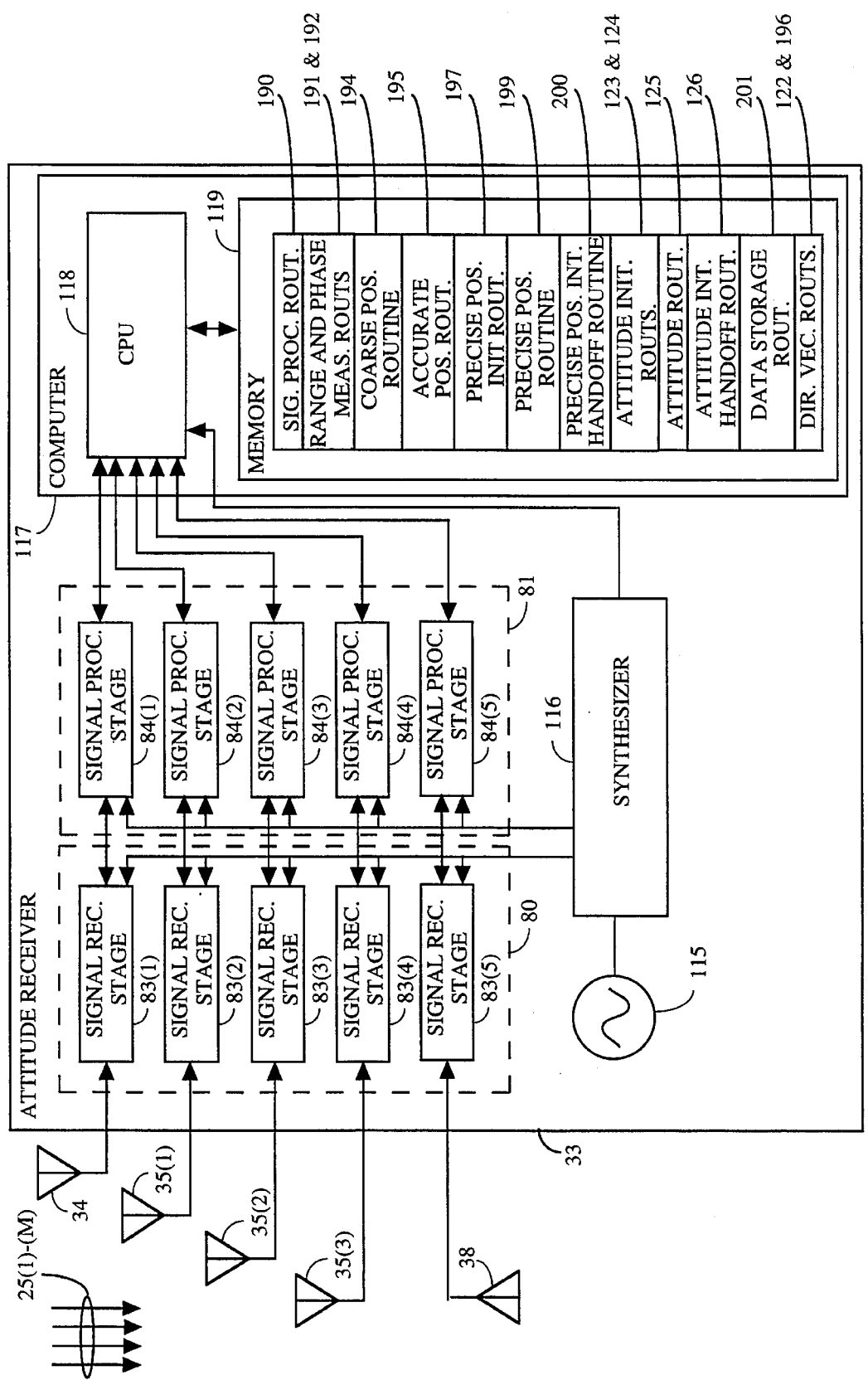
FIG. 24 shows another embodiment of the GPS mobile system where a single GPS receiver generates both position determinations and attitude determinations.

FIG. 24 shows an alternative embodiment for the airborne components of system 20. In this configuration, there is a single GPS receiver 32 which computes both position determinations and attitude determinations.

Receiver 32 now has five signal paths. The first accommodates the GPS signals 25(1)–(m) received from the antenna 34. The second, third, and fourth signal paths respectively accommodate the GPS signals 25(1)–(m) received by the antennas 35(1)–(3). And, the fifth accommodates the beacon marker signals 27(1)(1)–(m), 27(2)(1)–(m), 30(1)(1)–(m), 30(2)(1)–(m), and 30(3)(1)–(4) received from the antenna 38.

Thus, in this embodiment the signal receiving block 80 has five signal receiving stages 83(1)–(5) and the signal processing block 81 has five signal processing stages 84(1)–(5). The signal receiving stages 83(1)–(5) are respectively coupled to the signal processing stages 84(1)–(5).

The signal receiving stages 83(1)–(5) are respectively coupled to the antennas 34, 35(1)–(3), and 38. Except for this difference, each of the signal receiving stages 83(1)–(5) is otherwise configured and coupled in the same way and performs the same signal extracting and down converting functions as was earlier described for the signal receiving stage 53 of FIG. 18. Moreover, each of the signal processing stages 84(1)–(5) is configured and coupled in the same way, perform the same type of separating and phase locking functions, and generate the same type of phase information (i.e. tracking error signals) as was described earlier for the signal processing stage 51.

Furthermore, computer memory 89 of computer 87 stores in this configuration the signal processing routine 190, the carrier phase measuring routine 191, the PRN code phase measuring routine 192, the coarse position generating routine 194, the accurate position generating routine 195, the unit directional vector computing routines 196 and 122, the initializing routine 197, the precise position generating routine 198, the precise position hand-off routine 199, the static attitude initialization routine 123, the motion based attitude initialization routine 124, the attitude generating routine 125, and the attitude integer hand-off routine 126. The computer memory also stores data generated from these routines 190–200 and 122–126 in the data storage area 201. The CPU 88 is coupled to the computer memory 89 for receiving the routines 190–200 and 122–126 and the data in the data storage area 201.

Figure 25:
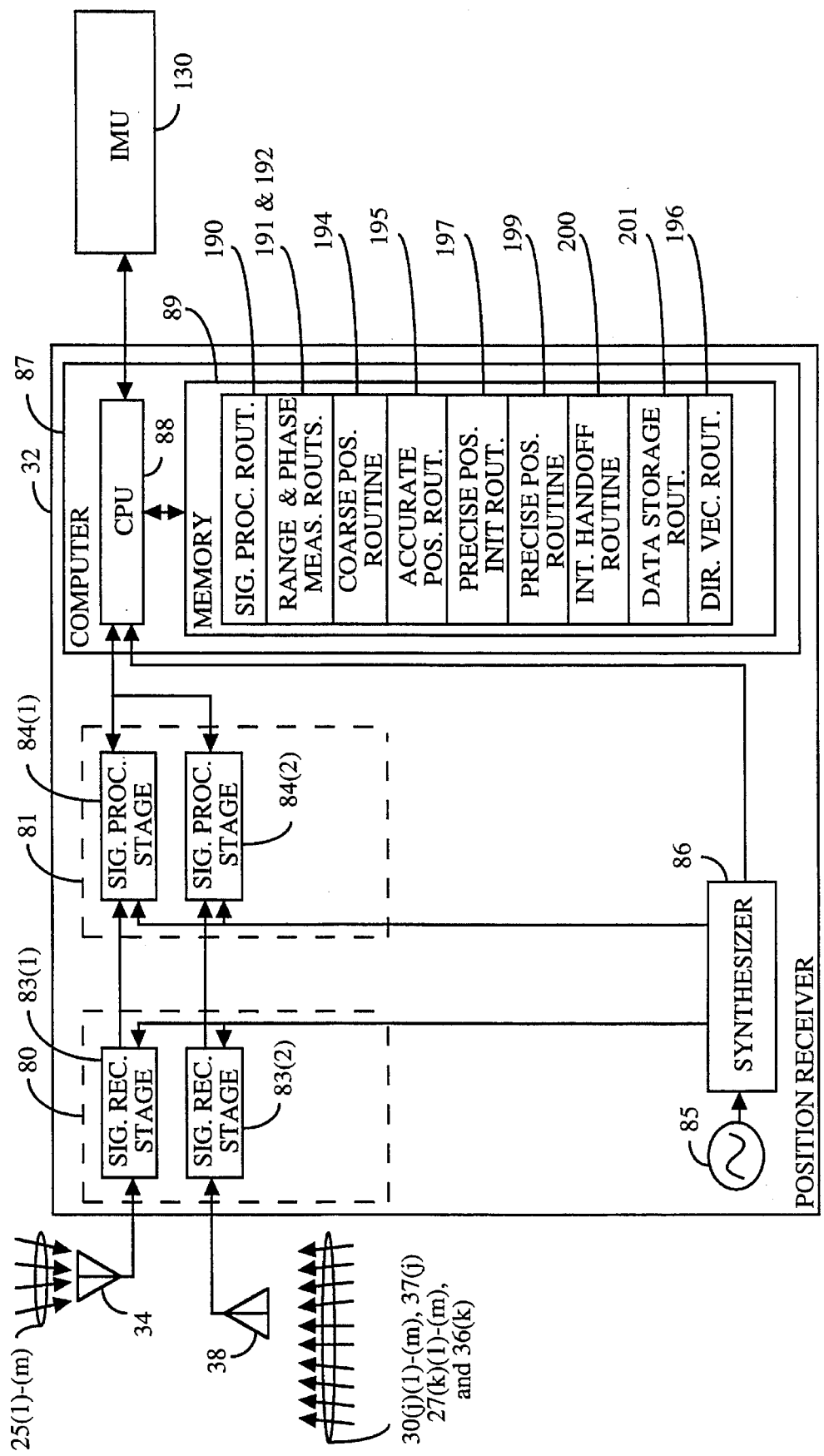
FIG. 25 shows another embodiment of the GPS mobile system where an inertial measurement unit is employed.

FIG. 25 shows another embodiment for the airborne components of system 20. In this configuration, an inertial measurement unit (IMU) 130 has been substituted for the GPS attitude receiver 33. The IMU 130 is coupled to the CPU 88 of receiver 32.

In one embodiment, the IMU 130 can directly provide receiver 32 with the computed attitude matrix A. Alternatively, the computer memory 89 can store a routine 131 for converting the attitude parameters yaw, pitch, and roll supplied by the IMU 130 into the matrix A.

Figure 26:
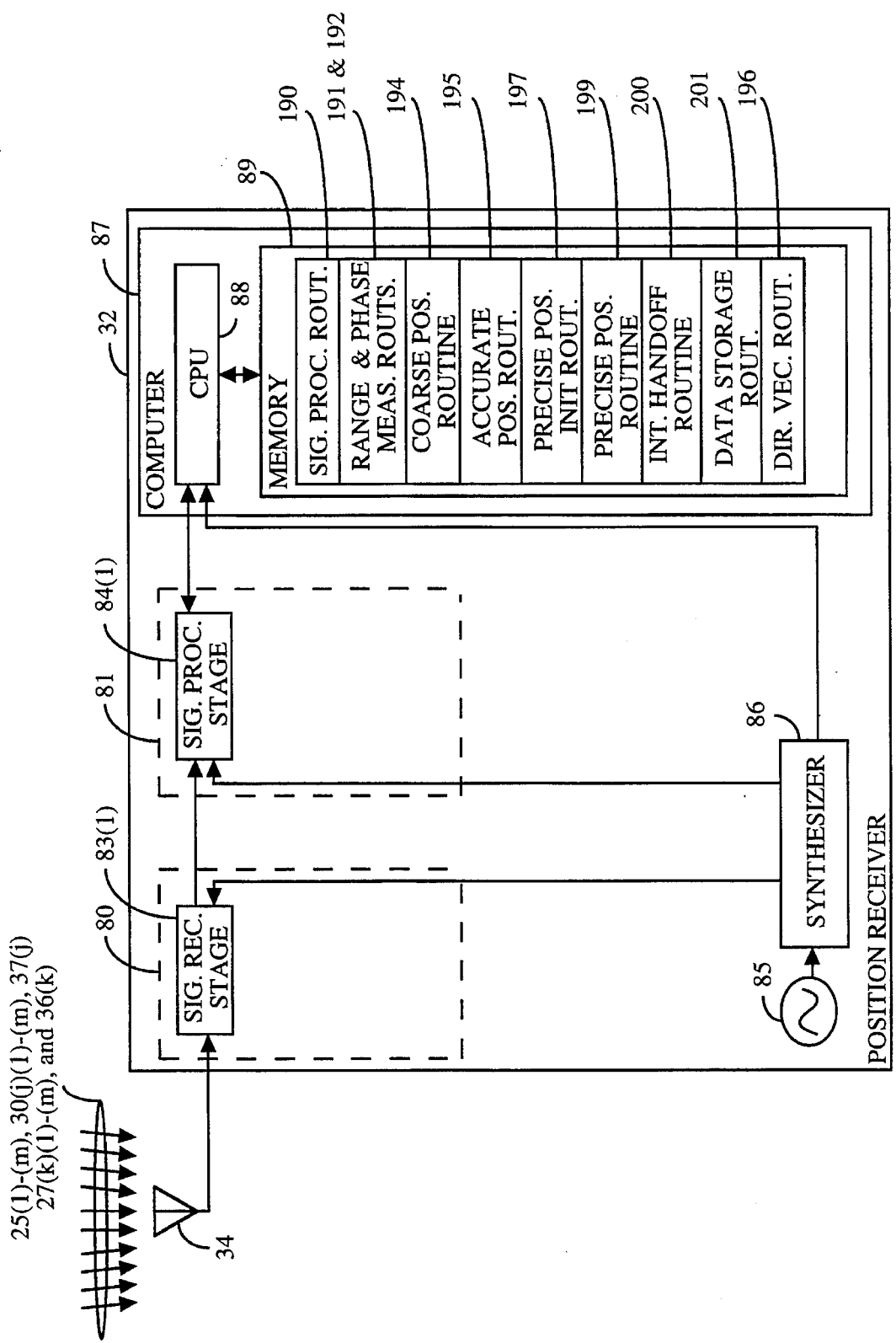
FIG. 26 shows another embodiment for the GPS mobile system where a single antenna and a single GPS position receiver are employed.

FIG. 26 shows another embodiment for the airborne components of system 20. In this configuration, only a single antenna 34 and a single receiver 32 are mounted on airplane 21. Receiver 32 now has only one signal path. It accommodates all of the signals 25(1)–(m), 27(1)(1)–(m), 27(2)(1)–(m), 30(1)(1)–(m), 30(2)(1)–(m), and 30(3)(1)–(m) received from the antenna 34. As shown in FIG. 11, this may be done for wide area ranging where the beacon marker signals 27(1)(1)–(m), 27(2)(1)–(m), 30(1)(1)–(m), 30(2)(1)–(m), and 30(3)(1)–(m) are received from a geosynchronous transponder 49.

Thus, in this embodiment the signal receiving block 80 has a single receiving stage 83 and the signal processing and a pseudo-random code component respectively in phase with the phase locked onto carrier component and the phase locked onto pseudo-random code component of a corresponding one of the GPS satellite signals received in the receiving step; and transmitting the generated GPS beacon signals so that the mobile GPS receiver system receives the transmitted GPS beacon signals and computes its position with respect to the reference coordinate system in response to the GPS satellite and beacon signals it receives and the known location.

6. The method of claim 5 wherein, for each respective one of the generated GPS beacon signals, the phase locking and generating step includes the steps of:

phase locking onto the pseudo-random code component of a respective corresponding one of the GPS satellite signals received in the receiving step and producing in response a pseudo-random code phase locking clock signal;

phase locking onto the carrier component of the respective corresponding one of the received GPS satellite signals and producing in response a reconstructed carrier component that is an in phase version of the phase locked onto carrier component of the respective corresponding one of the GPS satellite signals;

generating a transmit pseudo random code in phase with the phase locked onto pseudo-random code component of the respective corresponding one of the GPS satellite signals in response to the pseudo-random code phase locking clock signal; and combining the transmit pseudo-random code component and the reconstructed carrier component and generating in response the respective one of the generated GPS beacon signals.

7. The method of claim 6 wherein:

the step of phase locking onto the pseudo-random code component of the respective corresponding one of the received GPS satellite signals includes the step of generating a receive pseudo-random code component that is an in phase version of the phase locked onto pseudo-random code component of the respective corresponding one of the GPS satellite signals in response to the pseudo-random code phase locking clock signal;

the step of phase locking onto the carrier component of the respective corresponding one of the received GPS satellite signals is in response to the receive pseudo-random code component.

8. The method of claim 5 wherein the pseudo-random code component of each GPS beacon is unique from the pseudo-random code components of the GPS satellite signals and all other ones of the GPS beacon signals.

9. A GPS positioning system for making position determinations with GPS satellite signals transmitted by GPS satellites, each of the GPS satellite signals having a pseudo-random code component, the GPS positioning system comprising:

a GPS beacon positioned at a fixed known position with respect to a reference coordinate system, the GPS beacon including:

beacon receiving means for receiving the transmitted GPS satellite signals;

signal generating means for phase locking onto the pseudo-random code component of each of the GPS satellite signals received by the beacon receiving means and for generating GPS beacon signals each having a pseudo-random code component in phase with the phase locked onto pseudo-random code component of a corresponding one of the GPS satellite signals received by the beacon receiving means; and transmitting means for transmitting the generated GPS beacon signals; and a mobile GPS receiver system including:

mobile system receiving means for receiving the transmitted GPS satellite and beacon signals;

range measuring means for making at a measurement epoch range measurements for the pseudo random code components of the GPS satellite and beacon signals received by the mobile system receiving means;

means for determining directions to the GPS satellites with respect to the reference coordinate system at the measurement epoch; and position computing means for computing a precise position for the mobile GPS receiver system with respect to the reference coordinate system at the measurement epoch in response to the range measurements, the known location of the GPS beacon, and the determined directions to the GPS satellites.

10. The GPS positioning system of claim 9 wherein:

each of the GPS satellite and beacon signals also includes a carrier component; and for each respective one of the generated GPS beacon signals, the signal generating means includes:

a first phase locked loop to phase lock onto the pseudo-random code component of a respective corresponding one of the GPS satellite signals received by the beacon receiving means and produce in response a pseudo-random code phase locking clock signal;

a second phase locked loop to phase lock onto the carrier component of the respective corresponding one of the GPS satellite signals and produce in response a reconstructed carrier component that is an in phase version of the phase locked onto carrier component of the respective corresponding one of the GPS satellite signals;

a transmit pseudo-random code generator, responsive to the pseudo-random code phase locking clock signal, to generate a transmit pseudo random code component in phase with the phase locked onto pseudo-random code component of the respective corresponding one of the GPS satellite signals; and circuitry to combine the transmit pseudo-random code component and the reconstructed carrier component and generate in response the respective one of the generated GPS beacon signals.

11. The GPS positioning system of claim 9 wherein the position computing means computes the precise position for the mobile GPS receiver system based on a predefined set of simultaneous equations, each of the simultaneous equations relating (A) the precise position of the mobile GPS receiver system, (B) the range measurements for a respective one of the GPS satellite signals and a respective corresponding one of the GPS beacons signals, (C) the known location of the GPS beacon, and (D) the determined direction to the GPS satellite that transmits the respective one of the GPS satellite signals.

12. The GPS positioning system of claim 11 wherein:

the set of simultaneous equations comprises a set of non-linear equations that are linearized such that the precise position for the mobile GPS receiver system is represented by an estimate and a precise difference between the estimate and the precise position;

the mobile GPS receiver system further includes means to compute an initial guess position for the mobile GPS receiver system at the measurement epoch;

the position computing means iteratively computes the precise position (A) computing the precise difference in iterations based on the set of simultaneous linearized non-linear equations, (B) in a first one of the iterations, using the initial guess position as the estimate, (C) in each subsequent one of the iterations, using as the estimate the estimate used in a directly preceding one of the iterations adjusted by the precise difference computed in the directly preceding one of the iterations, and (D) after a final one of the iterations, using as the computed precise position the estimate used in the final one of the iterations adjusted by the precise difference computed in the final one of the iterations.

13. The GPS system of claim 9 further comprising a geosynchronous satellite transponder to receive the GPS beacon signals transmitted by the GPS beacon and re-transmit the GPS beacon signals to the mobile GPS receiver system.

14. The GPS positioning system of claim 9 wherein the pseudo-random code component of each GPS beacon is unique from the pseudo-random code components of the GPS satellite signals and all other ones of the GPS beacon signals.

15. A method of making GPS position determinations with GPS satellite signals transmitted by GPS satellites, each of the GPS satellites signals having a pseudo-random code component, the method comprising the steps of:

positioning a GPS beacon at a fixed known location with respect to a reference coordinate system;

with the GPS beacon:
receiving the transmitted GPS satellite signals;
phase locking onto the pseudo-random code component of each of the GPS satellite signals received with the GPS beacon and generating GPS beacon signals each having a pseudo-random code component in phase with the phase locked onto pseudo-random code component of a corresponding one of the GPS satellite signals received with the GPS beacon; and
transmitting the generated GPS beacon signals; and with a mobile GPS receiver system:
receiving the transmitted GPS satellite and beacon signals;
making at a measurement epoch range measurements for the pseudo-random code components of the GPS satellite and beacon signals received with the mobile GPS receiver system;
determining directions to the GPS satellites with respect to the reference coordinate system at the measurement epoch; and
computing a precise position for the mobile GPS receiver system at the measurement epoch in response to the range measurements, the known location of the GPS beacon, and the determined directions to the GPS satellites.

16. The method of claim 15 wherein:
each of the GPS satellite and beacon signals also includes a carrier component; and
for each respective one of the generated GPS beacon signals, the phase locking and generating step includes the steps of:
phase locking onto the pseudo-random code component of a respective corresponding one of the GPS satellite signals received with the GPS beacon and producing in response a pseudo-random code phase locking clock signal;
phase locking onto the carrier component of the respective corresponding one of the GPS satellite signals and producing in response a reconstructed carrier component that is an in phase version of the phase locked onto carrier component of the respective corresponding one of the GPS satellite signals;
generating a transmit pseudo-random code component in phase with the phase locked onto pseudo-random code component of the respective corresponding one of the GPS satellite signals in response to the pseudo-random code phase locking clock signal; and
combining the transmit pseudo-random code component and the reconstructed carrier component to generate the respective one of the generated GPS beacon signals.

17. The method of claim 15 wherein the precise position for the mobile GPS receiver system is computed in the position computing step based on a predefined set of simultaneous equations, each of the simultaneous equations relating (A) the precise position of the mobile GPS receiver system, (B) the range measurements for a respective one of the GPS signals and a respective corresponding one of the GPS beacons signals, (C) the known location of the GPS beacon, and (D) the determined direction to the GPS satellite that transmits the respective one of the GPS satellite signals.

18. The method of claim 17 wherein:
the set of simultaneous equations comprises a set of non-linear equations that are linearized such that in each equation the precise position for the mobile GPS receiver system is represented by an estimate and a precise difference between the estimate and the precise position;
the method further comprises the step of computing, with the mobile GPS receiver system, an initial guess position for the mobile GPS receiver system at the measurement epoch;
the precise position is iteratively computed in the precise position computing step by (A) computing the precise difference in iterations based on the set of simultaneous linearized non-linear equations, (B) in a first one of the iterations, using the initial guess position as the estimate, and (C) in each subsequent one of the iterations, using as the estimate the estimate used in a directly preceding one of the iterations offset by the precise difference computed in the directly preceding one of the iterations, and (D) after a final one of the iterations, using as the computed precise position the estimate used in the final one of the iterations adjusted by the precise difference computed in the final one of the iterations.

19. The method of claim 15 further comprising the step of, with a geosynchronous satellite transponder, receiving the GPS beacon signals transmitted with the GPS beacon and re-transmitting the GPS beacon signals to the mobile GPS receiver system.

20. The method of claim 15 wherein the pseudo-random code component of each GPS beacon is unique from the pseudo-random code components of the GPS satellite signals and all other ones of the GPS beacon signals.

21. A GPS positioning system for making position determinations with GPS satellite signals transmitted by GPS satellites, each of the GPS satellite signals having a pseudo-random code component and a carrier component, the GPS positioning system comprising:

a GPS beacon positioned at a fixed known location with respect to a reference coordinate system, the GPS beacon including:
  beacon receiving means for receiving the transmitted GPS satellite signals;
  signal generating means for phase locking onto the pseudo-random code component and the carrier component of each of the GPS satellite signals received by the beacon receiving means and for generating GPS beacon signals each having a pseudo-random code component and a carrier component respectively in phase with the phase locked onto pseudo-random code component and the phase locked onto carrier component of a corresponding one of the GPS satellite signals received by the beacon receiving means; and
  transmitting means for transmitting the generated GPS beacon signals; and
a mobile GPS receiver system including:
  mobile system receiving means for receiving the transmitted GPS satellite and beacon signals;
  computing means for computing a position for the mobile GPS receiver system with respect to the reference coordinate system in response to the GPS satellite and beacon signals received by the mobile system receiving means and the known location of the GPS beacon.

22. The GPS positioning system of claim 21 wherein, for each respective one of the generated GPS beacon signals, the signal generating means includes:
  a first phase locked loop to phase lock onto the pseudo-random code component of a respective corresponding one of the GPS satellite signals received by the beacon receiving means and produce in response a pseudo-random code phase locking clock signal;
  a second phase locked loop to phase lock onto the carrier component of the respective corresponding one of the GPS satellite signals and produce in response a reconstructed carrier component that is an in phase version of the phase locked onto carrier component of the respective corresponding one of the GPS satellite signals;
  a transmit pseudo-random code generator, responsive to the pseudo-random code phase locking clock signal, to generate a transmit pseudo random code in phase with the phase locked onto pseudo-random code component of the respective corresponding one of the GPS satellite signals; and
  circuitry to combine the transmit pseudo-random code component and the reconstructed carrier component and generate in response the respective one of the generated GPS beacon signals.

23. The GPS positioning system of claim 22 wherein:
  the first phase locked loop includes a receive pseudo-random code generator, responsive to the pseudo-random code phase locking clock signal, to generate a receive pseudo-random code component that is an in phase version of the phase locked onto pseudo-random code component of the respective corresponding one of the GPS satellite signals;
  the second phase locked loop is responsive to the receive pseudo-random code component to phase lock onto the carrier component of the respective corresponding one of the GPS satellite signals.

24. The GPS positioning system of claim 21 wherein the pseudo-random code component of each GPS beacon is unique from the pseudo-random code components of the GPS satellite signals and all other ones of the GPS beacon signals.

25. A GPS system for resolving integer wavelength ambiguities associated with phase measurements for carrier components of GPS satellite signals transmitted by GPS satellites, the GPS system comprising:
  one or more GPS beacons each positioned at a fixed known location with respect to a reference coordinate system, each of the one or more GPS beacons including:
    beacon receiving means for receiving the transmitted GPS satellite signals;
    signal generating means for phase locking onto the carrier component of each of the GPS satellite signals received by the beacon receiving means and for generating GPS beacon signals each having a carrier component in phase with the phase locked onto carrier component of a corresponding one of the GPS satellite signals received with the beacon receiving means; and
    transmitting means for transmitting the generated GPS beacon signals; and
  a mobile GPS receiver system including:
    mobile system receiving means for receiving the transmitted GPS satellite and beacon signals;
    phase measuring means for making at a plurality of measurement epochs phase measurements for the carrier components of each of the GPS satellite and beacon signals received by the mobile system receiving;
    wherein for the phase measurements made for the carrier component of each of the GPS satellites, there is an associated integer wavelength ambiguity;
    means for determining directions to the GPS satellites with respect to the reference coordinate system at the measurement epochs; and
    integer ambiguity resolution means for resolving the integer wavelength ambiguities in response to the phase measurements, the known location of each of the one or more GPS beacons, and the determined directions to the GPS satellites.

26. The GPS system of claim 25 wherein:
each of the GPS satellite and beacon signals also includes a pseudo-random code component; and
for each respective one of the GPS beacon signals generated by the signal generating means, the signal generating means includes:
  a first phase locked loop to phase lock onto the pseudo-random code component of a respective corresponding one of the GPS satellite signals received by the beacon receiving means and produce in response a pseudo-random code phase locking clock signal;
  a second phase locked loop to phase lock onto the carrier component of the respective corresponding one of the GPS satellite signals and produce in response a reconstructed carrier component that is an in phase version of the phase locked onto carrier component of the respective corresponding one of the GPS satellite signals;
  a transmit pseudo-random code generator, responsive to the pseudo-random code phase locking clock signal, to generate a transmit pseudo-random code component in phase with the phase locked onto pseudo-random code component of the respective corresponding one of the GPS satellite signals; and
  circuitry to combine the transmit pseudo-random code component and the reconstructed carrier component and generate in response the respective one of the GPS beacon signals.

27. The GPS system of claim 26 wherein the pseudo-random code component of the respective one of the generated GPS beacon signals is unique from the pseudo-random code components of the GPS satellite signals and all other ones of the GPS beacon signals.

28. The mobile GPS receiver system of claim 25 wherein the phase measuring means makes the phase measurements during a period in which a large angular change in geometry occurs between the mobile GPS receiver system and the one or more GPS beacons.

29. The GPS system of claim 28 wherein the integer ambiguity resolution means resolves the integer wavelength ambiguities with batch processing of the phase measurements, the known location of each of the one or more GPS beacons, and the determined directions to the GPS satellites.

30. The GPS system of claim 29 wherein:

the mobile GPS receiver system has unknown precise positions with respect to the reference coordinate system at the measurement epochs;

the integer ambiguity resolution means resolves the integer wavelength ambiguities with the batch processing based on a predefined set of simultaneous equations, each of the equations relating (A) the unknown precise position of the mobile GPS receiver system at a corresponding one of the measurement epochs, (B) the phase measurements for a respective one of the GPS satellite signals and a respective corresponding one of the GPS beacon signals made at the corresponding measurement epoch, (C) the integer wavelength ambiguity associated with phase measurements for the respective one of the GPS satellite signals, (D) the known location of the one of the one or more GPS beacons that transmits the respective corresponding one of the GPS beacon signals, and (E) the determined direction to the one of the GPS satellites that transmits the respective one of the GPS satellite signals at the corresponding measurement epoch, wherein the number of the GPS satellite signals and the measurement epochs is such that the set of simultaneous equations is overdetermined.

31. The GPS system of claim 30 wherein:

the set of simultaneous equations comprises a set of non-linear equations that are linearized such that the unknown precise positions for the mobile GPS receiver system at the measurement epochs are represented by estimates and precise differences between the estimates and the unknown precise positions;

the mobile GPS receiver system further includes means for computing initial guess positions for the mobile GPS receiver system at the measurement epochs;

the integer ambiguity resolution means iteratively resolves the integer wavelength ambiguities with the batch processing by (A) resolving the integer wavelength ambiguities and computing the precise differences in iterations based on the set of simultaneous equations, (B) in a first one of the iterations, using the initial guess positions as the estimates, and (C) in each subsequent one of the iterations, using as the estimates the estimates used in a directly preceding one of the iterations adjusted by the precise differences computed in the directly preceding one of the iterations.

32. The GPS system of claim 25 wherein:

the mobile GPS receiver system is mounted on an aircraft on a final approach trajectory to a runway:

each of the one or more GPS beacons is positioned in front of the runway below the final approach trajectory of the aircraft;

the phase measuring means makes the phase measurements while the aircraft is on the final approach trajectory.

33. The GPS system of claim 32 wherein:

the final approach trajectory has an along track component;

the one or more GPS beacons comprises two GPS beacons further positioned on opposite sides of the along track component of the final approach trajectory.

34. A method of resolving integer wavelength ambiguities associated with phase measurements for carrier components of GPS satellite signals transmitted by GPS satellites, the method comprising the steps of:

positioning one or more GPS beacons each at known fixed location with respect to a reference coordinate system;

with each respective one of the one or more GPS beacons:
  receiving the transmitted GPS satellite signals;
  phase locking onto the carrier component of each of the GPS satellite signals received with the respective one of the one or more GPS beacons and generating GPS beacon signals each having a carrier component in phase with the phase locked onto carrier component of a corresponding one of the GPS satellite signals received with the respective one of the one or more GPS beacons; and
  transmitting the generated GPS beacon signals; and with a mobile GPS receiver system:
  receiving the transmitted GPS satellite and beacon signals;
  making at a plurality of measurement epochs phase measurements for the carrier components of the GPS satellite and beacon signals received with the mobile GPS receiver system;
  wherein for the phase measurements made for the carrier component of each of the GPS satellite signals, there is an associated integer wavelength ambiguity;
  determining directions to the GPS satellites with respect to the reference coordinate system at the measurement epochs;
  resolving the integer wavelength ambiguities in response to the phase measurements, the known location of each of the one or more GPS beacons, and the determined directions to the GPS satellites.

35. The method of claim 34 wherein:

each of the GPS satellite and beacon signals also includes a pseudo-random code component; and for each respective one of the GPS beacon signals generated with the respective one of the one or more GPS beacons, the phase locking and generating step with the respective one of the one or more GPS beacons includes the steps of:
  phase locking onto the pseudo-random code component of a respective corresponding one of the GPS satellite signals received with the respective one of the one or more GPS beacons and producing in response a pseudo-random code phase locking clock signal;
  phase locking onto the carrier component of the respective corresponding one of the GPS satellite signals and producing in response a reconstructed carrier component that is an in phase version of the phase locked onto carrier component of the respective corresponding one of the GPS satellite signals;

generating a transmit pseudo-random code component in phase with the phase locked onto pseudo-random code component of the corresponding one of the GPS satellite signals in response to the pseudo-random code phase locking clock signal; and combining the transmit pseudo-random code component and the reconstructed carrier component and generating in response the respective one of the GPS beacon signals.

36. The method of claim 35 wherein the pseudo-random code component of the respective one of the generated GPS beacon signals is unique from the pseudo-random code components of the GPS satellite signals and all other ones of the GPS beacon signals.

37. The method of claim 34 wherein the phase measurements are made in the phase measuring step during a period in which a large angular change in geometry occurs between the mobile GPS receiver system and the one or more GPS beacons.

38. The method of claim 37 wherein the integer wavelength ambiguities are resolved in the resolving step with batch processing of the phase measurements, the known location of each of the one or more GPS beacons, and the determined directions to the GPS satellites.

39. The GPS system of claim 38 wherein:

the mobile GPS receiver system has unknown precise positions with respect to the reference coordinate system at the measurement epochs;

the integer wavelength ambiguities are resolved with the batch processing in the resolving step based on a predefined set of simultaneous equations, each of the equations relating (A) the unknown precise position of the mobile GPS receiver system at a corresponding one of the measurement epochs, (B) the phase measurements for a respective one of the GPS satellite signals and a respective corresponding one of the GPS beacon signals made at the corresponding measurement epoch, (C) the integer wavelength ambiguity associated with phase measurements for the respective one of the GPS satellite signals, (D) the known location of the one of the one or more GPS beacons that transmits the respective corresponding one of the GPS beacon signals, and (E) the determined direction to the one of the GPS satellites that transmits the respective one of the GPS satellite signals at the corresponding measurement epoch, wherein the number of the GPS satellite signals and the measurement epochs is such that the set of simultaneous equations is overdetermined.

40. The method of claim 39 wherein:

the set of simultaneous equations comprises a set of non-linear equations that are linearized such that the unknown precise positions for the mobile GPS receiver system at the measurement epochs are represented by estimates and precise differences between the estimates and the unknown precise positions;

the method further comprises the step of computing initial guess positions for the mobile GPS receiver system at the measurement epochs;

the integer wavelength ambiguities are iteratively resolved with the batch processing in the resolving step by (A) resolving the integer wavelength ambiguities and computing the precise differences in iterations based on the set of simultaneous equations, (B) in a first one of the iterations, using the initial guess positions as the estimates, and (C) in each subsequent one of the iterations, using as the estimates the estimates used in a directly preceding one of the iterations adjusted by the precise differences computed in the directly preceding one of the iterations.

41. The method of claim 34 wherein:

the mobile GPS receiver system is mounted on an aircraft on a final approach trajectory to a runway:

each of the one or more GPS beacons is positioned in the positioning step in front of the runway below the final approach trajectory of the aircraft.

42. The method of claim 41 wherein:

the final approach trajectory has an along track component:

the one or more GPS beacons comprise two GPS beacons; and the two GPS beacons are further positioned in the positioning step on opposite sides of the along track component of the final approach trajectory.

43. A method of making GPS position determinations with GPS satellite signals transmitted by GPS satellites, each of the GPS satellite signals having a pseudo-random code component and a carrier component, the method comprising the steps of:

positioning a GPS beacon at a fixed known location with respect to a reference coordinate system;

with the GPS beacon:

receiving the transmitted GPS satellite signals;

phase locking onto the pseudo-random code component and the carrier component of each of the GPS satellite signals received with the GPS beacon and generating GPS beacon signals each having a pseudo-random code component and a carrier component respectively in phase with the phase locked onto pseudo-random code component and the phase locked onto carrier component of a corresponding one of the GPS satellite signals received with the GPS beacon; and transmitting the generated GPS beacon signals; and with a mobile GPS receiver system:

receiving the transmitted GPS satellite and beacon signals;

computing a position for the mobile GPS receiver system with respect to the reference coordinate system in response to the GPS satellite and beacon signals received with the mobile GPS receiver system and the known location of the GPS beacon.

44. The method of claim 43 wherein, for each respective one of the generated GPS beacon signals, the phase locking and generating step includes the steps of:

phase locking onto the pseudo-random code component of a respective corresponding one of the GPS satellite signals received with the GPS beacon and producing in response a pseudo-random code phase locking clock signal;

phase locking onto the carrier component of the respective corresponding one of the GPS satellite signals and producing in response a reconstructed carrier component that is an in phase version of the phase locked onto carrier component of the respective corresponding one of the GPS satellite signals;

generating a transmit pseudo random code in phase with the phase locked onto pseudo-random code component of the respective corresponding one of the GPS satellite signals in response to the pseudo-random code phase locking clock signal; and combining the transmit pseudo-random code component and the reconstructed carrier component and generating in response the respective one of the generated GPS beacon signals.

45. The method of claim 44 wherein:

the step of phase locking onto the pseudo-random code component of the respective corresponding one of the GPS satellite signals includes the step of generating a receive pseudo-random code component that is an in phase version of the phase locked onto pseudo-random code component of the respective corresponding one of the GPS satellite signals in response to the pseudo-random code phase locking clock signal;

the step of phase locking onto the carrier component of the respective corresponding one of the GPS satellite signals is in response to the receive pseudo-random code component.

46. The method of claim 43 wherein the pseudo-random code component of each GPS beacon is unique from the pseudo-random code components of the GPS satellite signals and all other ones of the GPS beacon signals.

* * * * *

UNITED STATES PATENT AND TRADEMARK OFFICE
CERTIFICATE OF CORRECTION

PATENT NO. : 5,583,513
DATED : December 10, 1996
INVENTOR(S) : Cohen

It is certified that error appears in the above-identified patent and that said Letters Patent is hereby corrected as shown below:

In Equations 39 and 40, replace "d" with --$d_{24(i)}$--.
In Equations 48 and 49, replace "x" with --$x_0$--.
At column 20, line 11, replace "$d_{29(j)/A}$" with --$e_{29(j)/A}$--.
At column 24, line 11, replace "can" with --to--.
In claim 1, line 59, insert --to the reference coordinate system-- between "respect" and "comprising".
In claim 4, line 51, insert --signal-- between "beacon" and "is".
In claim 8, line 50, insert --signal-- between "beacon" and "is".
In claim 14, line 23, insert --signal-- between "beacon" and "is".
In claim 20, line 60, insert --signal-- between "beacon" and "is".
In claim 24, line 66, insert --signal-- between "beacon" and "is".

Signed and Sealed this

Twenty-ninth Day of May, 2001

*Attest:*

NICHOLAS P. GODICI

*Attesting Officer*     *Acting Director of the United States Patent and Trademark Office*